United States Patent [19]

Takasugi et al.

[11] Patent Number: 5,512,940
[45] Date of Patent: Apr. 30, 1996

[54] IMAGE PROCESSING APPARATUS, ENDOSCOPE IMAGE SENSING AND PROCESSING APPARATUS, AND IMAGE PROCESSING METHOD FOR PERFORMING DIFFERENT DISPLAYS DEPENDING UPON SUBJECT QUANTITY

[75] Inventors: Kei Takasugi; Kazunari Nakamura, both of Tokyo, Japan

[73] Assignee: Olympus Optical Co., Ltd., Tokyo, Japan

[21] Appl. No.: 214,202

[22] Filed: Mar. 17, 1994

[30] Foreign Application Priority Data

Mar. 19, 1993 [JP] Japan .................................. 5-060632
Apr. 1, 1993 [JP] Japan .................................. 5-075821

[51] Int. Cl.⁶ .............................. A61B 1/04; A61B 1/06
[52] U.S. Cl. ........................................... 348/71; 348/30
[58] Field of Search ........................... 348/45, 65, 68–71, 348/30; H04N 7/18

[56] References Cited

U.S. PATENT DOCUMENTS

| | | | |
|---|---|---|---|
| 4,685,451 | 8/1987 | Ando | 348/70 |
| 4,953,011 | 8/1990 | Mori | 348/30 |
| 5,001,556 | 3/1991 | Nakamura et al. | 348/70 |
| 5,331,551 | 7/1994 | Tsuruoka | 348/71 |
| 5,343,254 | 8/1994 | Wada | 348/71 |

FOREIGN PATENT DOCUMENTS

| | | |
|---|---|---|
| 62-217216 | 9/1987 | Japan . |
| 1-107731 | 4/1989 | Japan . |
| 1-280442 | 11/1989 | Japan . |
| 2-268722 | 11/1990 | Japan . |
| 5-3295 | 1/1993 | Japan . |

*Primary Examiner*—Howard W. Britton
*Attorney, Agent, or Firm*—Armstrong, Westerman, Hattori, McLeland & Naughton

[57] ABSTRACT

An endoscope image sensing and processing apparatus uses the level of brightness of G and B signals at position (i, j) generated by subjecting an image of a subject picked up by a CCD to a signal process to detect the hemoglobin quantity IHb (i, j), discriminates whether or not the hemoglobin quantity IHb (i, j) in the image portion, which is the subject, is included in a predetermined range of a set subject quantity or outside the same to generate pseudo color data for displaying an image portion within the predetermined range and an image portion outside the predetermined range in different display colors so as to display the image portions on a monitor.

45 Claims, 46 Drawing Sheets

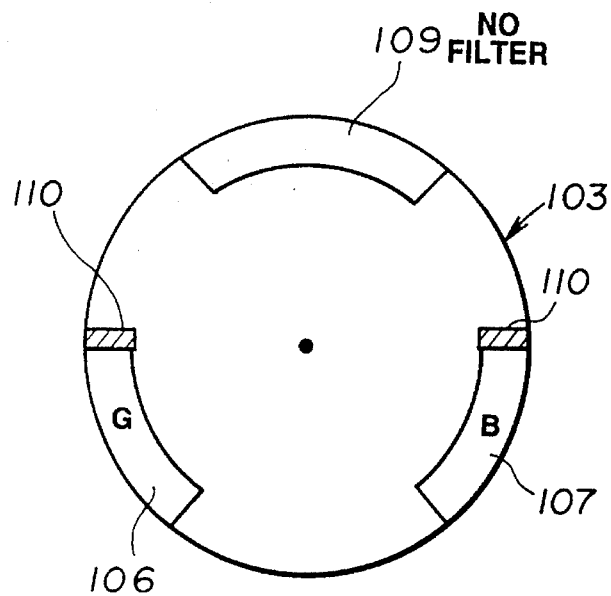
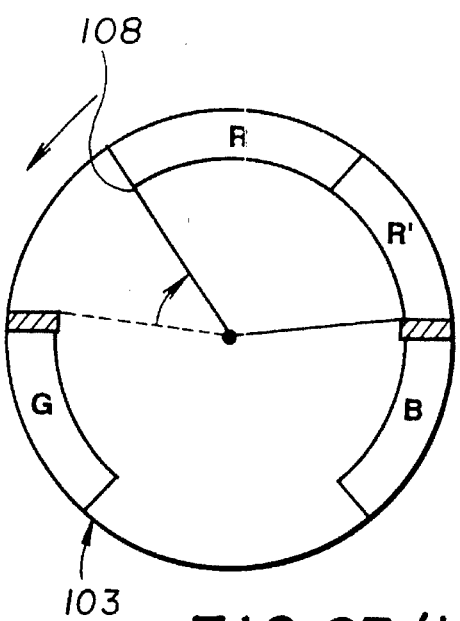
FIG. 23(a)  FIG. 23(b)
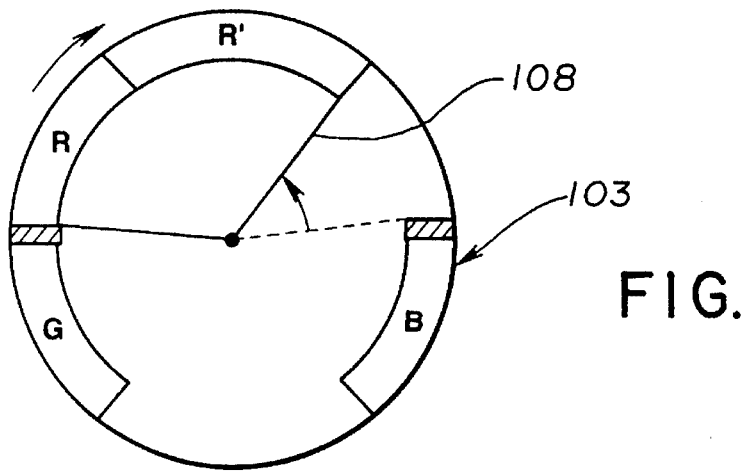
FIG. 23(c)
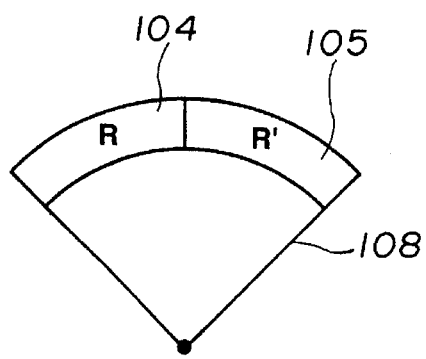
FIG. 24

FIG. 27(a) IRRADIATING LIGHT

FIG. 27(b) RGB IMAGE

FIG. 27(c) R'GB IMAGE

| Cy | G | Cy | G |
|----|---|----|---|
| Ye | G | Ye | G |
| Cy | G | Cy | G |
| G | Ye | G | Ye |
| Cy | G | Cy | G |
| Ye | G | Ye | G |

...

IMAGE PROCESSING APPARATUS, ENDOSCOPE IMAGE SENSING AND PROCESSING APPARATUS, AND IMAGE PROCESSING METHOD FOR PERFORMING DIFFERENT DISPLAYS DEPENDING UPON SUBJECT QUANTITY

BACKGROUND OF THE INVENTION

1. Field of the Invention

This invention relates to an image processing apparatus and an endoscope image sensing and processing apparatus that subjects image signals to a predetermined calculating process to display, by different display methods, a portion outside a predetermined range of a subject quantity and a portion within the predetermined range of the subject quantity and an image processing method for performing different displays depending upon the subject quantity.

2. Description of the Related Art

Recently, an endoscope has been widely used which comprises an elongated insertion portion to be inserted into the coelom to observe the internal organ in the coelom or the like and/or which is able to perform a variety of curing treatments by using a treatment tool inserted into a treatment channel.

An endoscope apparatus of the foregoing type has been adapted to a variety of image processes in recent years. In order to enable an image process of the foregoing type to clearly separate an ineffective region, such as halation, and a dark portion and effective region from each other, a technology has been disclosed in, for example, Japanese Patent Laid-Open No. 2-268722 in which a portion encountered halation is detected and the foregoing region is displayed in such a manner that the foregoing region can be distinguished from the effective region.

As disclosed in Japanese Patent Laid-Open No. 3-21186, a technology has been disclosed which has an arrangement that the ineffective region exemplified by halation and a dark portion and the effective regions are clearly distinguished from each other at the time of displaying the image.

Hitherto, the processed image of the foregoing type has been displayed in such a manner that the ineffective regions exemplified by halation and the dark portion are clearly distinguished from each other. If the distribution of the quantities of hemoglobin is subjected to a pseudo color process in such a way that a subject range (hereinafter called a "subject level range") is set in accordance with the quantity of hemoglobin, no special attention has not been paid to pixels outside the subject level.

Therefore, the pixels outside the subject level range have been usually displayed in the same color as that for the maximum value of the subject level range if the pixels are higher than the subject level range and in the same color as that for the minimum value of the subject level range if the pixels are lower than the subject level range. If attention is paid to the color adjacent to the maximum value or that adjacent to the minimum value, it is difficult to distinguish whether the pixels are present outside the subject level range or adjacent to the maximum value of the subject level range or adjacent to the minimum value.

A conventional fiber scope sometimes encounters difficulty when change in the physically changed portion caused by a disease and that in the mucous membrane are observed. However, it is known that detection of the distribution of the degrees of oxygen saturation of hemoglobin in the blood will be helpful in early discovery of the physically changed portion caused by a disease.

As a method of measuring the degree of oxygen saturation of hemoglobin in the blood, a method is well-known in which the difference between absorption at wavelengths, for example 569 nm and 586 nm, at which the absorbance cannot be changed due to change in the degree of oxygen saturation and absorption at a wavelength, for example 577 nm, at which the same is considerably changed due to the change in the degree of oxygen saturation is used to measure the change in the degree of oxygen saturation in the mucous membrane.

As a method of obtaining information about the degree of oxygen saturation, an endoscope apparatus has been disclosed in, for example, Japanese Patent Laid-Open No. 63-311937 or Japanese Patent Laid-Open No. 1-280442 in which a narrow band filter of the foregoing wavelength is used to obtain the information about the degree of oxygen saturation.

However, in a conventional endoscope apparatus, obtaining the image of the degree of oxygen saturation includes a narrow band filter and undesirably forms an image in a color tone which is different from an image obtained from a usual visual observation when the image of the degree of oxygen saturation is being displayed. Since the image of the degree of oxygen saturation cannot express a fine change in the color of the mucous membrane, there arise a necessity of switching the image to a visible observation image.

In addition to the foregoing image processing apparatus adapted to the quantity of hemoglobin, there has been an image processing apparatus capable of visualizing the distribution of the concentrations of fluorochrome or that of ICG (Indocyanine Green) from the endoscope image. It is desirable to enable the image processing apparatus of the foregoing type to distinguish the portion having the value of the concentration of the fluorochrome or the value of the concentration of the ICG which is required by an observer to observe from the residual portions. However, the conventional image processing apparatus cannot easily enable the portion required to be observed to be discriminated in the image of the distribution of the concentrations of the fluorescence or the image of the distribution of the concentrations of the ICG or the intensified image, each of which is the processed image.

In a case of an image obtained by pseudo-color processing an image of the distribution of the concentrations of the fluorochrome or an image of the distribution of the concentrations of the ICG, the image is displayed in such a manner that the color is changed depending upon the value of the concentration of the fluorochrome or that of the ICG. However, the region of the concentration of the fluorochrome or that of the ICG required by the observer to observe cannot be distinguished in the image even if a color bar is displayed on the side portion of the image in order to make the value of the concentrations of the fluorochrome or that of the ICG to correspond to the display colors because the color change takes smoothly.

What is worse, the concentration of the fluorochrome or that of the ICG can be discriminated qualitatively in the image in which the concentration of the fluorochrome or that of the ICG is intensified. However, the concentrations cannot be quantitatively discriminated.

SUMMARY OF THE INVENTION

An object of the present invention is to provide an image processing apparatus capable of forming a processed image which can easily be recognized when an image of a subject is displayed and which enables the diagnosing ability to be improved.

Another object of the present invention is to provide an image processing apparatus capable of displaying an image in such a manner that a portion outside a predetermined range of a subject quantity and a portion within the predetermined range of the subject quantity can clearly be distinguished from each other.

Another object of the present invention is to provide an image processing apparatus that enables a discrimination to be made easily that a portion to which the boundary between a portion within the predetermined range of the subject quantity and a portion outside the predetermined range belongs.

Another object of the present invention is to provide an image processing apparatus capable of intentionally distinguishing the displays of portions included in a predetermined range of the subject quantity in accordance with the subject quantity when an image of a subject is displayed.

Another object of the present invention is to provide an image processing apparatus that distinguishes the display to be helpful in an early discovery of a physically changed portion caused by a disease, observation of the structure of the texture of an organism or observation of the configuration of the textures of an organism, such as the blood vessels.

Another object of the present invention is to provide an image processing apparatus that enables a discrimination to be made easily when an image of a subject is displayed that the portion outside the predetermined range of the subject quantity belongs to an image portion adjacent to the maximum value or an image portion adjacent to the minimum value.

Another object of the present invention is to provide an image processing apparatus enabling an observer to set a range to be determined in accordance with the quantity of hemoglobin in an organism and discriminating whether or not the portion is included in the range can easily be discriminated.

Another object of the present invention is to provide an image processing apparatus enabling an observer to set a range to be determined in accordance with the degree of oxygen saturation of hemoglobin and discriminating whether or not the portion is included in the range can easily be discriminated.

Another object of the present invention is to provide an image processing apparatus enabling an observer to set a range to be determined in accordance with the concentration of fluorochrome and discriminating whether or not the portion is included in the range can easily be discriminated.

Another object of the present invention is to provide an image processing apparatus enabling an observer to set a range to be determined in accordance with the concentration of pigment and discriminating whether or not the portion is included in the range can easily be discriminated.

Another object of the present invention is to provide an endoscope image sensing and processing apparatus capable of displaying an image in such a manner that a portion in which said subject quantity calculated by said calculating means is outside the predetermined range of the subject quantity and a portion within the predetermined range of the subject quantity can clearly be distinguished from each other.

Another object of the present invention is to provide an endoscope image sensing and processing apparatus capable of effectively observing an image showing change in the subject quantity in a state where a usual visible observation is performed.

Another object of the present invention is to provide an endoscope image sensing and processing apparatus capable of observing an image showing change in the degree of oxygen saturation of hemoglobin for the early discovery of a physically changed portion caused by a disease.

Another object of the present invention is to provide an endoscope image sensing and processing apparatus enabling a visible observation image similar to the conventional apparatus to be obtained, capable of discriminating change in the subject quantity, enabling an image in a color tone similar to the color of a visibly observed image to be obtained, capable of facilitating observation of a physically changed portion caused by a disease by obtaining information about the function of an organism from fine color change similar to the visually observed image and change in the subject quantity and capable of improving the diagnosing ability.

Another object of the present invention is to provide an image processing method for performing different displays in accordance with the subject quantity in order to enable a portion in which the subject quantity calculated by said calculating means is outside the predetermined range of the subject quantity and a portion within the predetermined range of the subject quantity to be clearly distinguished from each other.

According to one aspect of the present invention, there is provided an image processing apparatus comprising: calculating means that subjects, to a predetermined calculation process, a plurality of image signals obtained by image sensing means by taking an image of a subject having light beams in a plurality of different wavelength regions to calculate a subject quantity of the subject or a subject quantity caused from a medication dosed into the subject; range setting means for setting a predetermined range of the subject quantity; and display processing means for subjecting the image signals to a predetermined process in order to display, by different display methods, a portion of the image of the subject in which the subject quantity calculated by the calculating means is included in the predetermined range of the subject quantity and a portion of the image of the subject in which said subject quantity calculated by said calculating means is outside the predetermined range of the subject quantity.

Other and further objects, features and advantages of the invention will be appear more fully from the following description.

BRIEF DESCRIPTION OF THE DRAWINGS

FIG. 7 is a block diagram which illustrates the structure including a video processor;

FIG. 8 is a block diagram which illustrates the structure of an image processing portion;

FIG. 10 is an overall structural view which illustrates an endoscope image sensing and processing apparatus;

FIG. 11 is a block diagram which illustrates the endoscope image sensing and processing apparatus;

FIG. 12 is a block diagram which illustrates an image processing portion;

FIG. 13 is a graph which illustrates the transmission wavelength region of each filter of a rotary filter;

FIG. 14 is a graph which illustrates the characteristics of absorbance spectral of each of oxyhemoglobin and deoxyhemoglobin;

FIG. 15 is a block diagram which illustrates the structure of an endoscope image sensing and processing apparatus;

FIG. 16 is an explanatory view which illustrates a rotary filter;

FIG. 17 is a graph which illustrates the transmission wavelength region of each filter of a rotary filter;

FIG. 18 is a block diagram which illustrates the structure of an endoscope image sensing and processing apparatus;

FIG. 19 is an explanatory view which illustrates the structure of a filter turret;

FIG. 20 is a graph which illustrates the transmission wavelength region of each filter of a rotary filter;

FIG. 21 is a graph which illustrates the transmission wavelength region of a first band limiting filter;

FIG. 22 is a graph which illustrates the transmission wavelength region of a second band limiting filter;

FIGS. 23(*a*) to 25 illustrate a seventh embodiment;

FIGS. 23(*a*) and 23(*b*) are explanatory views which illustrate the structure and the operation of a rotary filter;

FIG. 24 is an explanatory view which illustrates the structure of R and R' filters disposed in a rotary filter;

FIG. 26 is an explanatory view which illustrates the structure of a rotary filter;

FIGS. 27(*a*), 27(*b*) and 27(*c*) form a timing chart which explains the operation of the eighth embodiment;

FIG. 28 is a block diagram which illustrates an endoscope image sensing and processing apparatus;

FIG. 29 is a block diagram which illustrates the structure of an endoscope image sensing and processing apparatus;

FIG. 30 is a graph which illustrates the transmission wavelength region of each filter of a rotary filter;

FIG. 32 is a graph which illustrates the transmission wavelength characteristics of each filter of a rotary filter;

FIG. 33 is a graph which illustrates the transmission wavelength characteristics of a band limiting filter disposed in a filter turret;

FIG. 34 is a graph which illustrates wavelength characteristics of irradiating light in a case where a band limiting filter 117 has been inserted onto the optical path;

FIG. 35 is a graph which illustrates wavelength characteristics of irradiating light in a case where a band limiting filter 118 has been inserted onto the optical path;

FIG. 36 is a block diagram which illustrates the structure of an endoscope image sensing and processing apparatus;

FIG. 37 is an explanatory view which illustrates the structure of a rotary filter;

FIG. 38 is a graph which illustrates the transmission characteristics of each filter of a rotary filter;

FIG. 39 is a block diagram which illustrates an image processing portion;

FIG. 40 is an explanatory view which illustrates the structure of a color separating filter array;

FIG. 41 is a graph which illustrates the transmission wavelength characteristics of each filter of the color separating filter array;

FIG. 42 is a graph which illustrates the transmission wavelength characteristics of each filter of a rotary filter;

FIG. 43 is an explanatory view which illustrates the structure of an image processing portion;

FIG. 44 is an overall outline view which illustrates an endoscope image sensing and processing apparatus;

FIG. 45 is a block diagram which illustrates the overall structure of the endoscope image sensing and processing apparatus;

FIG. 46 is a block diagram which illustrates an image processing portion;

FIG. 47 is an outline view which illustrates the overall structure of an endoscope image sensing and processing apparatus;

FIG. 48 is a block diagram which illustrates the overall structure of the endoscope image sensing and processing apparatus;

FIG. 49 is a block diagram which illustrates an image processing portion;

FIG. 50 is a graph which illustrates the characteristics of transmission wavelength region of each filter of a rotary filter;

FIG. 51 is a graph which illustrates absorbance and fluorescent characteristics of fluorescein employed as a fluorochrome;

FIG. 52 is a block diagram which illustrates the overall structure of an endoscope image sensing and processing apparatus;

FIG. 53 is a block diagram which illustrates an image processing portion;

FIG. 54 is a graph which illustrates the transmission wavelength region of each filter of a rotary filter;

FIG. 55 is a graph which illustrates the transmission wavelength region of each filter of a filter turret;

FIG. 56 is a graph which illustrates spectral transmittance curves of indocyanine green with human serum solution or the like.

DETAILED DESCRIPTION OF THE PREFERRED EMBODIMENTS

Figure 1:
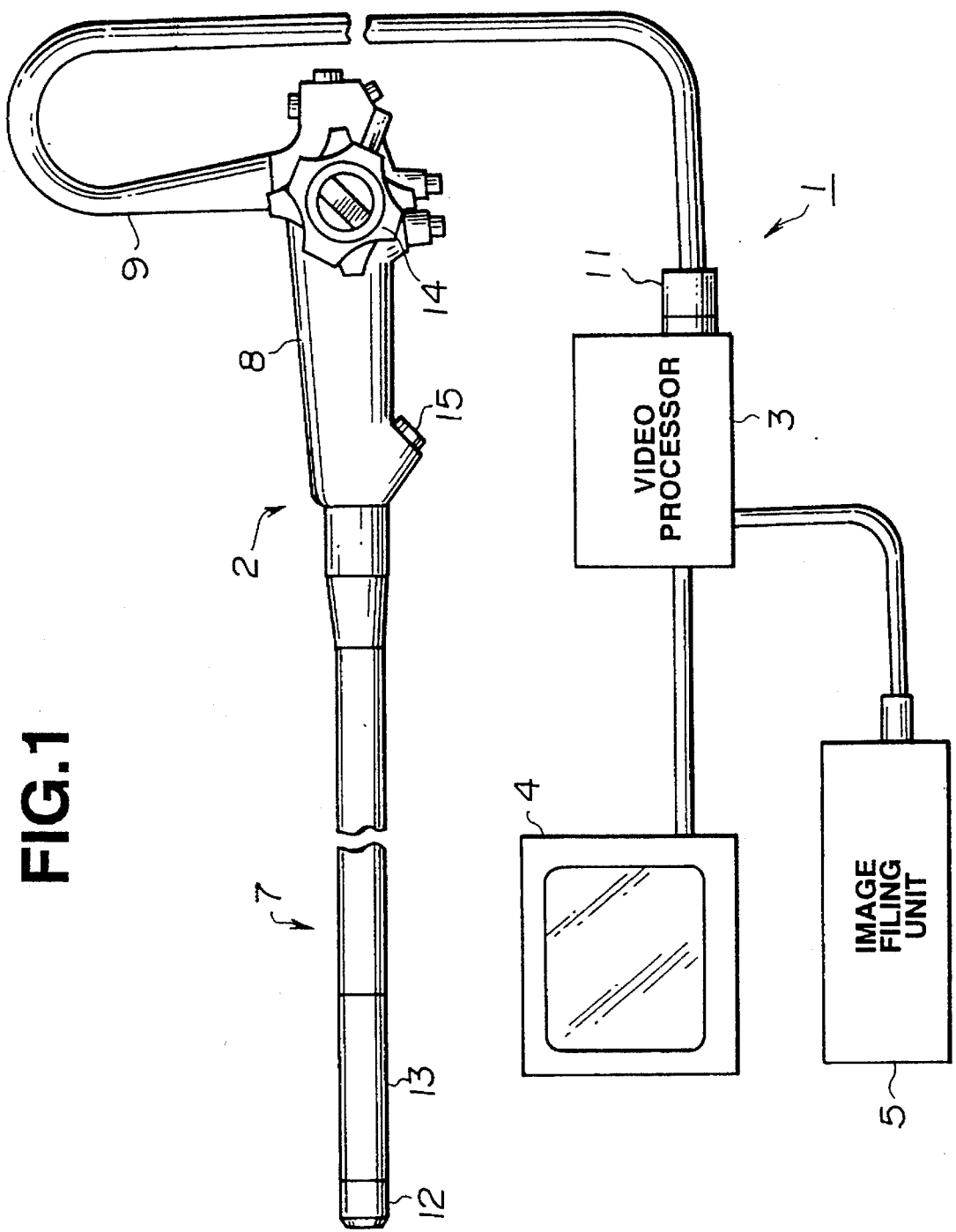
FIG. 1 is an overall structural view which illustrates an endoscope image sensing and processing apparatus having an image processing apparatus according to a first embodiment.

Referring to the drawings, preferred embodiments of the present invention will now be described.

Figure 2:
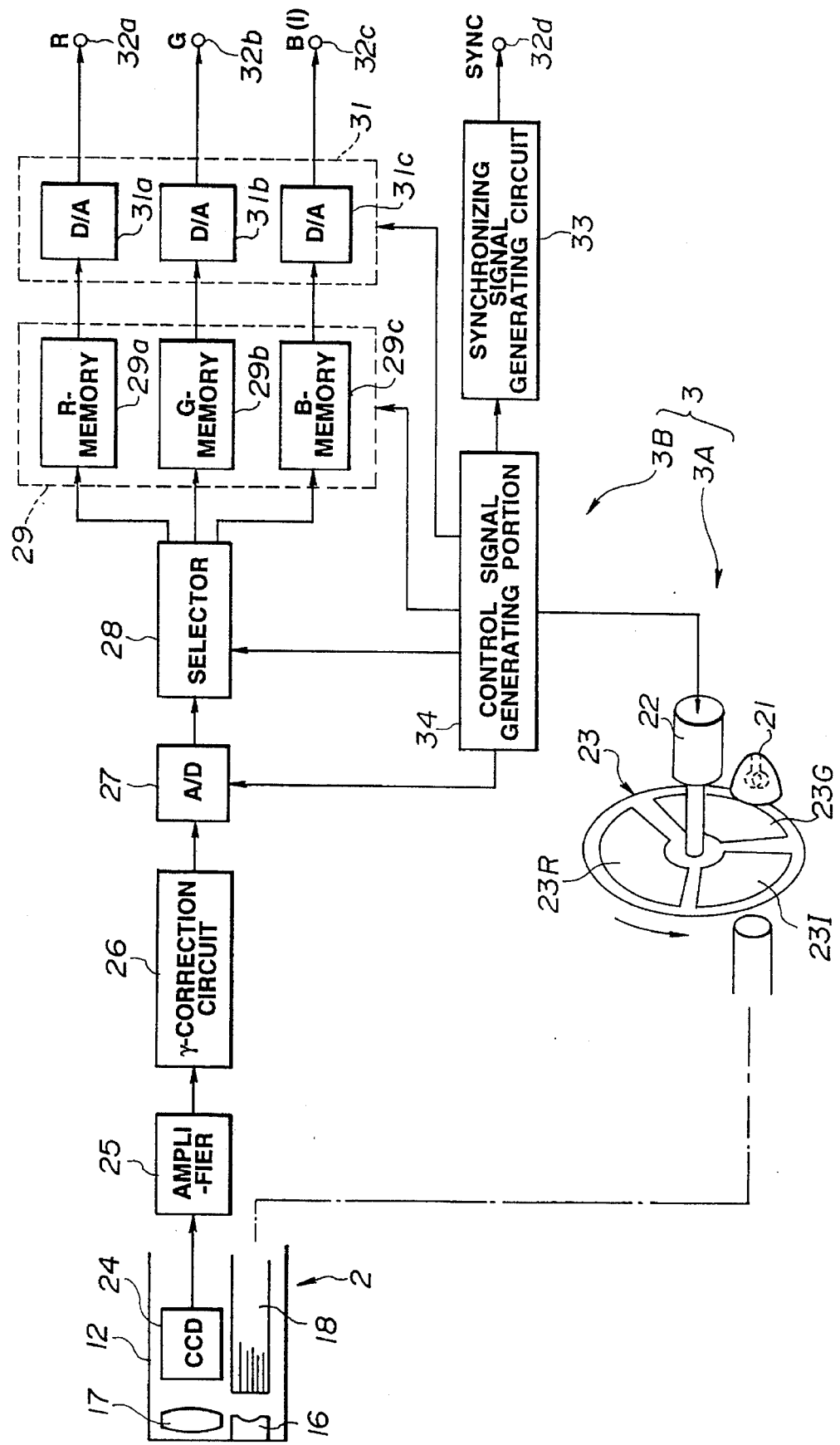
FIG. 2 is a block diagram which illustrates the structure including a video processor.
Figure 3:
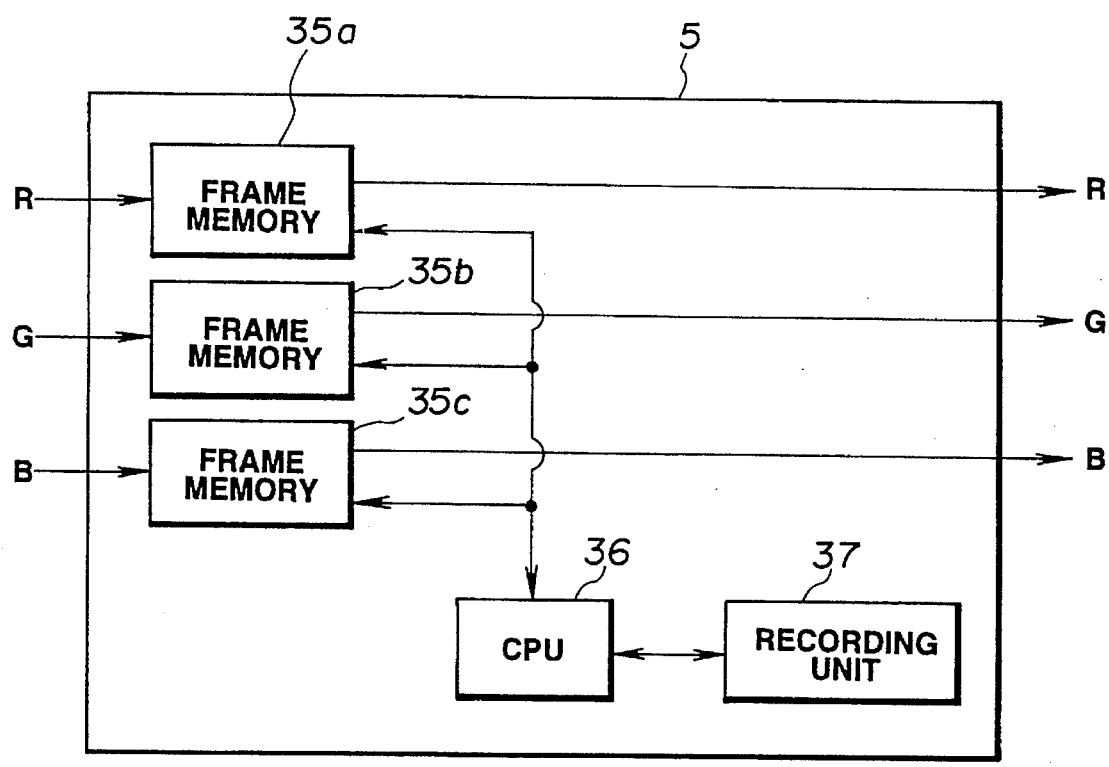
FIG. 3 is a block diagram which illustrates an image filing apparatus.
Figure 4:
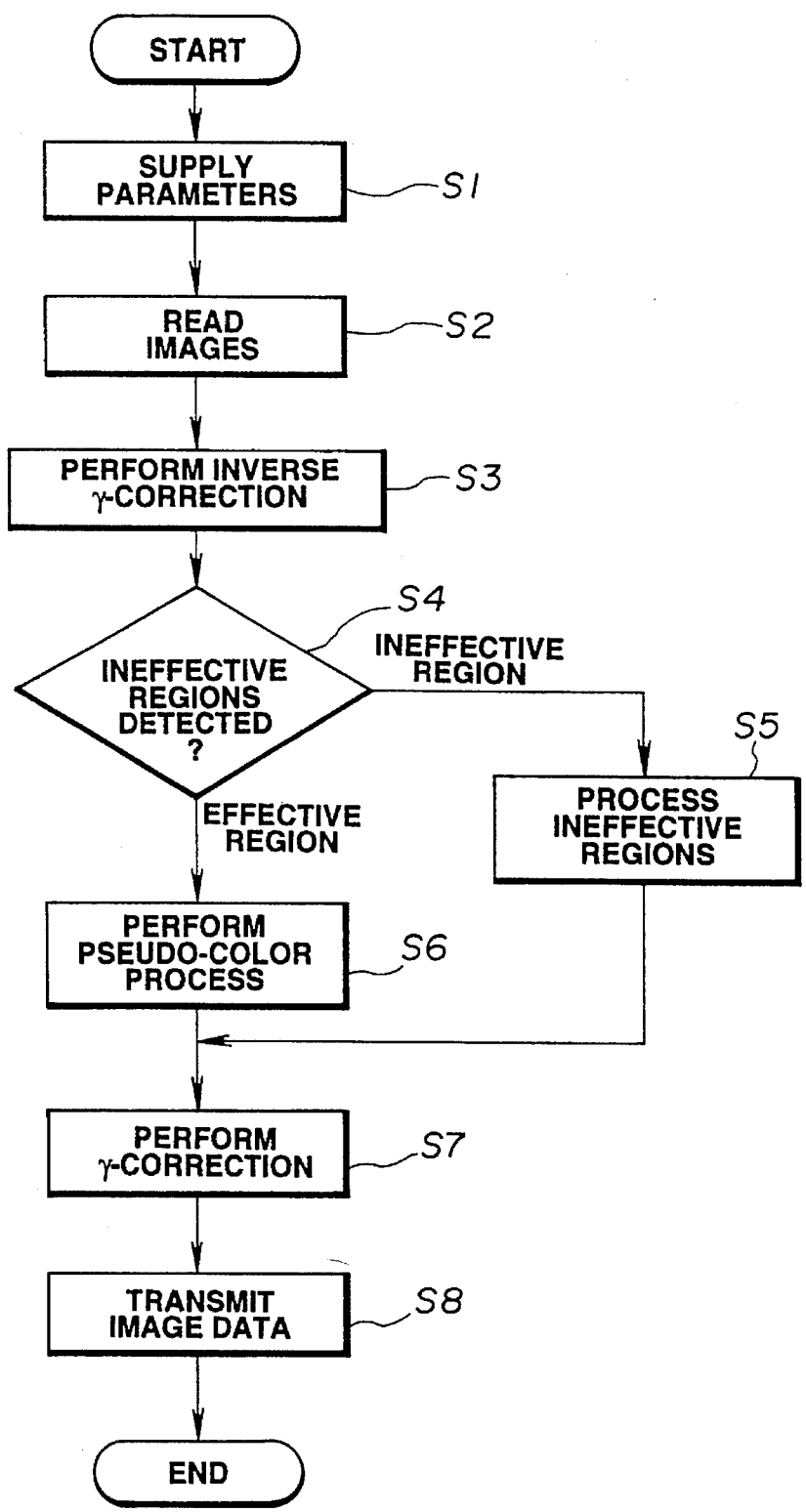
FIG. 4 is a flow chart which illustrates an image processing method.
Figure 5:
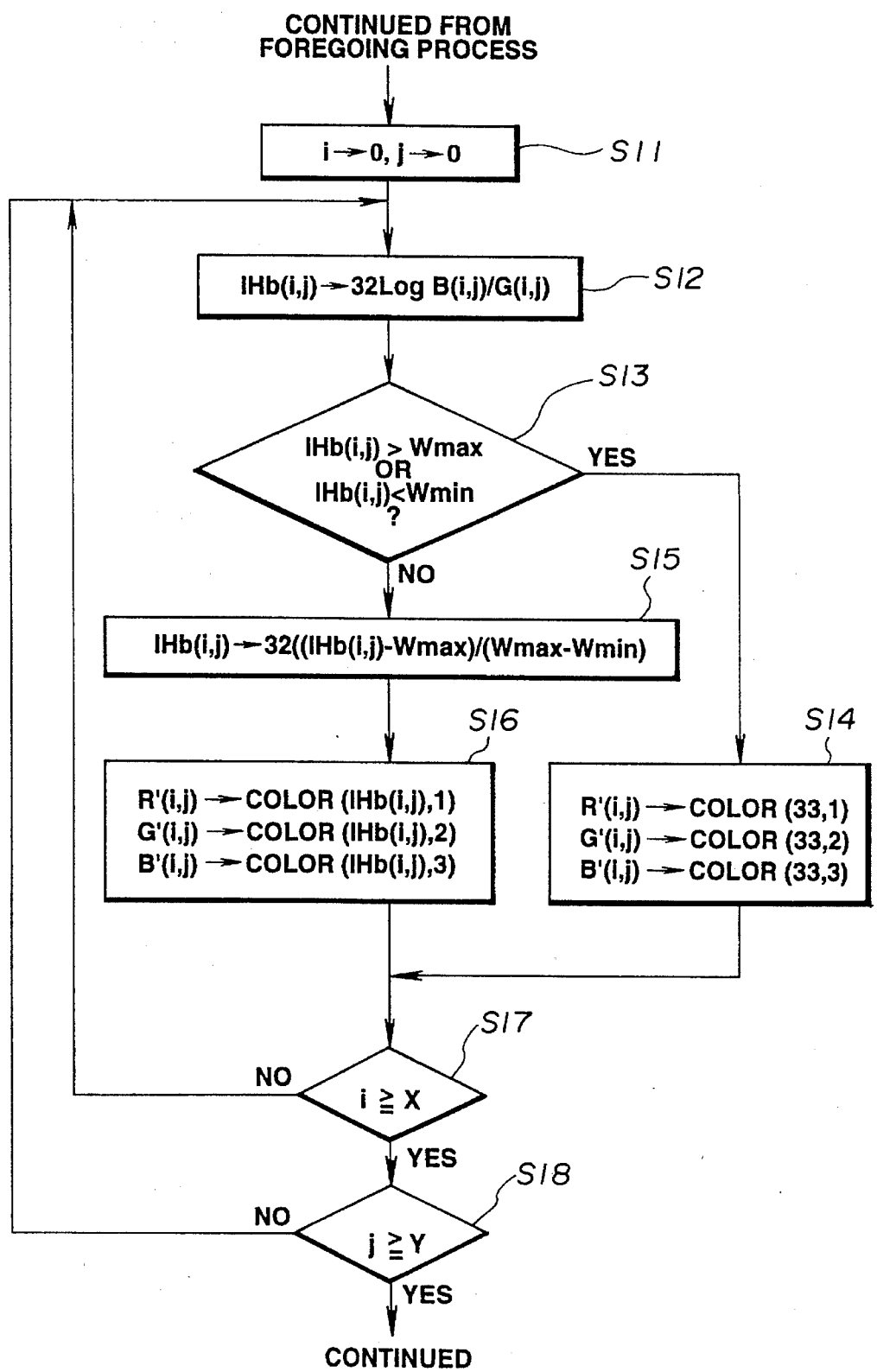
FIG. 5 is a flow chart for a pseudo color processing portion.
Figure 6A:
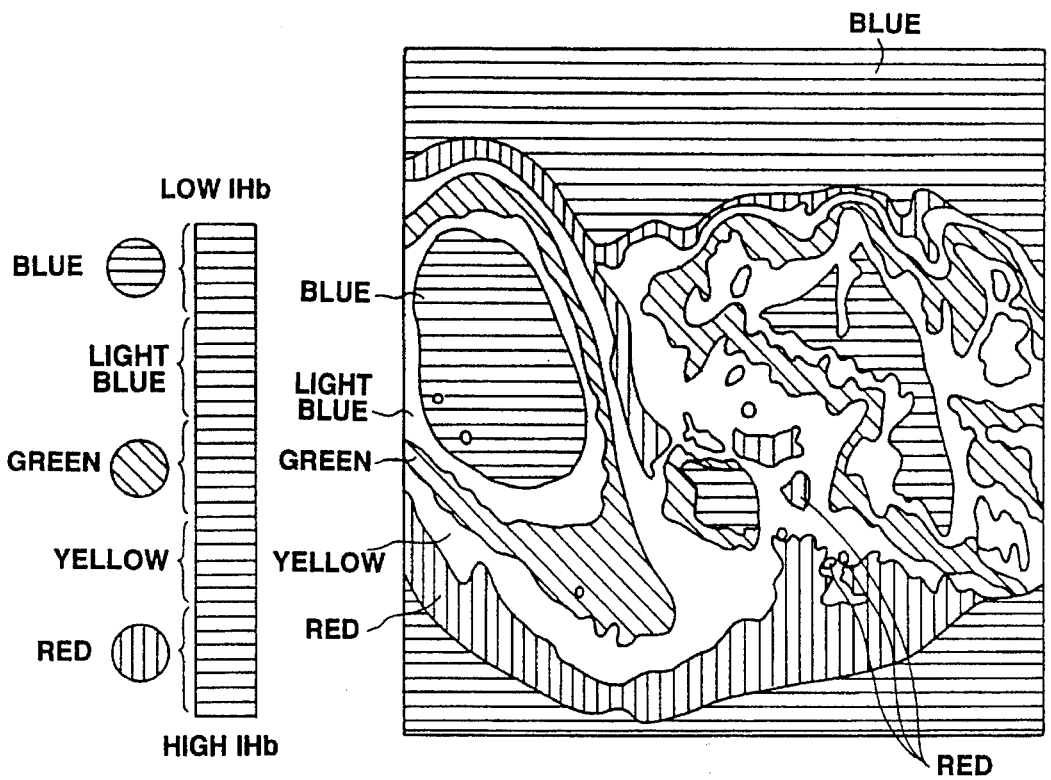
FIGS. 6(a) and 6(b) are explanatory views which illustrate change taken place before and after the image processing according to the first embodiment.
Figure 6B:
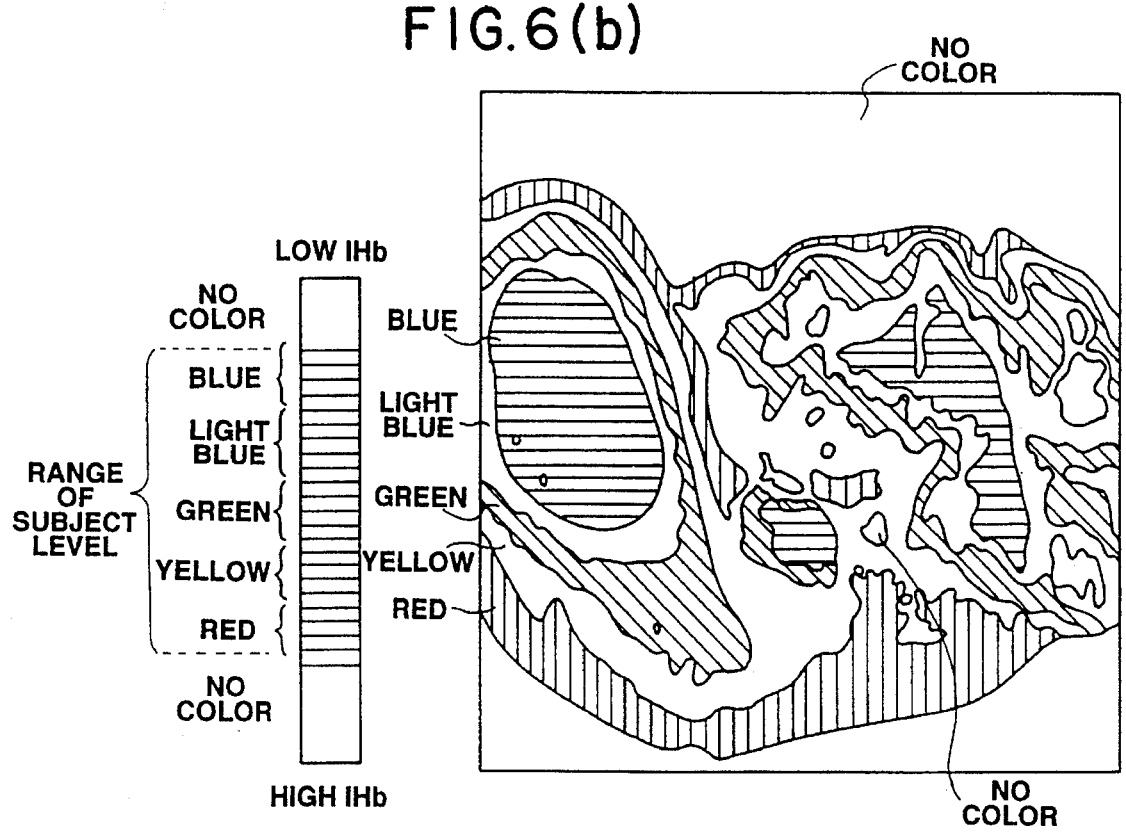

FIGS. 1 to 6 illustrate a first embodiment of the present invention. FIG. 1 is an overall structural view which illustrates an endoscope image sensing and processing apparatus having an image processing apparatus according to the first embodiment of the present invention. FIG. 2 is a block diagram which illustrates the structure including a video processor. FIG. 3 is a block diagram which illustrates an image filing apparatus. FIG. 4 is a flow chart which illustrates an image processing method. FIG. 5 is a flow chart of the operations of a pseudo color processing portion. FIG. 6 is an explanatory view which illustrates change taken place before and after the image process according to the first embodiment is performed.

As shown in FIG. 1, an endoscope image sensing and processing apparatus 1 having the image processing apparatus according to the first embodiment comprises an electronic endoscope 2 having an image sensing means, a video processor 3 for supplying irradiating light to the electronic endoscope 2 and processing a signal, a monitor 4 for displaying a video signal transmitted from the video processor 3, and an image filing apparatus 5 connected to the video processor 3 and having a function to serve as the image processing apparatus.

The electronic endoscope 2 has an elongated and movable insertion portion 7. A control portion 8 having a large diameter is connected to the rear end of the insertion portion 7. Further, a flexible universal cord 9 is extended from the side portion of a portion adjacent to the rear end of the control portion 8, the universal cord 9 having a connector 11 at an end thereof.

The electronic endoscope 2 can be connected to the video processor 3 through the connector 11, the video processor 3 including a light source unit 3A and a signal processing circuit 3B (see FIG. 2). Moreover, a monitor 4 and the image filing apparatus 5 can be connected to the video processor 3.

In the leading portion of the insertion portion 7, a hard leading section 12 and a warp-enabled portion 13 disposed adjacently in the rear of the leading section 12 are located sequentially. By turning the warp controlling knob 14 disposed in the control portion 8, the warp-enabled portion 13 can be warped laterally or vertically. The control portion 8 has an insertion port 15 communicating with a treatment tool channel formed in the insertion portion 7.

As shown in FIG. 2, the leading section 12 has a light distributing lens 16 and an imaging optical system 17 disposed therein. A light guide 18 comprising a fiber bundle is connected to the rear end of the light distributing lens 16, and the light guide 18 is allowed to pass through the insertion portion 7, the control portion 8 and the universal cord 9 so that the end of the irradiating light adjacent to the incidental end is connected to the light source unit 3A of the video processor 3.

Thus, irradiating light emitted from the light source unit 3A in the video processor 3 is made incident on the incident end of the light guide 18. The light source unit 3A comprises a lamp 21 and a rotary filter 23 disposed in the irradiation light passage of the lamp 21 and arranged to be rotated by a motor 22.

The lamp 21 emits light rays having wavelengths ranging from the ultraviolet to the infrared.

The rotary filter 23 includes red, green and infrared-ray transmission filters 23R, 23G and 23I permitting red, green and infrared rays in different wavelength ranges to pass through, the filters 23R, 23G and 23I being disposed in the circumferential direction of the rotary filter 23. The red light transmission filter 23R permits red light, the wavelength of which is about 650 nm, to pass through, the green light transmission filter 23G permits green light, the wavelength of which is about 580 nm, to pass through, and the infrared ray transmission light filter 23I permits infrared rays, the wavelength of which is about 805 nm, to pass through.

Light emitted from the lamp 21 is time-sequentially separated into the foregoing wavelength regions by the rotary filter 23 so that red, green and infrared ray plane-sequential irradiation light beams are formed, the formed irradiation beams being made incident on the incident end of the light guide 18. The field sequential irradiating light is guided by the light guide 18 to the leading section 12 and emitted from the surface of the leading end. Then, the field sequential irradiating light is allowed to pass through the light distributing lens 16 to irradiate a subject.

On the other hand, for example, a CCD 24 is disposed at the imaging position of the imaging optical system 17, the CCD 24 serving as a solid-state image sensing device, which is an image sensing means. The image of the subject irradiated with the foregoing field sequential irradiating light is imaged on the image-sensing surface of the CCD 24 by the imaging optical system 17, the image of the subject being then converted into an electric signal by the CCD 24. The electric signal is formed into red, green and infrared ray time-sequential image-sensing signals (video signals) (hereinafter sometimes abbreviated to R, G and I signals) respectively obtained under red, green and infrared field sequential irradiating light beams. The video signals obtained from the CCD 24 are received by an amplifier 25 to be amplified to electric signals included in a predetermined range (for example 0 to 1 V).

The electric signals transmitted from the amplifier 25 are γ-corrected by a γ-correction circuit 26 disposed in the signal processing circuit 3B, and then converted into digital signals by an A/D converter 27. The digital signals are received by a selector 28 having one input port and three output ports so that the R, G and I signals transmitted time-sequentially are separated into R, G and I signals by the selector 28 so as to be stored in R, G and B memories 29a, 29b and 29c corresponding to R, G and I. It should be noted that the expressions R, G and B memories are used to coincide with the signals for use in a case where a color image is displayed. Actually, the I signal is recorded on the B memory 29c, while the B signal transmitted from the B memory 29c is the I signal in actual fact. Only in this embodiment, the I signal is sometimes expressed as the B signal or B (I) signal.

The image signals simultaneously read from the memories 29a, 29b and 29c, which constitute a memory portion 29, are converted into analog signals by D/A converters 31a, 31b and 31c which constitute a D/A converter portion 31 so that R, G and B (I) signals are transmitted from output terminals 32a, 32b and 32c for the R, G and B signals.

Moreover, simultaneously with the transmissions of the R, G and B signals, synchronizing signal SYNC generated in a synchronizing signal generating circuit 33 is transmitted through a synchronizing signal output terminal 32d.

The foregoing R, G and B signals and the synchronizing signal can be received by the monitor 4 and the image filing apparatus 5 having the R, G and B signal input terminals.

Furthermore, a control signal generating portion 34 for controlling the destination of the image signals and the timing at which the image signals are transferred is disposed, the control signal generating portion 34 being arranged to transmit control signals to the A/D converter 27, the selector 28, the memory portion 29, the D/A converter portion 31, the synchronizing signal generating circuit 33 and the motor 22.

The image filing unit 5, as shown in FIG. 3, includes frame memories 35a to 35b, a CPU 36 and a recording unit 37. The R, G and B image signals received by the image filing unit 5 are respectively stored in the frame memories 35a to 35b. The image signals stored in the frame memories 35a to 35c can be read by the CPU 36. The CPU 36 subjects the image signals to the following image process to be performed therein.

The signals subjected to the image process and the original image, which have not been subjected to the image process, can be stored in a storage unit 37, such as an optomagnetic disc unit, and displayed on the monitor 4 or the like.

The CPU 36 disposed in the image filing unit 5 includes a program for performing the image process, the program being arranged as shown in FIGS. 4 and 5. In this program, parameters, such as the name of the image file, a predetermined range for a subject quantity and the number of gradations must be supplied first as described in step S1. Then, the image is read as described in step S2. That is, image data having the received name of the image file is read into an image processing portion of the image filing unit 5 by a recording unit or the like.

Since the thus-read image data has been subjected to γ-correction because the monitor 4 has non-linear input/output characteristics, it is subjected to an inverse γ-correction process as described in step S3. As a result, the image data is converted into linear data. Then, ineffective regions, such as halation and dark regions, the accurate values of which cannot be calculated even if the quantity of hemoglobin for use as information about biodynamics has been calculated, are detected in accordance with the levels of the R, G and B signals.

Residual effective regions are subjected to a process in which information about biodynamics for use as the subject quantity, for example, the quantity of hemoglobin, is calculated for each pixel. The detected ineffective regions are, as shown in step S5, subjected to an ineffective region process, such as a solid black coloring process or a half-tone process, so as to be displayed in a state clearly different from the effective regions.

On the other hand, the quantity of hemoglobin calculate in step S4 is divided into a quantity within a predetermined range of the subject quantity and that outside the subject quantity so as to be respectively data-converted. Then, the converted data is subjected to a pseudo color process as shown in step S6.

The pseudo color process is, as described later, a process for displaying data to enable the data within the predetermined range and that outside the predetermined range to be displayed by different displaying methods such that the foregoing two types of the data items are expressed in different displaying colors so as to be visually distinguished from each other. Then, the obtained pseudo color image data is, as shown in step S7, subjected to the γ-correction, and then the corrected data is transmitted as image data as shown in step S8. As a result, data within the predetermined range of the subject quantity and that outside the predetermined range of the subject quantity are displayed in different colors for example.

Then, the pseudo color process will now be described with reference to the flow chart shown in FIG. 5.

If an image is expressed by two dimensional configuration IM (X,Y), X stands for the size of the image in the direction X and Y stands for the size of the image in the direction Y. An assumption is made that G (i,j) denotes the level of the brightness of the G signal at position (i,j), B (i,j) denotes the level of the brightness of the B signal at the position (i,j), and IHb (i,j) denotes the quantity of hemoglobin at the position (i,j). Another assumption is made here that Wmax and Wmin respectively are the maximum value and the minimum value of the subject quantity, and color ( ) denotes pseudo color data. In addition, assumption is made that the image data items after the pseudo color process has been performed are R'(i,j), G'(i,j) and B'(i,j).

The pseudo color process is performed in accordance with the following step.

(1) 0 is substituted into i,j so that initialization is performed (step S11 shown in FIG. 5).

(2) A value obtained by multiplying the logarithmic ratio of B (i,j) and G (i,j) by coefficient 32 is substituted into IHb (i,j) (step S12).

(3) A discrimination is made whether or not IHb (i,j)>Wmax or IHb (i,j)<Wmin (step S13). If IHb (i,j)>Wmax or IHb (i,j)<Wmin, process (4) is performed. In the residual case, process (5) and ensuing processes are performed.

(4) R'(i,j)=color (33,1) G'(i,j)=color (33,2) B'(i,j)=color (33,3)

The foregoing three equations are executed (step S14).

(5) IHb (i,j)=32 (IHb (i,j)−Wmax)/(Wmax−Wmin) is executed (step S15).

(6) R'(i,j)=(IHb (i,j),1) G'(i,j)=(IHb (i,j),2) B'(i,j)=(IHb (i,j),3)

The foregoing equations are executed so that the process for displaying data in colors which are different from the color employed in process (4) is performed (step S16).

(7) If i≧X, process (8) is performed. If i<X, process (2) is performed (step S17).

(8) If j≧X, the next process is performed. If j<Y, process (2) is performed (step S18).

As a result of performing the foregoing steps, the pseudo color process is completed.

Then, the operation of this embodiment will now be described.

Light ranging from the ultraviolet ray range to the infrared ray range emitted from the lamp 21 is made incident upon the rotary filter 23 which is rotated by the motor 22. The rotary filter 23, as described above, has the red light transmission filter 23R for permitting red light, the wavelength of which is about 650 nm, the green light transmission filter 3G for permitting green light, the wavelength of which is about 580 nm and the infrared ray transmission filter 23R for permitting infrared ray, the wavelength of which is about 805 nm.

Therefore, light emitted from the lamp 21 is time-sequentially divided into light beams having wavelengths which correspond to the filters 23R, 23G and 23I, the divided light beams being then allowed to pass through the light guide 18 so as to be introduced into the coelom. Thus, the light beams are, as irradiating light, applied to irradiate the coelom through the light distributing lens 16. The image of the subject obtained due to the irradiation performed with the irradiating light beams is imaged on the CCD 24 by the imaging optical system 17 so as to be converted into electric signals. The output signal from the CCD 24 is amplified by the amplifier 25, and then the output is converted to have a predetermined γ -characteristics in the γ-correction circuit 26.

The output from the y-correction circuit 26 is converted into digital signal by the A/D converter 27, the digital signal being then allowed to pass through the selector 28 so as to be stored in the memories 29a, 29b and 29c as images which have been time-sequentially separated depending upon the foregoing wavelengths. The video signals read from the memories 29a, 29b and 29c are made simultaneous, and then converted into analog video signals by the D/A converters 31a, 31b and 31c so as to be transmitted through the R, G and B signal output terminals 32a, 32b and 32c.

The video signals transmitted from the video processor 3 are stored or reproduced by the image filing unit 5 or the like. The image filing unit 5 includes the program for performing the foregoing image process set therein so that the image obtained by the endoscope can be converted into an image subjected to the pseudo color process by inputting parameters, such as the predetermined range of the subject quantity and the number of gradations. In this embodiment, the image process for displaying the quantity of hemoglobin in the pseudo color display manner is performed.

The region in the vicinity of 580 nm, to which the G image corresponds, is a wavelength region in which hemoglobin exhibits a great absorbance, while the region in the vicinity of 805 nm, to which the B (that is, I) image corresponds, is a wavelength region in which blood displays a small absorbance. Therefore, the quantity of hemoglobin can be obtained by performing an inter-image calculation of the two images (process step (2) and step S12 shown in FIG. 5).

The thus-obtained quantity of hemoglobin within the predetermined range of the subject quantity established by setting the parameters is displayed in the pseudo-color manner. First, a discrimination is, in accordance with the quantity of hemoglobin, made whether or not the pixel is a pixel within the predetermined range of the subject quantity or whether or not the same is a pixel outside the predetermined range of the subject quantity (process step (3) or step S13).

The pixel discriminated to the pixel within the predetermined range of the subject quantity is normalized to the obtained hemoglobin quantities 0 to 32 (process step (5) and step S15). Then, the pseudo color data items corresponding to the normalized quantities of hemoglobin are read out so as to be respectively substituted into R'(i,j), G'(i,j) and B'(i,j) (process step (6) and step S16).

The quantity of hemoglobin outside the predetermined range of the subject quantity is processed in such a manner that the data items about outside the predetermined range of the subject quantity are substituted into R'(i,j), G'(i,j) and B'(i,j) (process step (7) and step S17 and process step (8) and step S18).

An image obtained due to the foregoing process is displayed on the monitor 4 or transmitted to the image filing unit 5 or the like so as to be recorded.

FIG. 6(*a*) illustrates an example of a display realized due to a conventional image process (in a case where the image process according to this embodiment is not employed). In the pseudo color, 32 colors are usually assigned in order to realize smooth change of colors. In an example case where pink is assigned to the maximum value of the predetermined range of the subject quantity and blue is assigned to the minimum value of the predetermined range of the subject quantity, values from the maximum value to the minimum value of the predetermined range of the subject quantity are pink, red, yellow, green, cyan and blue in descending order.

As a result, the same color for the maximum value of the predetermined range of the subject quantity is undesirably assigned to a portion larger than the maximum value of the predetermined range of the subject quantity. Therefore, clear distinguish cannot be made that the value is outside the predetermined range of the subject quantity or that is a value adjacent to the maximum value within the predetermined range of the subject quantity. Also a value adjacent to the minimum value within the predetermined range of the subject quantity encounters a similar problem.

FIG. 6(*b*) illustrates an image displayed on the monitor 4 due to the image process performed by the method according to this embodiment. Pixels outside the predetermined range of the subject quantity are assigned to a color so as to be clearly distinguished from the pixels within the predetermined range of the subject quantity.

As a result, a portion outside the predetermined range of the subject quantity is displayed in achromatic color such as gray so that the portion within the predetermined range of the subject quantity and the portion outside the predetermined range of the subject quantity can clearly be distinguished from each other even in the pseudo color process in which colors are changed smoothly. According to this embodiment, the possibility of erroneous recognition can therefore be reduced between a portion outside the predetermined range of the subject quantity and a portion within the predetermined range of the subject quantity adjacent to the boundary. Therefore, a processed image that can adequately be adapted in an observation of an image within the predetermined range of the subject quantity can be obtained.

Since an image environment which enables the user to pay attention to only the subject portion, diagnosis of a portion within the predetermined range of the subject quantity can easily be performed.

Although this embodiment is arranged in such a manner that the portion outside the predetermined range of the subject quantity is displayed in an achromatic color, such as gray, a variety of patterns, such as half-tone pattern, may be employed. In this case, the portion outside the predetermined range of the subject quantity may be displayed so as to be distinguished from ineffective region.

If the portion outside the predetermined range of the subject quantity is processed in such a manner that the portion larger than the maximum value of the predetermined range of the subject quantity and the portion smaller than the minimum value of the predetermined range of the subject quantity are distinguished from each other by means of different colors or different patterns, a clearer pseudo-color processed image can be obtained.

The displaying process according to the present invention is not limited to that employed in the foregoing embodiment. The necessity lies in that at least either of the pixels in the predetermined range and those outside the predetermined range are subjected to the conversion process to change the foregoing correlative relationship between information possessed by the original image and information possessed by the image to be displayed. It is necessary to perform the conversion process to make, different from the original image, at least any one of information items, such as hue, saturation and brightness, possessed by the pixels forming an image of a subject.

The conversion process is exemplified by a process in which the hue of pixels outside the predetermined range is rotated by a predetermined angle. In this case, only the hue is slightly or considerably changed in a state where the brightness and the saturation of the original image are maintained. An extreme hue conversion in the foregoing case is conversion to the hue that cannot be possessed by an image of the endoscope, for example, a process of converting the hue to green or the like on condition that no medication is used.

It might be considered feasible to employ a conversion process in which only the pixels outside the predetermined range are given a predetermined value with respect to the hue of the original image. Another conversion method may be employed in which the pixels are increased or decreased by a predetermined value. Another method may be performed in which both hue and the saturation are subjected to the conversion process.

In a case where the foregoing process for converting the chromaticity (hue and saturation) is performed, a portion of information of the original image is held. As a result of performing the foregoing process, even a portion outside the predetermined range can be distinguished from the predetermined range. Furthermore, the image holds a portion of the information of the original image. Therefore, excessive deterioration in the visual recognizability can be prevented. In addition, the foregoing conversion of a specific pattern and synthesis of the foregoing pattern while remaining a portion of the original image are processed in such a manner that the correlative relationship is made different.

The portion to be subjected to the conversion process may be the portion within the predetermined range of the subject quantity or both portion within the predetermined range of the subject quantity and the portion outside the predetermined range of the subject quantity. Furthermore, pixels outside the predetermined range can be displayed in a state where all information items, such as the brightness, the saturation and the hue are lost, that is, in a state where no information of the original image is reflected. In any case, the present invention requires a fact that the display is performed in such a manner that the portion within the predetermined range and the portion outside the predetermined range of the subject quantity can be distinguished from each other. The degree of leaving the information of the original image may be determined to be suitable to the subject of the diagnosis or to realize easiness of recognition. Therefore, a variety of selections may be adapted.

Figure 7:
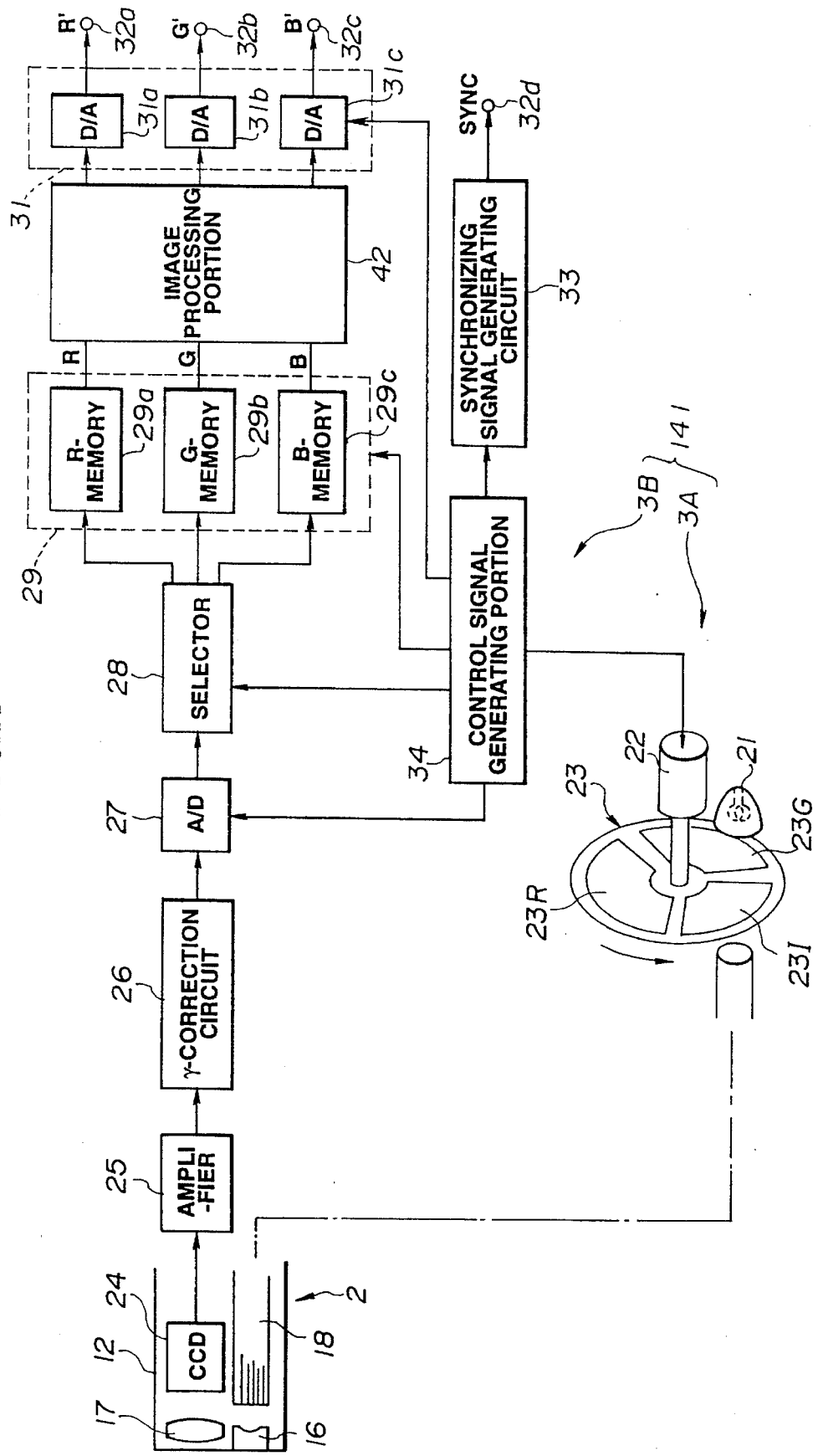
FIGS. 7 and 8 illustrate a second embodiment.
Figure 8:
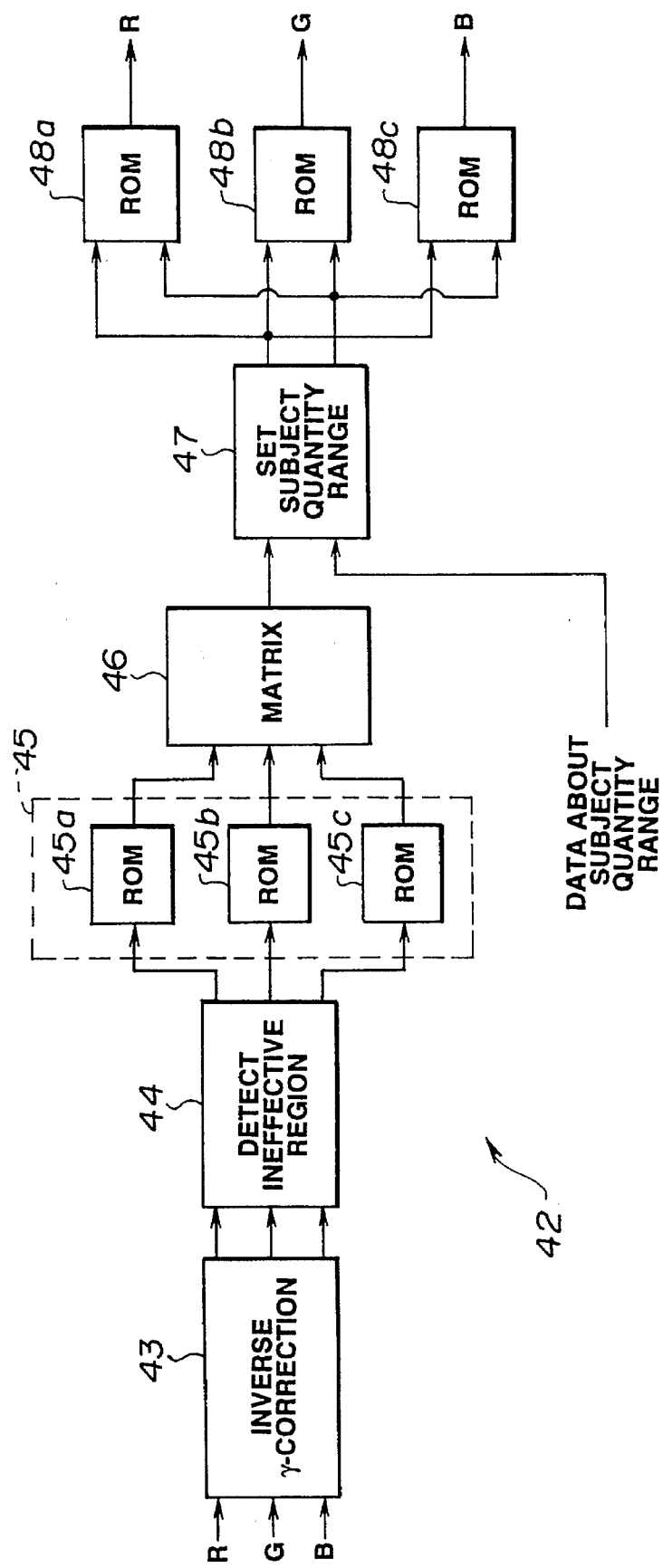

FIGS. 7 and 8 illustrate a second embodiment of the present invention. FIG. 7 is a block diagram which illustrates the structure including a video processor, and FIG. 8 is an explanatory view which illustrates the structure of an image processing portion.

An endoscope image sensing and processing apparatus according to this embodiment has a similar structure as that according to the first embodiment. A video processor 41 according to this embodiment has a structure that an image processing portion 42 is disposed in the video processor 3 shown in FIG. 2.

As shown in FIG. 7, the video processor 41 has the image processing portion 42 at the rearward end of the memories 29a to 29c. An image subject to an image process in the image processing portion 42 is converted into an analog signal by the D/A converters 31a to 31c so as to be transmitted through the R, G and B signal output terminals.

The image processing portion 32 has the structure arranged as shown in FIG. 8.

The R, G and B signals transmitted from the memories 29a to 29c are supplied to an inverse γ-correction circuit 43 so as to be inverse γ-corrected.

The output from the inverse γ-correction circuit 43 is supplied to an ineffective region detection circuit 44 so as to be divided into ineffective regions, such as halation and dark portions, and effective regions in accordance with the levels of the R, G and B signals. The output from the ineffective region detection circuit 44 is supplied to ROMs 45a to 45C forming a logarithmic conversion portion 45 for performing a logarithmic conversion so that the reflection spectral characteristics of the concentration of hemoglobin is made to be substantially the linear relationship.

Data, which has been logarithmically converted, is supplied to a matrix circuit 46 to perform inter-image calculation. The quantity of hemoglobin obtained by the matrix circuit 46 is, together with data about the quantity range, which can be adjusted from outside, supplied to a predetermined range setting circuit 47 for determining the predetermined range for the subject quantity. As a result, the quantity of hemoglobin is divided into data of a portion within the predetermined range of the subject quantity and data outside the predetermined range of the subject quantity.

The data about the quantity of hemoglobin transmitted from the subject quantity range setting circuit 47 is, together with data for discriminating the subject range also transmitted from the subject quantity range setting circuit 47, supplied to ROMs 48a to 48c. If the quantity of hemoglobin of the pixels, which is the subject, is included in a predetermined range of the subject quantity, it is converted into pseudo color data. If the quantity of hemoglobin of the pixels, which is the subject, is on the outside of the predetermined range of the subject quantity, it is converted into color data representing that it is outside the predetermined range of the subject quantity. The pixel data items, which have respectively been converted as described above, are converted into analog signals by the D/A converters 31a to 31c disposed in the video processor 41, and then transmitted through the R, G and B signal output terminals 32a to 32c.

The image subjected to the pseudo color process in the image processing portion 42 is displayed on the monitor 4 and/or recorded in the image filing unit 5 or the like.

Although data is converted by using the ROM, the data converting ROM, the ineffective region detection circuit and the subject quantity range setting circuit may be replaced by a field programmable gate array (FPGA) or the like.

According to this embodiment, a similar effect obtainable from the first embodiment can be obtained such that data outside the predetermined range of the subject quantity can be displayed while being assuredly distinguished from data within the predetermined range of the subject quantity. The arrangement made in such a manner that data larger than the maximum value of the predetermined range of the subject quantity and data smaller than the minimum value of the predetermined range of the subject quantity are displayed as to be mutually distinguished from each other will enable values of data items outside the predetermined range of the subject quantity to be discriminated. Therefore, a process image that enables the diagnosis to be performed easier.

Although the second embodiment is arranged in such a manner that setting of the predetermined range of the subject quantity is performed on the outside, another arrangement may be employed in which the predetermined range of the subject quantity is set in accordance with the result of calculations, for example, the average value or in which a predetermined range of the subject quantity, which has been previously set, is used.

Then, discrimination will be made about a third embodiment of the present invention in which the average value is obtained as a result of calculations to set the predetermined range of the subject quantity.

Figure 9:
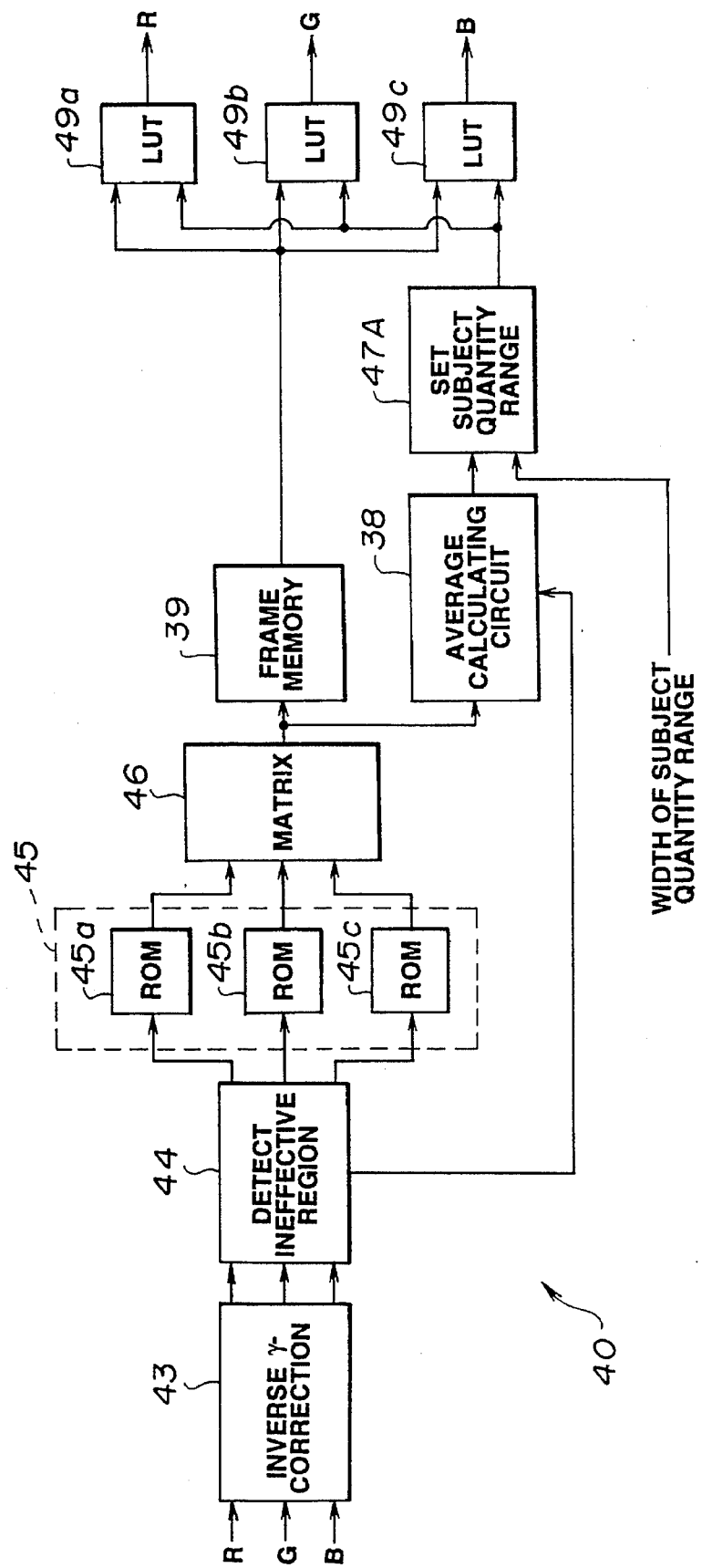
FIG. 9 is a block diagram which illustrates an image processing portion according to a third embodiment.

FIG. 9 is a block diagram which illustrates an image processing portion according to the third embodiment of the present invention.

An endoscope image sensing and processing apparatus according to this embodiment has a similar arrangement as that according to the second embodiment, and therefore figures and descriptions about the overall structure of this embodiment are omitted. Then, the description will be made about only different portions. Referring to FIG. 9, similar structures and operations to those according to the second embodiment are given the same reference numerals, and their descriptions are omitted here.

An image processing portion 40 according to the third embodiment is employed in place of the image processing portion 42 according to the second embodiment, the image processing portion 40 having a different structure for setting the predetermined range of the subject quantity. The image processing portion 40 has a structure for setting the predetermined range of the subject quantity by using the average value of the subject quantity in an image.

The output from a matrix circuit 46 shown in FIG. 9 is transmitted to an average value calculating circuit 38 and a frame memory 39. The frame memory 39 holds image data until the average value of the calculated values for one frame, the image data being then transmitted to a subject quantity range setting circuit 47A. In the subject quantity range setting circuit 47A, data about the range (rated width) of the subject quantity is made in accordance with the width of the range of the subject quantity, the center of which is the average value calculated in the average value calculating circuit 38, the made data about the range of the subject quantity being transmitted to LUTs (Look Up Tables) 49a to 49c. The predetermined range of the subject quantity can be set in accordance with, for example, the width defined by hemoglobin quantity a set toward the upper limit from the average value serving as the reference value and hemoglobin quantity b set toward the lower limit from the average value. As an alternative to this, the predetermined range may be set to be a value larger than the average value serving as the rated value or smaller than the average value.

In the LUTs 49a to 49c, portion outside the predetermined range of the subject quantity is converted into image data masked in achromatic color, such as gray, in accordance with data of the calculated value transmitted from the frame memory 39 and data about the range of the subject quantity transmitted from the subject quantity range setting circuit 47A.

According to this embodiment, a similar effect obtainable from the second embodiment can be obtained. Since the predetermined range of the subject quantity is set by using the average value as the reference (or the center), flexible adaptation can be realized even if the calculated value varies for each image.

The present invention is not limited to the foregoing embodiment. Another structure may be employed in which the image processing portion is formed independently so as to be formed into an image processing unit. As an alternative to this, the image processing portion 42 may be disposed in the image filing unit 5.

The present invention is not limited to the adaptation to the pseudo color process, but the same may be adapted to a case where monotone display is performed.

Figure 10:
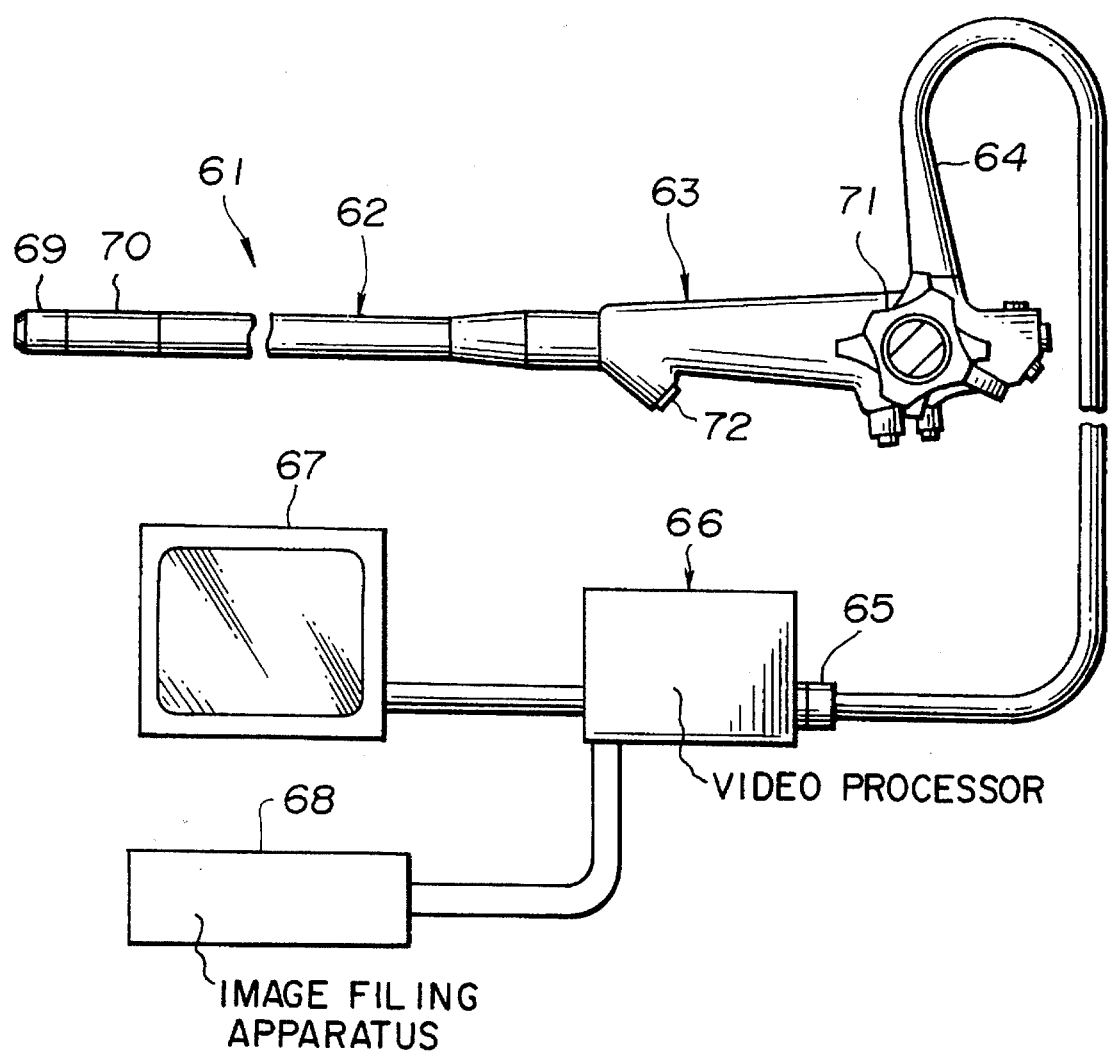
FIGS. 10 to 14 illustrate a fourth embodiment.
Figure 10:
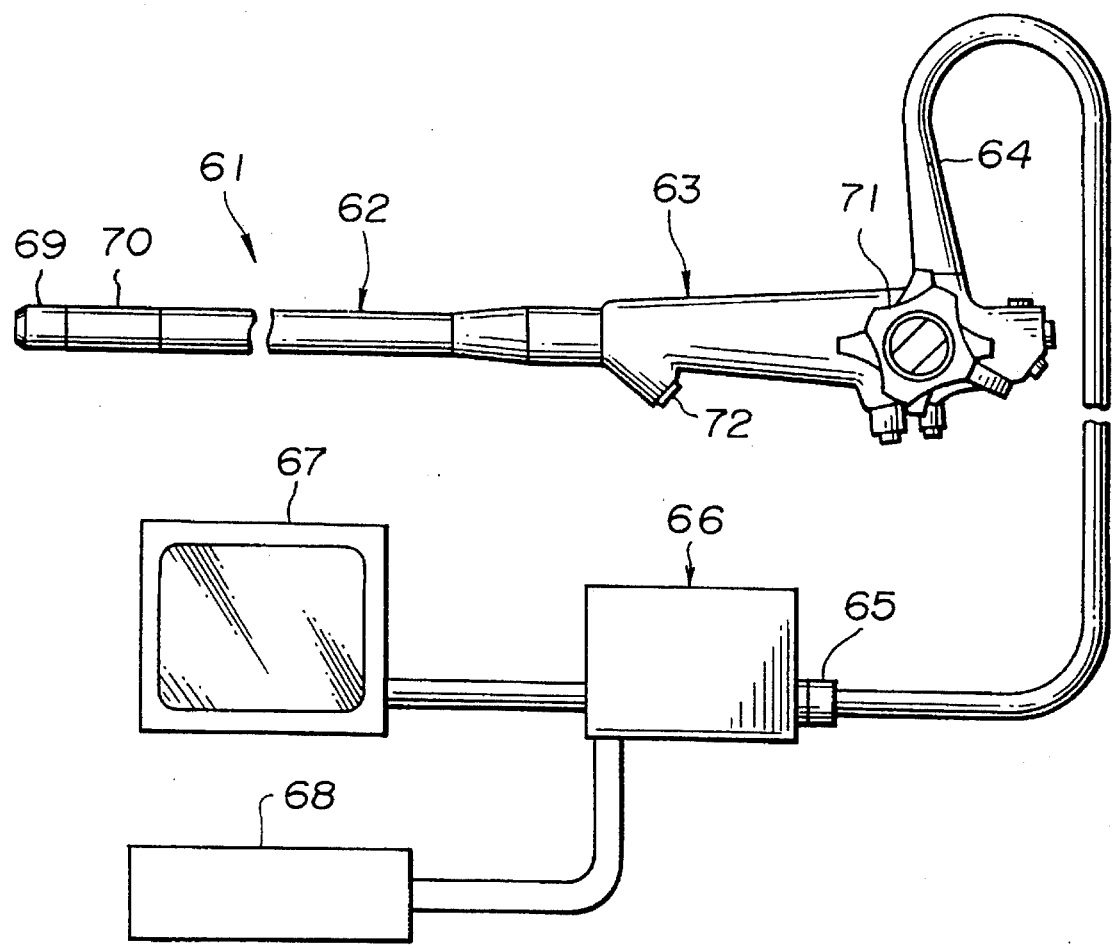
Figure 11:
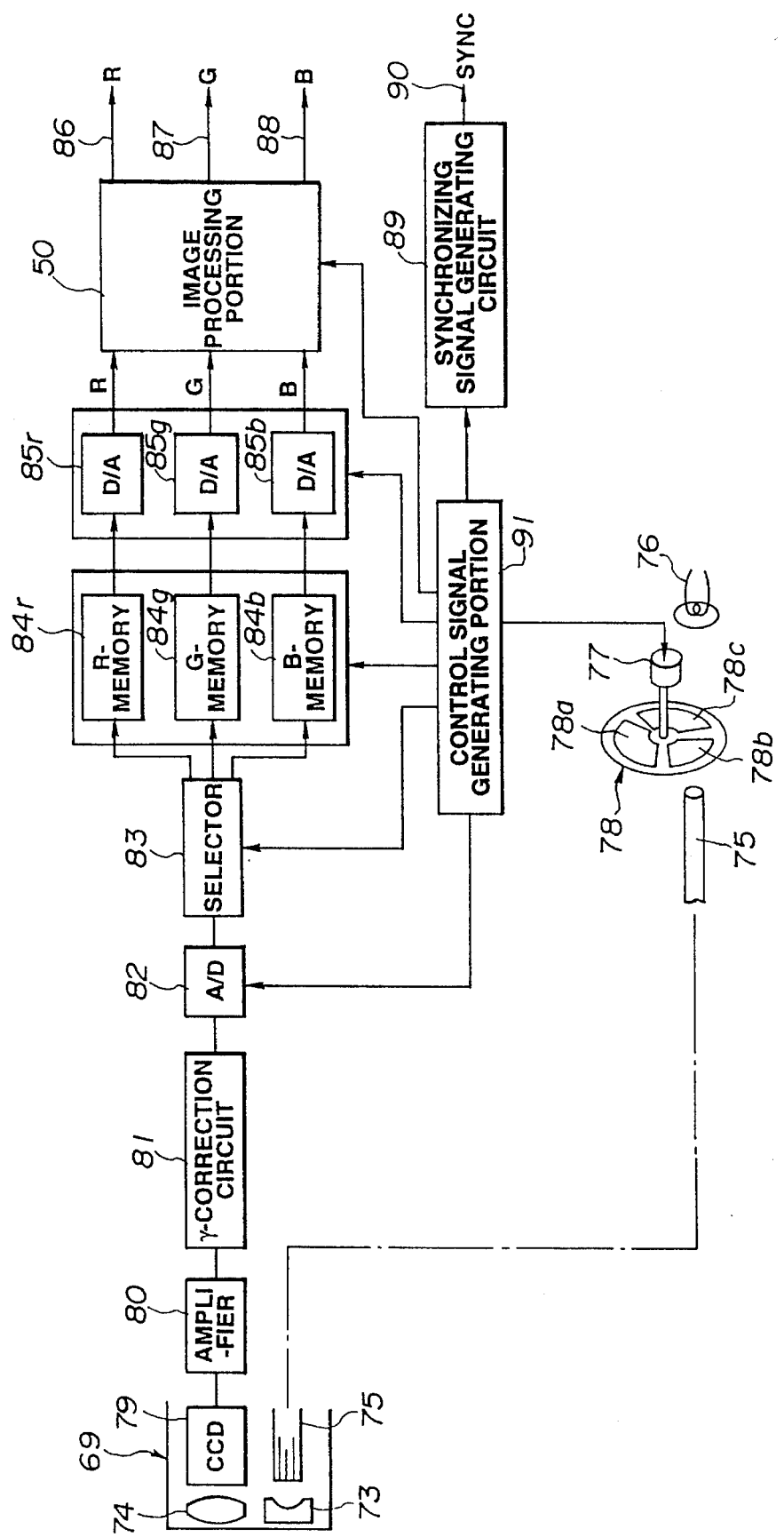
Figure 12:
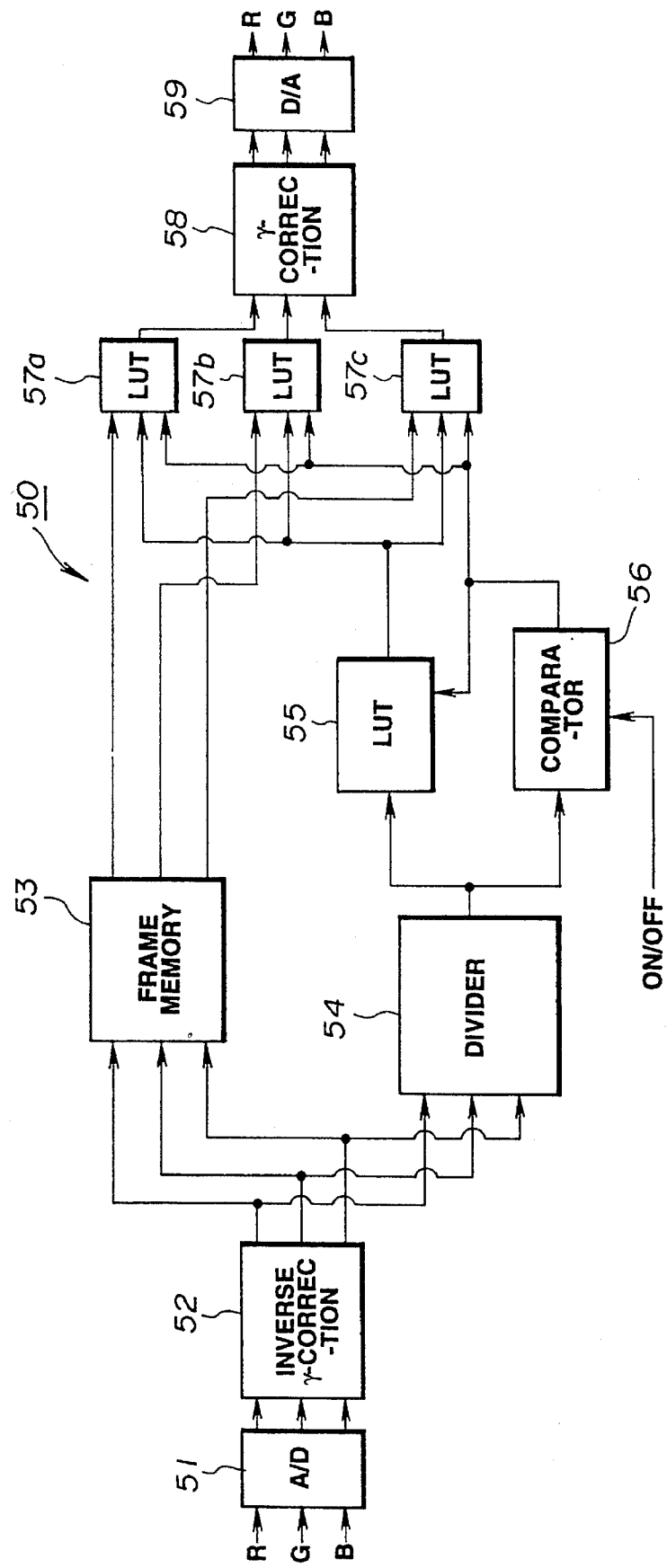
Figure 13:
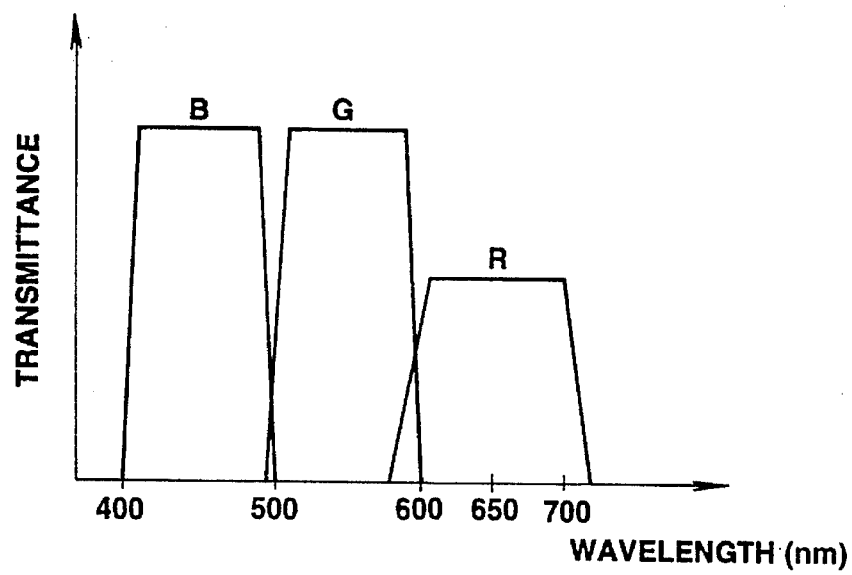
Figure 14:
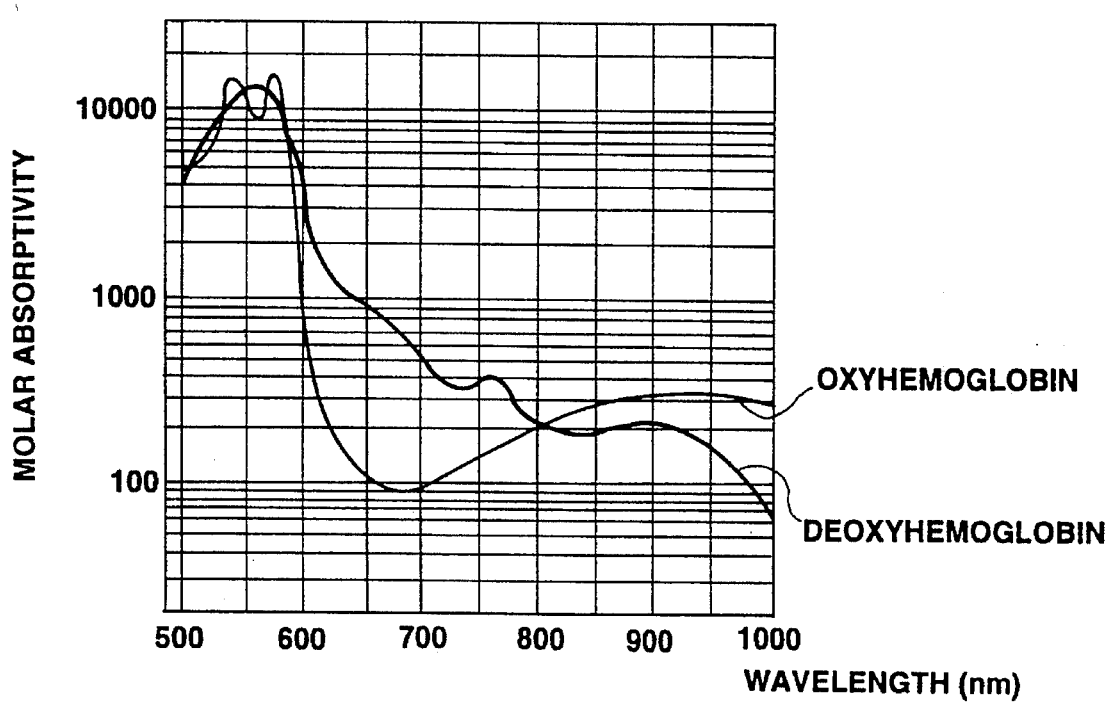

FIGS. 10 to 14 illustrate a fourth embodiment of the present invention. FIG. 10 is a structural view which illustrates the overall body of an endoscope image sensing and processing apparatus. FIG. 11 is a block diagram which illustrates the structure of the endoscope image sensing and processing unit. FIG. 12 is a block diagram which illustrates the structure of an image processing portion. FIG. 13 is an explanatory graph which illustrates the transmission wavelength region of each filter of a rotary filter. FIG. 14 is a graph which illustrates the absorption spectrum of each of oxyhemoglobin and deoxyhemoglobin.

The endoscope image sensing and processing apparatus according to this embodiment is arranged in such a manner that a predetermined range of the degree of oxygen saturation is set as the subject quantity to cause the portion within the predetermined range and the portion in which said subject quantity calculated by said calculating means is outside the predetermined range to be displayed differently from each other by, for example, a color saturation intensifying process.

The endoscope image sensing and processing apparatus according to this embodiment, as shown in FIG. 10, comprises an electronic endoscope 61. The electronic endoscope 61 has an elongated and, for example, flexible, insertion portion 62. A control portion 63 having a large diameter is connected to the rear end of the insertion portion 62. Further, a flexible universal cord 64 is extended from the side portion of a portion adjacent to the rear end of the control portion 63, the universal cord 64 having a connector 65 at an end thereof. The electronic endoscope 61 can be connected to a video processor 66 through the connector 65, the video processor 66 including a light source unit 3A and a signal processing circuit. Moreover, a monitor 67 and an image filing apparatus 68 can be connected to the video processor 66.

In the leading portion of the insertion portion 62, a hard leading section 69 and a warp-enabled portion 70 disposed adjacently in the rear of the leading section 69 are located sequentially. By turning a warp controlling knob 71 disposed in a control portion 63, the warp-enabled portion 70 can be warped laterally or vertically. The control portion 63 has an insertion port 72 communicated with a treatment tool channel formed in the insertion portion 62.

As shown in FIG. 11, the leading section 69 has a light distributing lens 73 and an imaging optical system 74 disposed therein. A light guide 75 comprising a fiber bundle is connected to the rear end of the light distributing lens 73, and the light guide 75 is allowed to pass through the insertion portion 62, the control portion 63 and the universal cord 64 so that the light guide 75 is connected to the connector 65. By connecting the connector 65 to the video processor 66, irradiating light emitted from the light source unit disposed in the video processor 66 is made incident upon the incident port of the light guide 75.

The light source unit comprises a lamp 76 and a rotary filter 78 disposed in the irradiation light passage of the lamp 76 and arranged to be rotated by a motor 77. The lamp 76 emits light ranged from ultraviolet rays to infrared rays. The rotary filter 78 includes filters 78a, 78b and 78c permitting light beams mutually having different wavelength to pass through, the filters 78a, 78b and 78c being disposed in the circumferential direction of the rotary filter 78. The rotary filters 78a, 78b and 78c have the characteristics which correspond to the R, G and B characteristics shown in FIG. 13. Light emitted from the lamp 76 is time-sequentially separated into the foregoing wavelength regions by the rotary filter 78, and then the light is made incident upon the incident terminal of the light guide 75. The irradiating light is guided to a leading section 69 by the light guide 75 so as to be emitted through the surface of the leading end of the leading section 69, the irradiating light being then allowed to pass through the light distributing lens 73 so that the subject is irradiated with the irradiating light.

On the other hand, for example, a CCD 79, which is a solid image sensing device serving as the image sensing means, is disposed at the imaging position of the imaging optical system 74. The image of the subject irradiated with the foregoing field sequential irradiating light is imaged by the imaging optical system 74, the image of the subject being then converted into an electric signal by the CCD 79. The video signals obtained from the CCD 79 are received by an amplifier 80 to be amplified to electric signals included in a predetermined range (for example 0 to 1 V). The electric signals transmitted from the amplifier 80 are γ-corrected by a γ-correction circuit 81, and then converted into digital signals by an A/D converter 82. The digital signals are received by a selector 83 having one input port and three output ports. R, G and I signals transmitted time-sequentially are separated into R, G and I signals by the selector 83 so as to be stored in memories 84r, 84g and 84b corresponding to R, G and B, the memories 84r, 84g and 84b being disposed in a memory portion 84. Image signals read from the memories 84r, 84g and 84b are respectively converted into analog signals by D/A converters 85r, 85g and 85b so as to be supplied to an image processing portion 50 which is an image processing unit. The image processing portion 50 is able to transmit unchangeably the received analog R, G and B signals or subject the predetermined range of the subject quantity to an intensifying process.

The outputs from the image processing portion 50 are transmitted through R, G and B signal output terminals 86, 87 and 88. Further, together with the R, G and B signals transmitted from the image processing portion 50, synchronizing signal SYNC generated in a synchronizing signal generating circuit 89 is transmitted through a synchronizing signal output terminal 90.

The foregoing R, G and B signals and the synchronizing signal can be received by the monitor 67 and the image filing apparatus 68 or the like.

The apparatus according to this embodiment has a control signal generating portion 91 for controlling the destination of the image signals and the timing at which the image signals are transferred, the control signal generating portion 91 being arranged to transmit control signals to the A/D converter 82, the selector 83, the memories 84r, 84g and 84b, the D/A converters 85r, 85g and 85b, the synchronizing signal generating circuit 89, the motor 77 and the image processing portion 50.

FIG. 12 is a block diagram which illustrates the structure of the image processing portion 50. The R, G and B signals received by the A/D converter 51 are converted into digital signals, and then the digital signals are transmitted to an inverse γ-correction circuit 52. Since a predetermined γ-correction has been performed in the foregoing γ-correction circuit 81, the inverse γ-correction circuit 52 suspends the γ-correction effected on the received signals. The outputs from the inverse γ-correction are supplied to the frame memory 53 and a subtractor 54.

The subtractor 54 receives the R, G and B signals to obtain R/G or R/B to transmit the result of this calculation to a LUT 55 and a comparator 56. The ratio R/G or R/B obtained in the subtractor 54 is a value correlated to the degree of oxygen saturation of hemoglobin. The value correlated to the degree of oxygen saturation of hemoglobin and supplied to the comparator 56 is subjected to a discrimination whether or not it is included in the predetermined range of the subject quantity set from the outside or stored inside, the results of the discrimination being transmitted to the LUTs 55, 57a, 57b or 57c.

In the LUT 55, the pixels having the degree of oxygen saturation of hemoglobin within the predetermined range are converted into values to serve as indexes of conversion of the color saturation to be performed in the LUTs 57a, 57b and 57c. The conversion to the index values is performed in such a manner that, for example, a reference degree of oxygen saturation of hemoglobin is previously set and a pixel having a degree of oxygen saturation of hemoglobin higher than the reference value is converted to raise the color saturation. A pixel having a low degree of oxygen saturation of hemoglobin is converted to lower the color saturation. The output from the LUT 55 is supplied to the LUTs 57a to 57c. The reference degree of oxygen saturation of hemoglobin is previously stored in the LUT 55.

In the LUTs 57a to 57c, the color saturation of the original image, the timing of which has been adjusted by the frame memory 53, is converted. The pixels discriminated by the comparator 56 to be the pixels outside the predetermined range are subjected to a masking process with a color, such as achromatic color exemplified by gray, that is not present in the actual image of the endoscope. On the other hand, the image having the portion within the subject range, which has been masked, is converted in accordance with the value supplied from the LUT 55 and serving as an index for the conversion of the color saturation in such a manner that the pixel having the highest degree of oxygen saturation of hemoglobin is expressed in white and the pixel having the lowest degree of oxygen saturation of hemoglobin is expressed in red. The converted and intensified images are supplied to a γ-correction circuit 58 so as to be subject to a predetermined γ-correction. The outputs from the γ-correction circuit 52 are supplied to the D/A converter 53 so as to be converted into analog signals. The outputs from the γ-correction circuit 58 are supplied to the D/A converter 59 so as to be converted into analog signals, and then transmitted through the R, G and B signal output terminals 86, 87 and 88.

The operation of this embodiment will now be described with reference to the drawings.

Light emitted from the lamp 76 and ranging from ultraviolet light to the infrared rays is made incident upon the rotary filter 78 which is rotated by the motor 77. The rotary filter 78 has, as described above, the R, G and B filters respectively having the light transmission characteristics shown in FIG. 13.

The R filter serving as a first wavelength separating means and a second wavelength separating means permits passing of red light including a region adjacent to 650 nm, at which the reflection spectrum characteristics are changed considerably due to the change in the degree of oxygen saturation of hemoglobin as compared with that in the regions of the G and B filters which permit light to pass through. Since the R filter has a transmission wavelength region wider than that of each of the G and B filters, the quantity of received light becomes too large, and therefore red is saturated undesirably. Therefore, the transmissivity of the R filter is lowered with respect to that of each of the G and B filters so that the saturation of red is prevented. It should be noted that the G and B filters constitute the first wavelength separating means.

Light emitted from the lamp 76 is time-sequentially decomposed into light beams having wavelengths corresponding to the foregoing filters 78a, 78b and 78c so as to be allowed to pass through the light guide 76 so that the decomposed light beams are introduced into the coelom. As a result, the introduced light beams are, as irradiating light, applied the inner surface of the coelom. The image of the subject obtained due to the respective irradiating light beams is imaged on the CCD 79 by the imaging optical system 74 so as to be converted into electric signals. The output signals from the CCD 79 are amplified by the amplifier 80 and converted, by the γ-correction circuit 81, to have predetermined γ-characteristics. The outputs from the γ-correction circuit 81 are, by the A/D converter 82, converted into digital signals so as to be allowed to pass through the selector to be time-sequentially decomposed into respective wavelength. Thus, the decomposed light beams are stored in the memories 84r, 84g and 84b. That is, the selector switches the outputs thereof in synchronization with the rotation of the rotary filter 78.

Video signals read from the memories 84r, 84g and 84b are made simultaneous and converted into analog video signals by the D/A converters 85g, 85g and 85b so as to be transmitted as R, G and B signals.

A fact has been know that the change in the degree of oxygen saturation of hemoglobin changes the reflection spectrum characteristics of hemoglobin, that is, the reflection spectrum characteristics (the absorbance) of blood. The change in the absorbance of the blood occurring due to the change in the degree of oxygen saturation of hemoglobin depends upon the difference between the reflection spectrum characteristics of oxy (oxidized) hemoglobin and those of deoxy (deoxidized) hemoglobin. As shown in FIG. 14, the absorbance of blood is, near the wavelength of 650 nm, changed considerably due to the change in the degree of oxygen saturation of hemoglobin. Therefore, irradiation with light having the wavelength including the foregoing region in the vicinity of the wavelength of 650 nm enables an image, from which the change in the degree of oxygen saturation of hemoglobin can be observed, to be obtained. That is, this embodiment is arranged in such a manner that light passed through the R filter is light having the wavelength region including the wavelength of 650 nm.

Thus, light which has passed through the R filter and including light having the wavelength of 650 nm is used to irradiate the inner surface of the coelom, and an image obtained due to reflected light is stored in the R memory 84r. That is, the image stored in the R memory 84r contains image information on which the change in the absorbance of blood is reflected considerably. Since the change in the absorbance of blood depends upon the change in the degree of oxygen saturation of hemoglobin, the change of the degree of oxygen saturation of hemoglobin causes the image updated in the R memory 84r to be made in accordance with the foregoing change.

The comparator 56 in the image processing portion 50 having the function which can be activated/deactivated from the outside. When the function is deactivated, the LUTs 57a to 57c are able to unchangeably transmit the output from the frame memory 53.

Therefore, the R, G and B images made simultaneous by the R, G and B memories 84r, 84g and 84b are unchangeable color-displayed on the monitor 67 and recorded in the image filing unit 68.

As described above, according to this embodiment, the change in the degree of oxygen saturation of hemoglobin can be detected even if a visual observation is being performed. Therefore, physically changed portion caused by a disease, in which the degree of oxygen saturation of hemoglobin, that is, the degree of saturation of oxygen in the blood, is changed considerably can clearly be discriminated while detecting fine changes in the colors occurring during the visual observation. As a result, the diagnosing ability can be improved.

The operation in a case where the intensifying process is performed by the image processing portion will now be described.

The comparator 56 is turned on. The images corresponding to the respective wavelength regions taken by the CCD 79 are supplied to the image processing portion 50 so that the ratio of the R and G signals or that of the R and B signals, that is, a value correlating to the degree of oxygen saturation of hemoglobin is calculated. The result of the calculation is, in the comparator, subjected to a process in which the result is discriminated whether or not it is within the subject range. If the result is included in the foregoing range, it is, in the LUT 55, converted into the index for performing the intensifying process. Further, the color saturation of only the pixels discriminated, as the result of the calculations, to be within the subject range is intensified to form a converted image. Thus, the portion within the predetermined range and the portion outside the predetermined range can be displayed differently.

According to this embodiment, an image can be obtained by intensifying the degree of saturation of oxygen of the image taken by the CCD 79. Therefore, the diagnosing ability can be improved as compared with the case where the discrimination of a state where oxygen is being supplied as is done in a physically changed portion caused by a disease can easily be made and therefore no intensifying process is performed. By setting the subject range and by coloring the portion outside the subject range in a color, such as achromatic color, that is not present in the image of the endoscope, the range having the value of the subject degree of oxygen saturation of hemoglobin can clearly be discriminated. Since the color saturation of only the portion within the subject range is converted, the change in the degree of saturation of oxygen can finely and easily be discriminated. By setting a degree of saturation of oxygen which is usually observed in the physically changed portion caused by a disease, the normal portion is masked in achromatic color, such as gray. Therefore, the physically changed portion caused by a disease can easily be discriminated, and accordingly fine information about the state of the physically changed portion caused by a disease can simultaneously be obtained.

Although this embodiment is arranged in such a manner that the digital signals are converted into the analog signals in the endoscope image sensing and processing apparatus to transmit the analog signals to the image processing portion 50, the digital signals may unchangeably be transmitted.

By arranging the structure of the LUT 55 in such a manner that the index value for converting the color saturation can be changed from the outside, the color saturation of a portion, that is not masked, can be adjusted.

Figure 15:
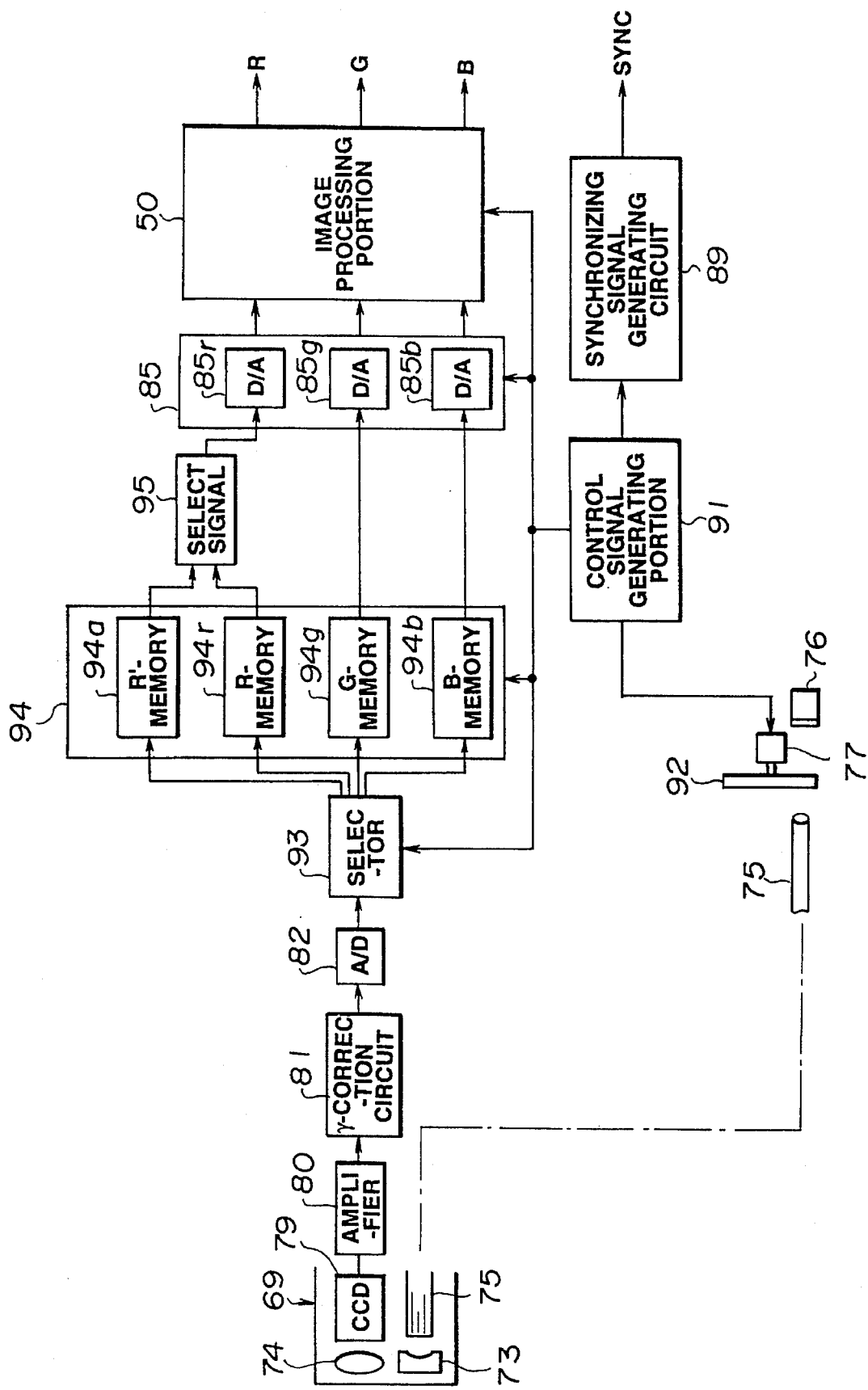
FIGS. 15 to 17 illustrate a fifth embodiment.
Figure 16:
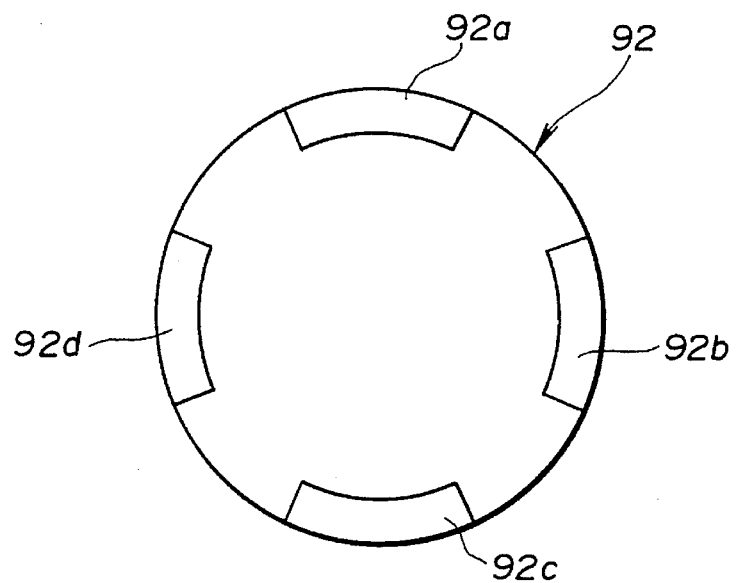
Figure 17:
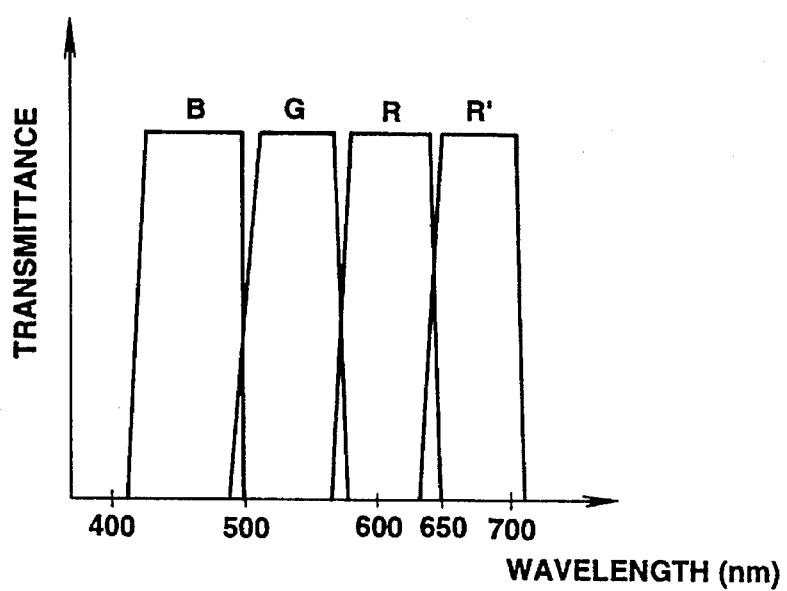

FIGS. 15 to 17 illustrate a fifth embodiment of the present invention. FIG. 15 is a block diagram which illustrates the structure of an endoscope image sensing and processing apparatus. FIG. 16 is an explanatory view which illustrates a rotary filter, and FIG. 17 is an explanatory graph which illustrates transmission wavelength regions of respective filters of the rotary filter.

In this embodiment, a rotary filter 92 arranged as shown in FIG. 16 is disposed in place of the rotary filter 78 according to the fourth embodiment. Further, a selector 93 having one input and four outputs is disposed in place of the foregoing selector 83, a memory 94 is disposed in place of the foregoing memory 84, and a selector 95 is disposed in the rear of the memories 94a and 94r.

In this embodiment, the selector 93, the memory 94 and the selector 95 are disposed in place of the selector 23 and the memories 84r, 84g and 84b according to the fourth embodiment. The selector 93 transmits the supplied signal while switching the same to the memories 94a, 94g, 94g and 94b. The outputs from the memories 94a and 94r are switched by the selector 95 so as to be supplied to the D/A converter 85g.

Similar structures and operations to those of the fourth embodiment are given the same reference numerals and their descriptions are omitted here.

The operation of this embodiment will now be described with reference to FIG. 15.

The rotary filter 92 comprises the filter 92a having the light transmission characteristics as shown in FIG. 17 and serving as the second wavelength separating means and the filters 92b, 92c and 92d serving as the first wavelength separating means so as to time-sequentially separate the irradiating light into four wavelength regions and make it incident on the light guide 75.

The filters 92b, 92c and 92d are filters which permit light to pass through, the light being in a wavelength region, which enables a visual observation to be performed. The filter 92a is a filter which permits light to pass through, the light being in the wavelength region near 650 nm at which the reflection spectral characteristics is considerably changed due to the change in the degree of oxygen saturation of hemoglobin. The images of the subject irradiated with light passed through the filters are stored in the memories 94a, 94r, 94g and 94b. In accordance with an instruction of selection (a select signal) supplied from a changing over switch or the like (omitted from illustration) disposed on a front panel or the like (omitted from illustration), selection is enabled that the observation is performed with the RGB images or the R'GB images. That is, the foregoing select signal causes the selector 95 to select either of the image in the memory 94a or that in the memory 94r.

Video signals read from the memories 94a, 94g and 94b or memories 94r, 94g and 94b are made simultaneous, and then converted into analog signals by the D/A converter 85, the analog signals being then supplied to the image processing portion 50.

The image processing portion 50 transmits R', G and B signals or R, G and B signals when the comparator 56 is turned off.

The image processing portion 50 subjects the subject range to the intensifying process similarly to the fourth embodiment by using the R', G and B signals when the comparator 56 is turned on. As a result, the portion within the subject range and that outside the range can be displayed differently.

According to this embodiment, the use of the R', G and B images will enable an image including information about the degree of oxygen saturation of hemoglobin to be obtained. Further, the conventional RGB images can be used by switching the images to be observed by changing over the changing over switch so that a usual image and an image, on which the information about the degree of oxygen saturation of hemoglobin is reflected, can be observed.

It should be noted that the transmission filter for permitting light adjacent to 650 nm has a narrow band zone as compared with the filter according to the fourth embodiment and accordingly an image sensitive to the change in the degree of oxygen saturation can be obtained.

The residual structures, operations and effects are the same as those of the fourth embodiment, and therefore their descriptions are omitted here.

Figure 18:
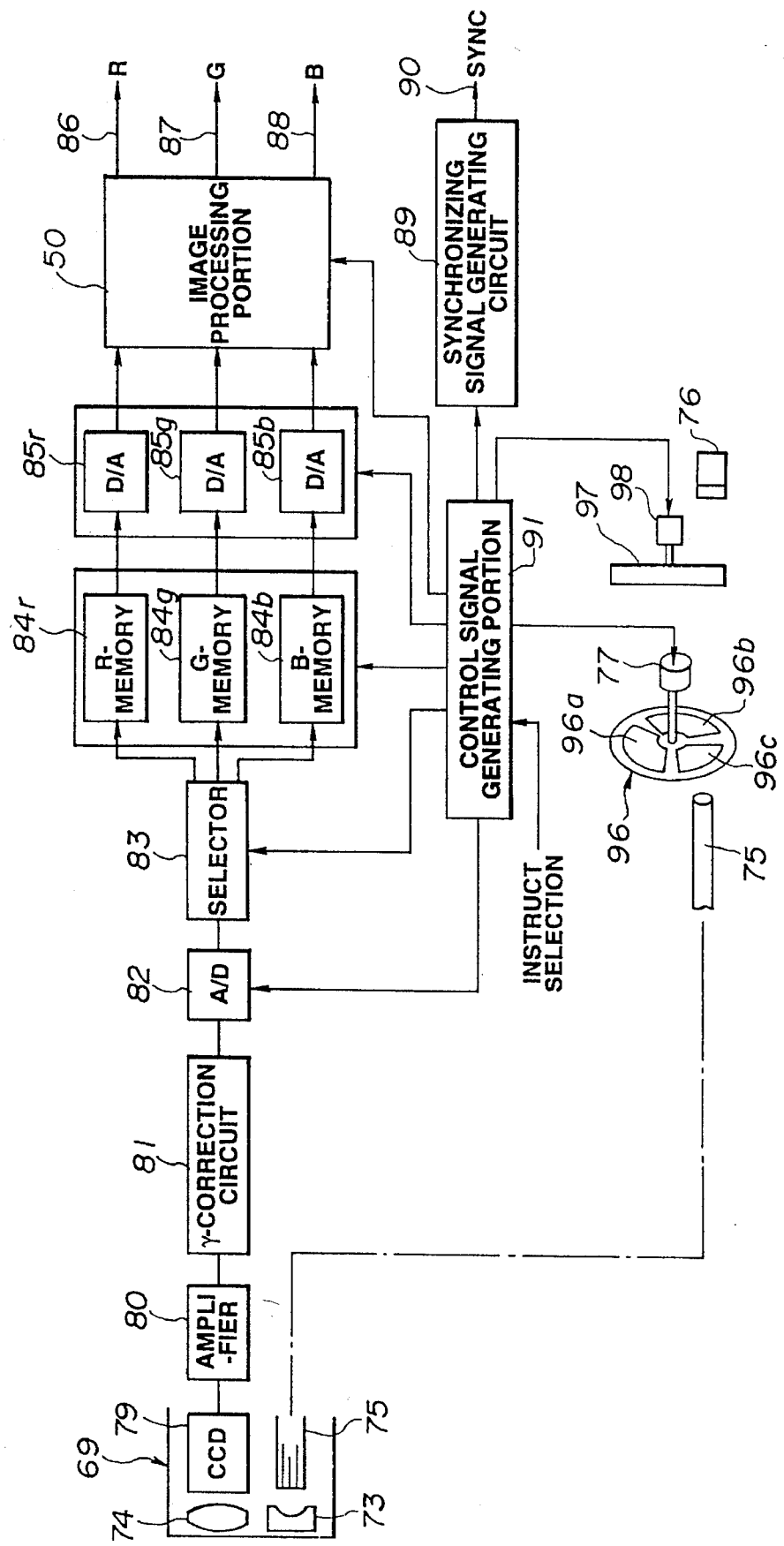
FIGS. 18 to 22 illustrate a sixth embodiment.
Figure 19:
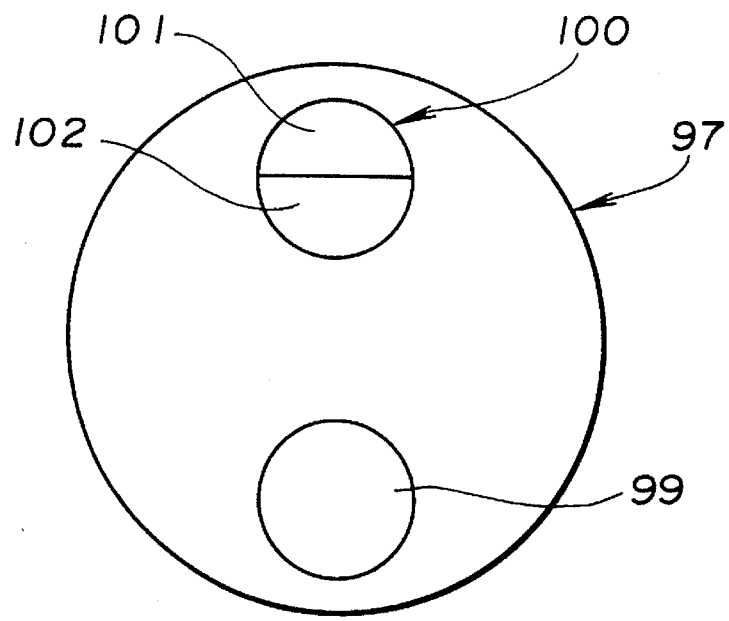
Figure 20:
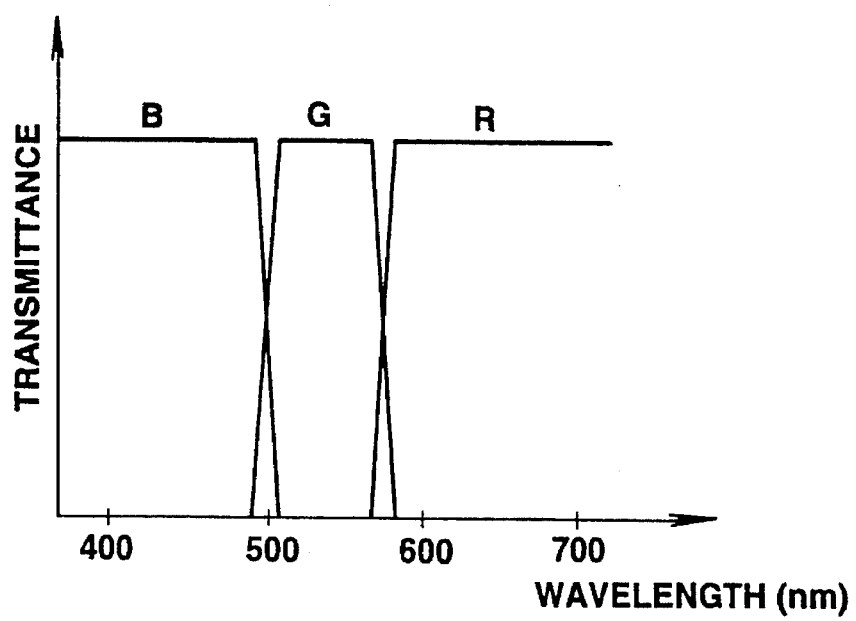
Figure 21:
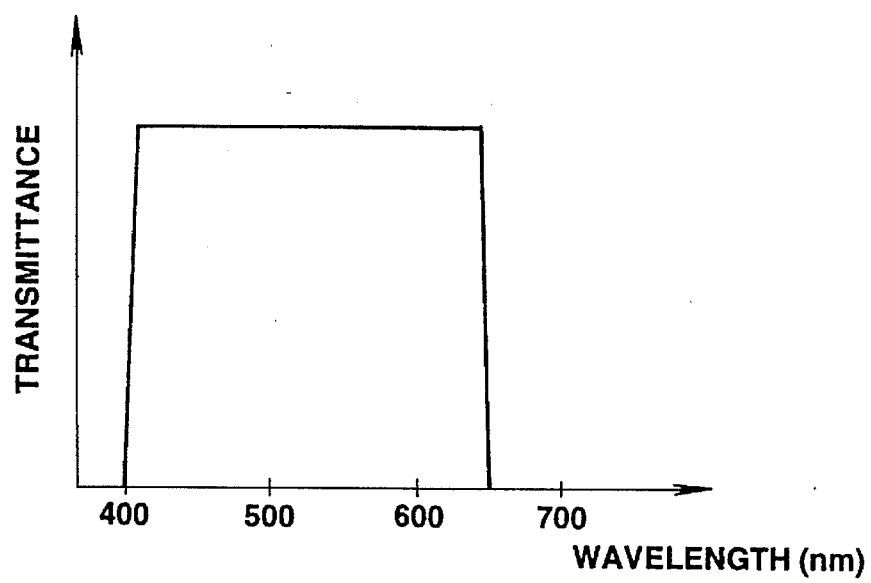
Figure 22:
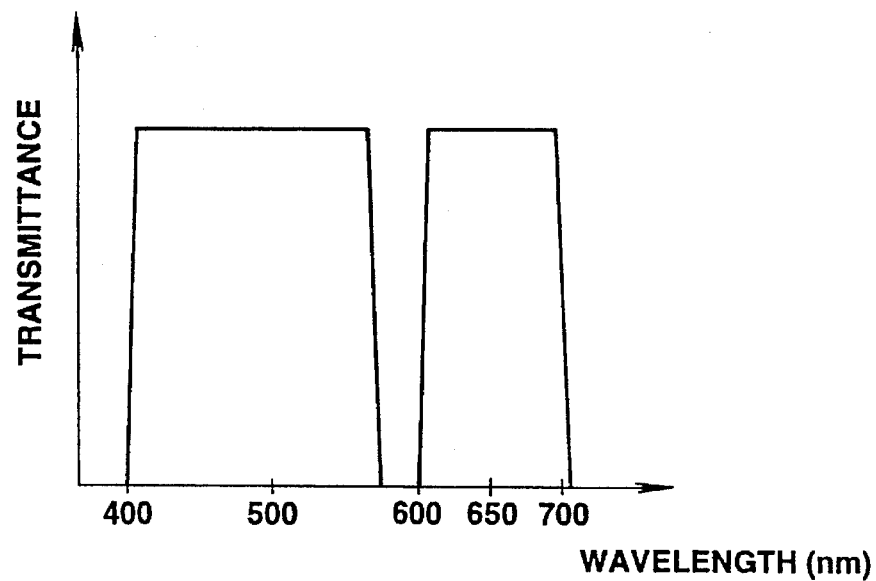

FIGS. 18 to 22 illustrate a sixth embodiment of the present invention. FIG. 18 is a block diagram which illustrates the structure of an endoscope image sensing and processing apparatus. FIG. 19 is an explanatory view which illustrates the structure of a filter turret, and FIG. 20 is an explanatory view which illustrates transmission wavelength regions of filters of a rotary filter. FIG. 21 is an explanatory view which illustrates a transmission wavelength region of a first wavelength region limiting filter. FIG. 22 is an explanatory view which illustrates transmission wavelength regions of a second wavelength region limiting filter.

In this embodiment, a rotary filter 96 having filters 96a, 96b and 96c, which have the transmission wavelength region as shown in FIG. 20, is disposed in place of the rotary filter 78 according to the fourth embodiment, the rotary filter 96 constituting a fist wavelength separating means. Further, a filter turret 97 having the structure as shown in FIG. 19 is inserted into the optical path of the rotary filter 96 on the side facing the lamp.

The filter turret 97 has a first wavelength region limiting filter 99 constituting the first wavelength separating means and a second wavelength region limiting filter 100 constituting the second wavelength separating means. The second wavelength region limiting filter is composed of two filters 101 and 102 and has the transmission wavelength region as shown in FIG. 22.

The filter turret 97 is arranged in such a manner that the first wavelength region limiting filter 99 or the second wavelength region limiting filter 100 is inserted onto the optical path due to the rotation of the motor 98.

Although this embodiment is arranged in such a manner that the second wavelength region limiting filter is composed of the two filters, one filter having the transmission wavelength region as shown in FIG. 22 may be used. Similar structures and operations to those of the fourth embodiment are given the same reference numerals and their descriptions are omitted here.

The operation of this embodiment will now be described with reference to FIGS. 18 to 22.

The rotary filter 96 comprises the filters 96a, 96b and 96c having the transmission characteristics as shown in FIG. 20. However, the filter turret 97 is inserted into a space between the rotary filter 96 and the lamp 76. Therefore, the first wavelength region limiting filter 99 and the second wavelength region limiting filter 100 disposed in the filter turret 97 enable the irradiation to be performed with two types of irradiating light beams.

As shown in FIG. 21, the first wavelength region limiting filter 99 has characteristics which permit light, the wavelength region of which ranges from about 400 nm to about 650 nm. On the other hand, the second wavelength region limiting filter 100 has characteristics which permit light, the wavelength region of which ranges from about 400 nm to about 570 nm and light, the wavelength region of which ranges from about 610 nm to about 700 nm.

In the case where the first wavelength region limiting filter 99 has been disposed on the optical path, light beams in the R, G and B wavelength regions according to the fifth embodiment and as shown in FIG. 17 are used to time-sequentially irradiate the subject. In the case where the second wavelength region limiting filter 100 having the transmission wavelength region as shown in FIG. 22 is inserted onto the optical path, light beams in the R', G and B wavelength regions according to the fifth embodiment and as shown in FIG. 17 are used to time-sequentially irradiate the subject.

When the rotation of the motor 98 is controlled in accordance with an instruction made from a control panel or the like (omitted from illustration), the wavelength region limiting filters can be switched. Therefore, by turning the comparator 56 in the image processing portion 50, observation can performed in this embodiment in such a manner that the RGB images and the R'GB images can be changed over.

The image processing portion 50 enables the subject range to be subjected to the intensifying process to display differently the portion within the subject range and the portion outside the subject range by using the R', G and B signals similarly to the fourth embodiment when the comparator 56 is turned on.

Since the residual operations and effects are similar to those of the fourth and fifth embodiments, their descriptions are omitted here.

Figure 25:
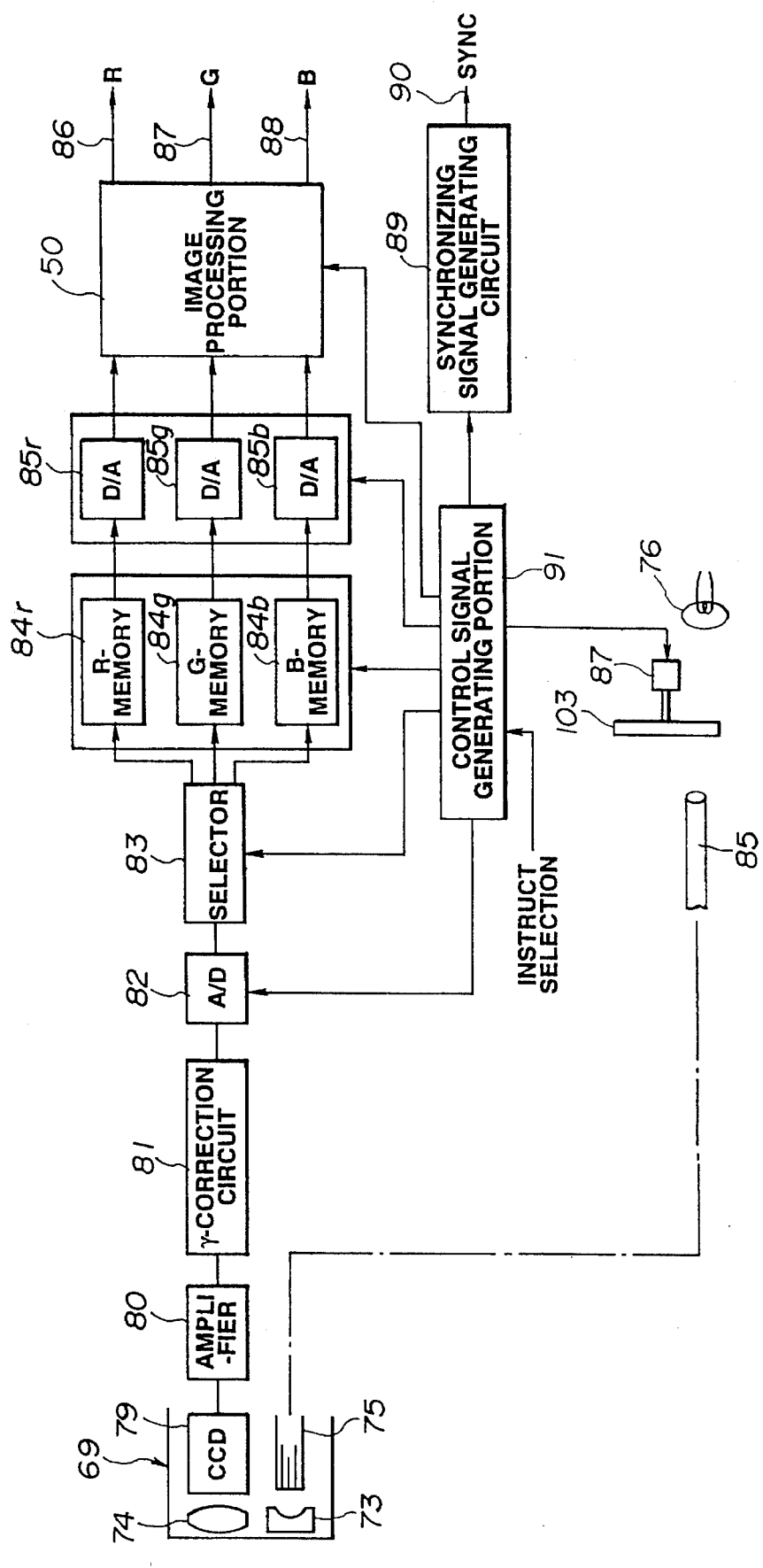
FIG. 25 is a block diagram which illustrates the structure of an endoscope image sensing and processing apparatus.

FIGS. 23(*a*) to 25 illustrate a seventh embodiment of the present invention. FIGS. 23(*a*), 23(*b*) and 23(*c*) are explanatory views which illustrates the structure and the operation of a rotary filter. FIG. 24 is an explanatory view which illustrate the structure of the R and R' filters. FIG. 25 is a block diagram which illustrates the structure of an endoscope image sensing and processing apparatus.

As shown in FIG. 25, the apparatus according to this embodiment comprises a rotary filter 103 having the structure as shown in FIG. 23 in place of the rotary filter 78 according to the fourth embodiment.

The rotary filter 103 has filters 104, 105, 106 and 107 respectively having the transmission wavelength regions according to the fifth embodiment shown in FIG. 17. The filter 104 constituting the first wavelength separating means and the filter 105 constituting the second wavelength separating means are formed into a sector filter 108 as shown in FIG. 24. The first wavelength separating means includes the foregoing filters 106 and 107.

FIG. 23(*a*) illustrates the rotary filter 103 in a state where the R and R' filter 108 formed into the sector is removed. In the foregoing state, the filter 103 has, disposed therein, the G and B filters 106 and 107 and a portion 109 having no filter. Stoppers 110 are disposed on the two sides of the portion 109 having no filter in the circumferential direction, the stoppers 110 being apart from each other by a distance which is the half of the circumferential length of the R and R' filter 108.

As shown in FIGS. 23(*b*) and 23(*c*), the structure is arranged in such a manner that the R and R' filter 108 is able to slid with respect to the rotary filter 103. That is, the structure is arranged in such a way that the R filter 104 or the R' filter 105 faces the filter-less portion 109 in accordance with the direction of the rotation of the rotary filter 103.

Similar structures and operations of the residual portions to those of the fourth embodiment are given the same reference numerals and their descriptions are omitted here.

The operation of this embodiment will now be described with reference to FIG. 23.

Since the rotary filter 103 is a rotary filter having the foregoing structure, it is able to time-sequentially irradiate the subject with irradiating light beams R, G, B and light beams R', G and B having the wavelength regions according to the fifth embodiment as shown in FIG. 17.

When an instruction to irradiate the subject with the light beams in the R, G and B wavelength regions is issued from, for example, the front panel, the rotary filter 103 is rotated counterclockwise as shown in FIG. 23(*b*). As a result, the sector R and R' filter 108 is inclined toward the right so that the R filter 104 is selected. As a result, R, G and B irradiating light beams are sequentially used to irradiate the subject. If a selection has been made that light beams in the R', G and B wavelength regions are used to irradiate the subject, the rotary filter 103 is rotated clockwise as shown in FIG. 23(*c*). As a result, the second R and R' filter 108 is inclined to the left so that the R' filter 105 is selected.

Therefore, the R', G and B irradiating light beams are sequentially applied to irradiate the subject. As a result, when the comparator 56 of the image processing portion 50 is turned off, the observation can be performed in such a manner that the RGB images and the R'GB images are changed over.

When the comparator 56 is turned on, the image processing portion 50 subjects the subject range to the intensifying process by using the R', G and B signals similarly to the fourth embodiment so that the portion in the subject range and the portion outside the range can be displayed differently.

Since the residual operations and effects are similar to those according to the fourth embodiment and the fifth embodiment, their descriptions are omitted here.

Figure 26:
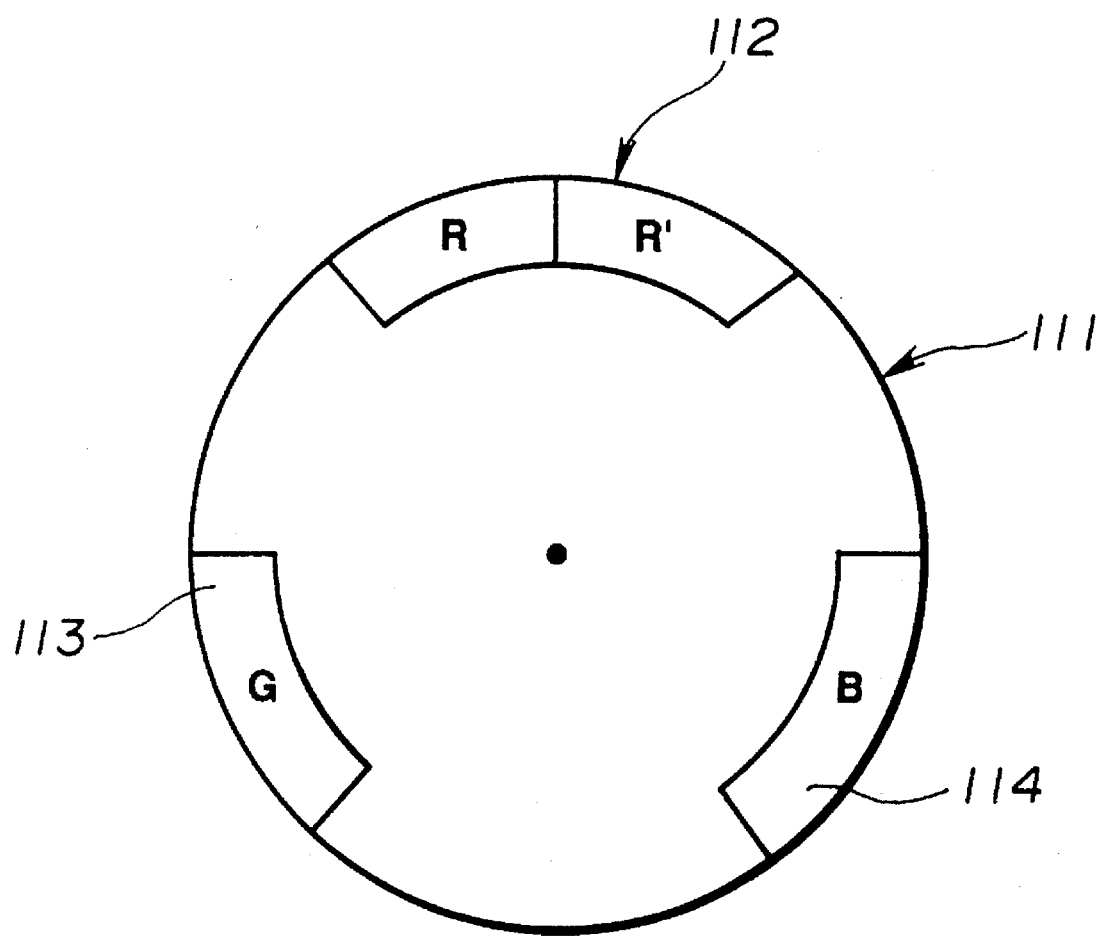
FIGS. 26 to 28 illustrate an eighth embodiment.
Figure 27:
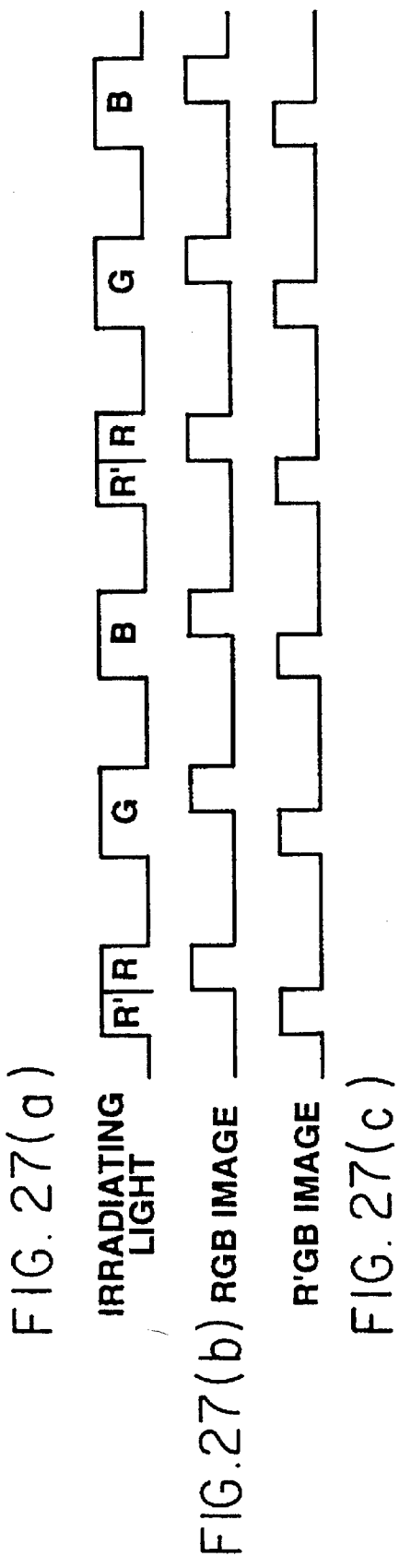
Figure 28:
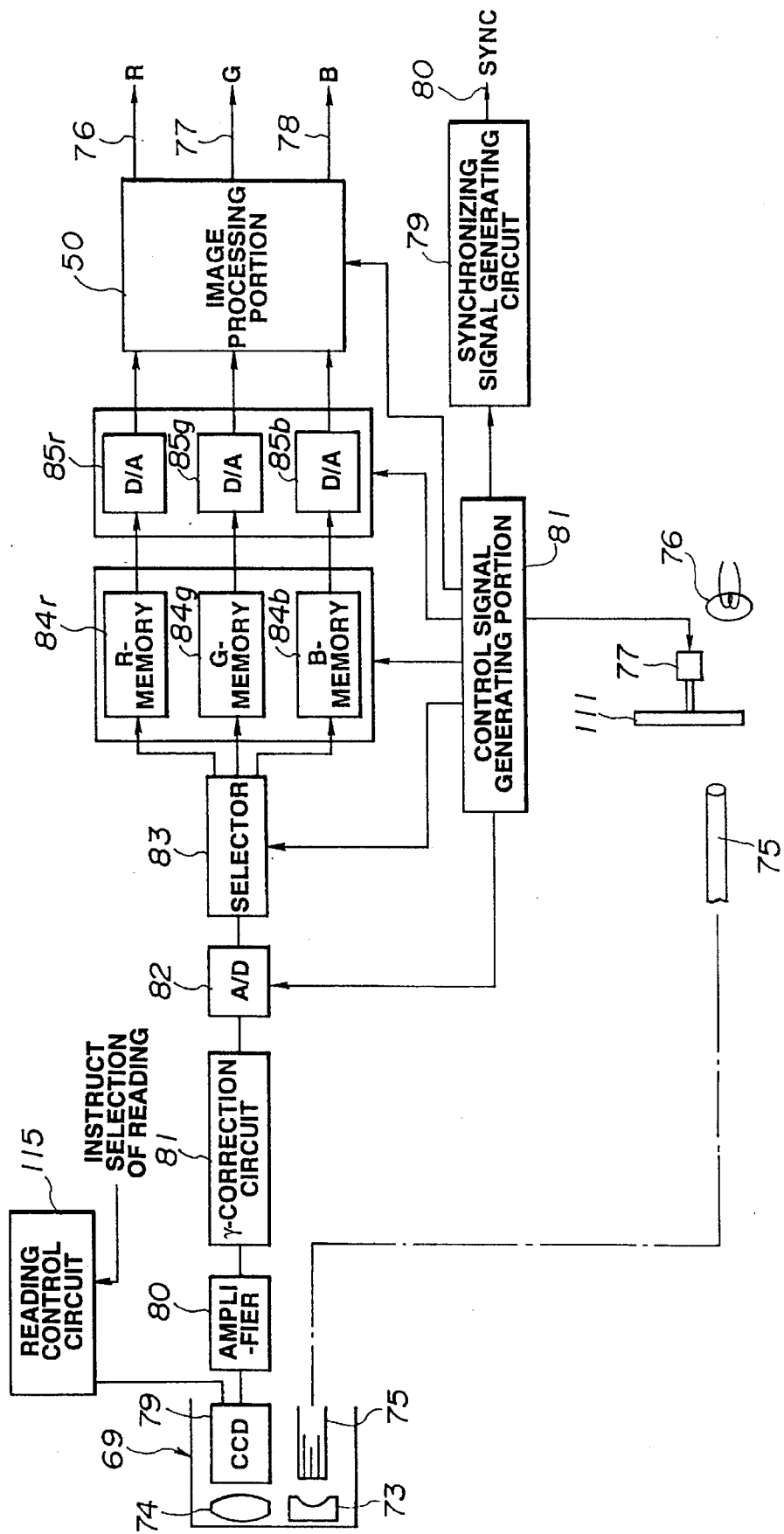

FIGS. 26 to 28 illustrate an eighth embodiment of the present invention. FIG. 26 is an explanatory view which illustrates the structure of a rotary filter. FIG. 27 is a timing chart which explains the operation of this embodiment. FIG. 28 is a block diagram which illustrates an endoscope image sensing and processing apparatus. As shown in FIG. 28, the apparatus according to this embodiment comprises a rotary filter 111 arranged as shown in FIG. 26 in place of the rotary filter 78 according to the fourth embodiment. The rotary filter 111 has filters 112, 113 and 114 having the wavelength transmission characteristics according to the fifth embodiment shown in FIG. 17. The R and R' filter 112 constituting the second wavelength separating means and the first wavelength separating means is formed to have a size which is the half of the size of each of the foregoing G filter 113 and the B filter 114. As shown in FIG. 28, a reading control circuit 115 is connected to the CCD 79. Similar structures to those of the fourth embodiment are given the same reference numerals and their descriptions are omitted here.

The operation of this embodiment will now be described with reference to the timing chart shown in FIGS. 27(*a*), 27(*b*) and 27(*c*).

Irradiating light emitted from the light guide 75 is used to irradiate the subject of inspection at the timing shown in FIG. 27(*a*). The CCD 79 receives light reflected by the subject of the inspection to convert it into an electric signal. The electric signal formed in the CCD 79 is read out under control of the reading control circuit 115.

The reading control circuit 115 switches the timing in accordance with an instruction to select reading issued through the front panel or the like to read the CCD 79 at a predetermined timing which has been selected as described above. The output signal thus read from the CCD 79 is transmitted to a signal processing circuit formed from the amplifier 80 so that a similar process is performed.

The predetermined reading timing in the reading control circuit 115 is arranged as shown in FIG. 27. In the case where the R, G and B signals images are obtained, the predetermined timing is made in such a manner that the electric signal obtained by taking the subject at the timing of the R, G and B irradiating light beams is read as shown in FIG. 27(*b*). In the case where the R', G and B images are obtained, the predetermined timing is made in such a manner that the electric signal obtained by taking the subject at the timing of the R', G and B irradiating light beams is read as shown in FIG. 27(*c*).

Since the residual operations and effects are similar to those according to the fourth and fifth embodiments, their descriptions are omitted here.

Figure 29:
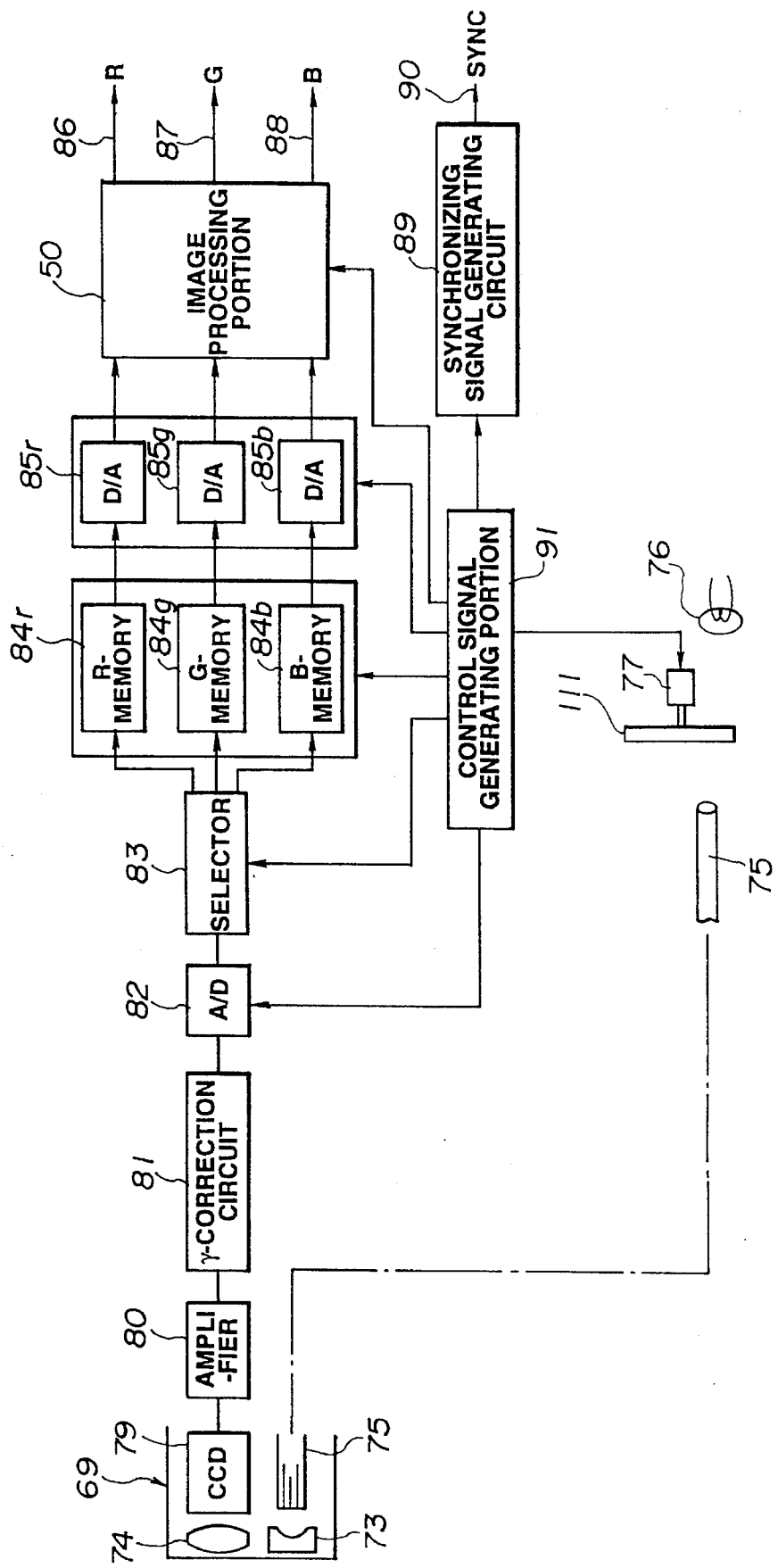
FIGS. 29 and 30 illustrate a ninth embodiment.
Figure 30:
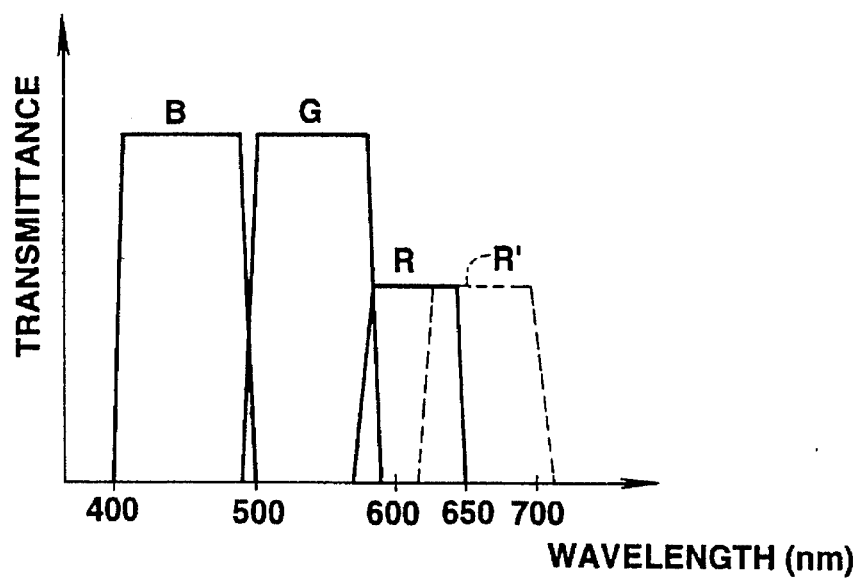

FIGS. 29 and 30 illustrate a ninth embodiment of the present invention. FIG. 29 is a block diagram which illustrates the structure of an endoscope image sensing and processing apparatus. FIG. 30 is an explanatory view which illustrates the transmission wavelength regions of filters of a rotary filter.

As shown in FIG. 29, the apparatus according to this embodiment comprises the rotary filter 111 according to the eighth embodiment in place of the rotary filter 78 according to the fourth embodiment. The transmission wavelength characteristics of the filters of the rotary filter 111 are made as shown in FIG. 30. Similar structures and operations of the residual portions to those of the fourth embodiment are given the same reference numerals and their descriptions are omitted here.

The operation of this embodiment will now be described.

The rotary filter 111 is a rotary filter having a similar structure of that according to the eighth embodiment, the filters of the rotary filter 111 having the transmission wavelength regions as shown in FIG. 30. Therefore, the transmission wavelength regions of the irradiating light beams used to time-sequentially irradiate the subject by the rotary filter 111 are similar to those shown in FIG. 13 which illustrates the fourth embodiment. The R memory 84r is arranged to store an image obtained due to the irradiating light beams which have transmitted the R and R' filter 84a. Since the operations and effects of this embodiment are similar to those according to the fourth embodiment, their descriptions are omitted here.

Figure 31:
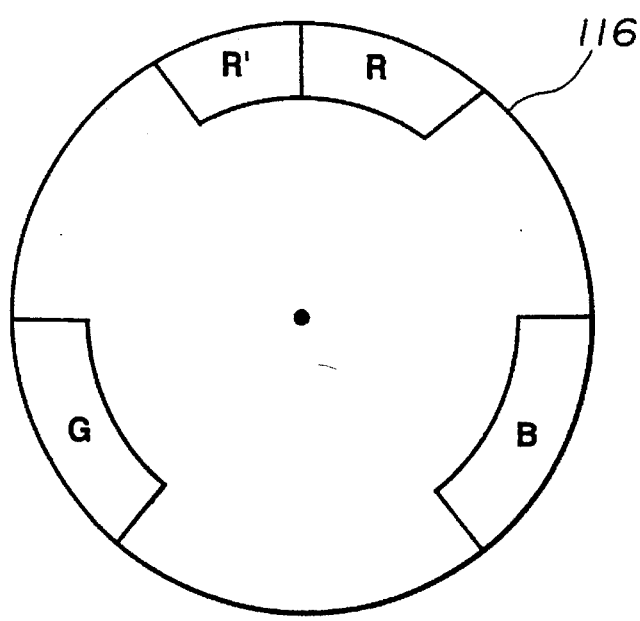
FIG. 31 is an explanatory view which illustrates the structure of a rotary filter according to a tenth embodiment.

FIG. 31 is an explanatory view which illustrates the structure of a rotary filter according to a tenth embodiment of the present invention.

In the tenth embodiment, a rotary filter 116 having the structure as shown in FIG. 31 is disposed in place of the rotary filter 78 according to the fourth embodiment. That is, the rotary filter 116 has a R' and R filter, a B filer and a G filter disposed therein. Although each of the filters the rotary filter 116 has the transmission wavelength characteristics which are similar to those of the fourth embodiment, the R' and R, G and B filters have similar transmissivity. Since the residual structures and operations are similar to those according to the fourth embodiment, their figures and descriptions are omitted here. The description will be made about only the different portions.

The rotary filter 116 has the structure as shown in FIG. 31 in such a manner that the numerical aperture of the R' and R filter is made lower than that of the G filter and the B filter. Therefore, irradiating light beams applied time-sequentially from the rotary filter 116 are formed into irradiating light beams having the transmission wavelength characteristics similar to that shown in FIG. 13 which illustrates the fourth embodiment. Since the residual operations and effects therefore are similar to those according to the fourth embodiment, their descriptions are omitted here.

Figure 32:
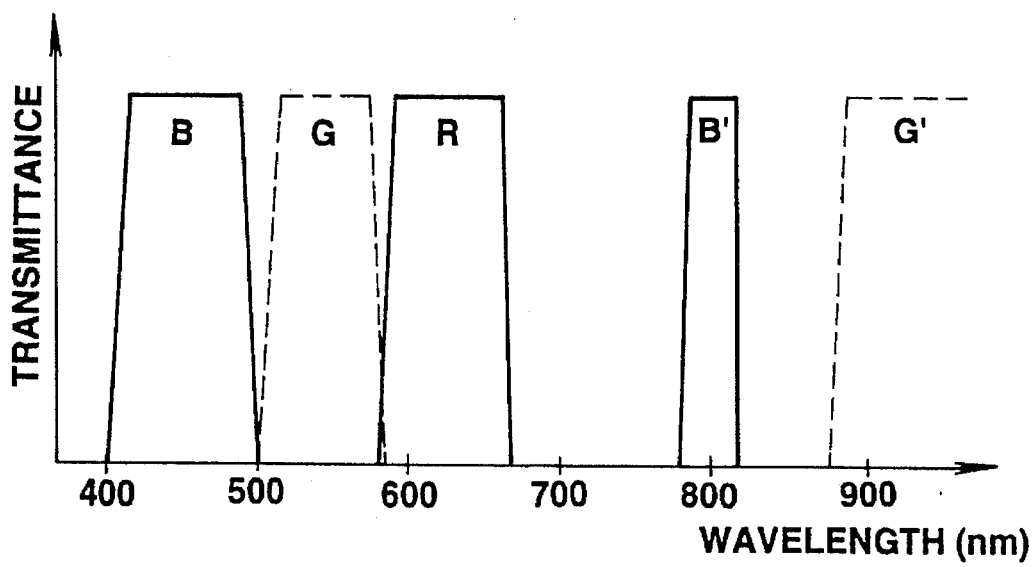
FIGS. 32 to 35 illustrate an eleventh embodiment.
Figure 33:
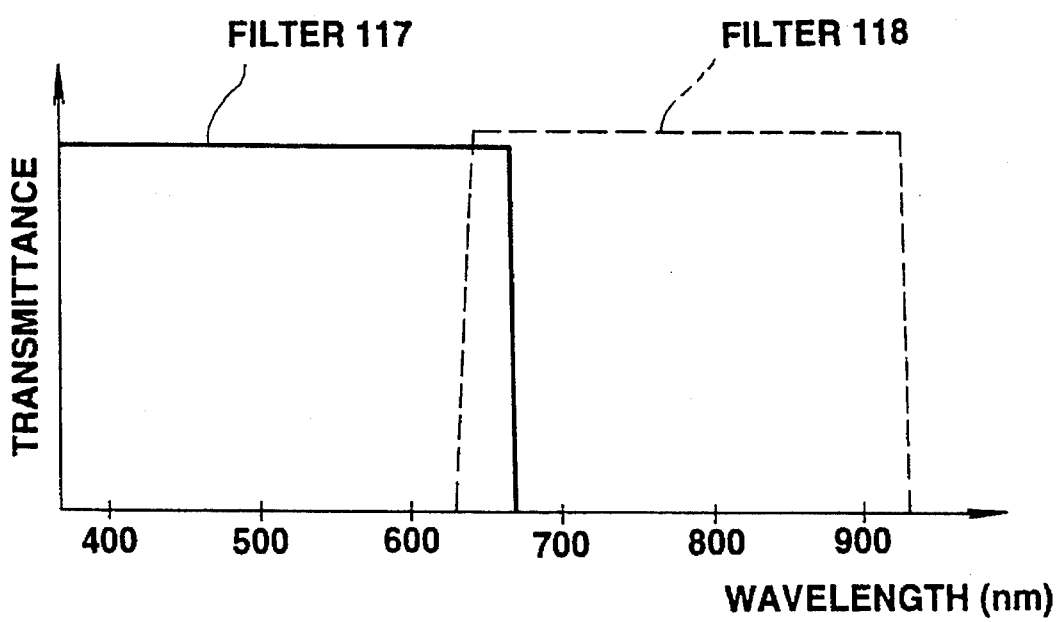
Figure 34:
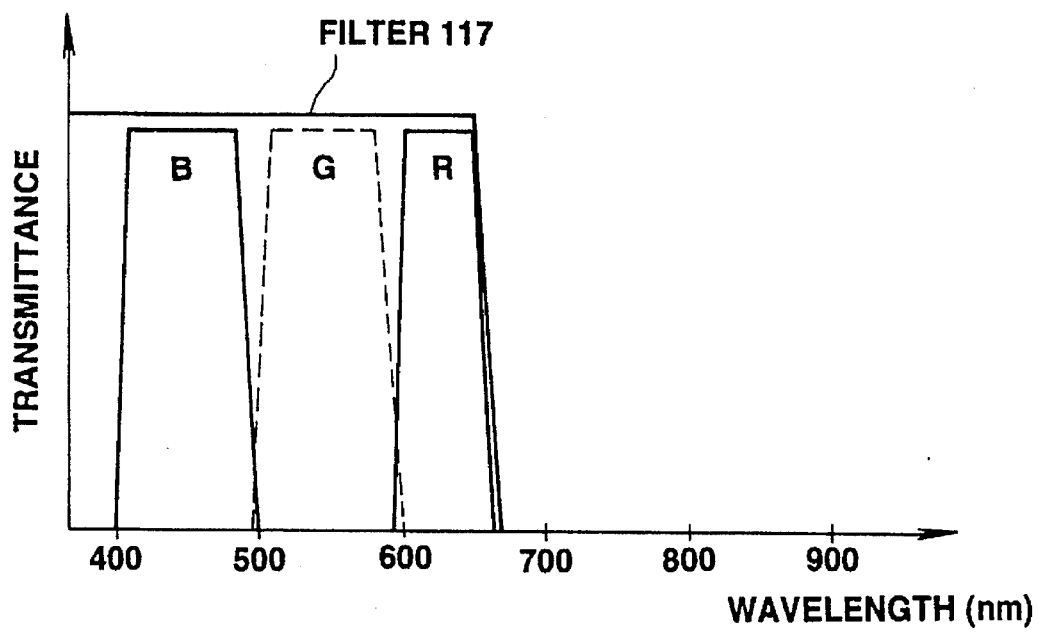
Figure 35:
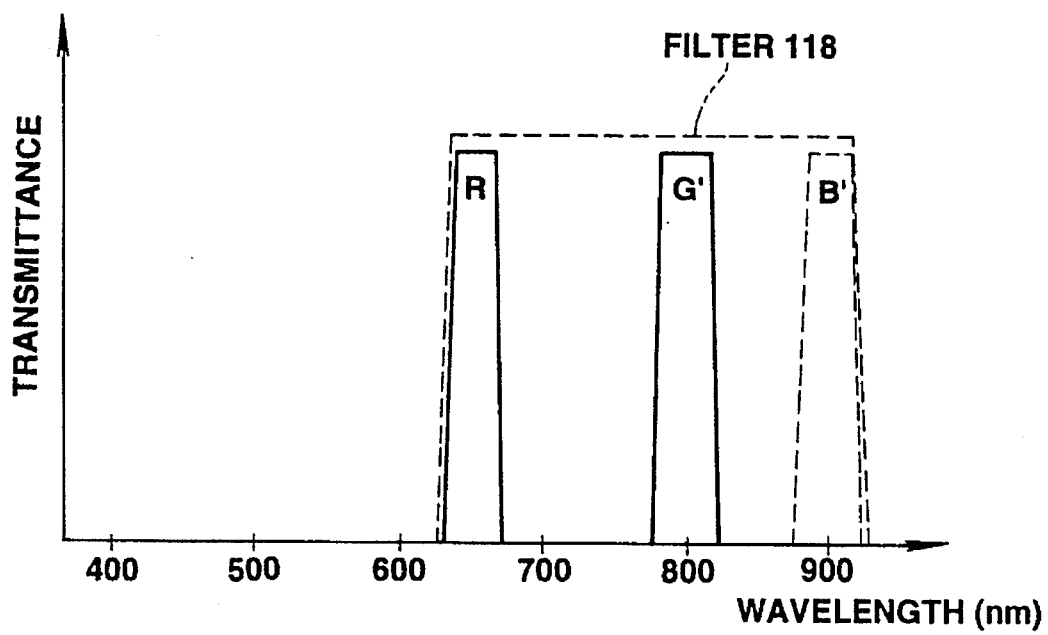

FIGS. 32 to 35 illustrate an eleventh embodiment of the present invention. FIG. 32 is an explanatory view which illustrates the transmission wavelength characteristics of each filter of the rotary filter. FIG. 33 is an explanatory view which illustrates the transmission wavelength characteristics of a band limiting filter of the filter turret 97. FIG. 34 is a graph which illustrates the characteristics of the wavelengths of irradiating light in a case where a band limiting filter 54 has been inserted onto the optical path. FIG. 35 is a graph which illustrates the characteristics of wavelength of irradiating light in a case where a band limiting filter 55 has been inserted onto the optical path.

In this embodiment, the transmission wavelength characteristics of the filters 96a, 96b and 96c of the rotary filter 96 according to the sixth embodiment are made as shown in FIG. 32. That is, the R filter according to this embodiment is adapted to the wavelength region including the wavelength of 650 nm and the upper limit for the transmission wavelength. As compared with the B filter according to the sixth embodiment, the filter according to this embodiment has the transmission wavelength regions of B and B' shown in FIG. 32. Furthermore, the filter according to this embodiment has the transmission wavelength region of G and G' as shown in FIG. 32 as contrasted with the G filter according to the sixth embodiment.

In this embodiment, the filter turret 97 has band limiting filters 117 and 118 having the characteristics shown in FIG. 33 in place of the filters 99 and 100. Since the residual structures are similar to those according to the sixth embodiment, figures and descriptions about the structure of the apparatus are omitted here.

When the band limiting filter 117 is inserted onto the optical path and the rotary filter is rotated on the optical path, the subject is irradiated with the irradiating light beams having the transmission wavelength characteristics as shown in FIG. 34. By retracting the band limiting filter 117 from the optical path and by inserting the band limiting filter 118 onto the optical path, the subject is irradiated with the irradiating light beams having the transmission wavelength characteristics as shown in FIG. 35. That is, the band limiting filter 117 has the transmission wavelength characteristics including the wavelength regions of B, G and R as shown in FIG. 34. The band limiting filter 118 has the transmission wavelength characteristics including a portion of R, that is, the wavelength region including the wavelength of 650 nm and a long wavelength portion of R and the wavelength regions of B' and G' as shown in FIG. 35. Therefore, the use of the filter 118 causes the R filter to have a narrow band width as compared with the case where the filter 117 is inserted. As a result, an image sensitive to the change in the degree of oxygen saturation can be obtained.

According to this embodiment, a usually and visually observed image can be obtained in the case where the band limiting filter has been inserted onto the optical path. In the case where the band limiting filter has been inserted onto the optical path, an image can be obtained from which the change in the degree of oxygen saturation of hemoglobin can be discriminated.

Furthermore, this embodiment may be adapted to observation of the quantity of hemoglobin, an infrared ray image and an ICG concentration image as well as the observation of an image from which the change in the degree of oxygen saturation can be obtained.

Since the residual structures, operations and effects are similar to those according to the sixth embodiment, their descriptions are omitted here.

Figure 36:
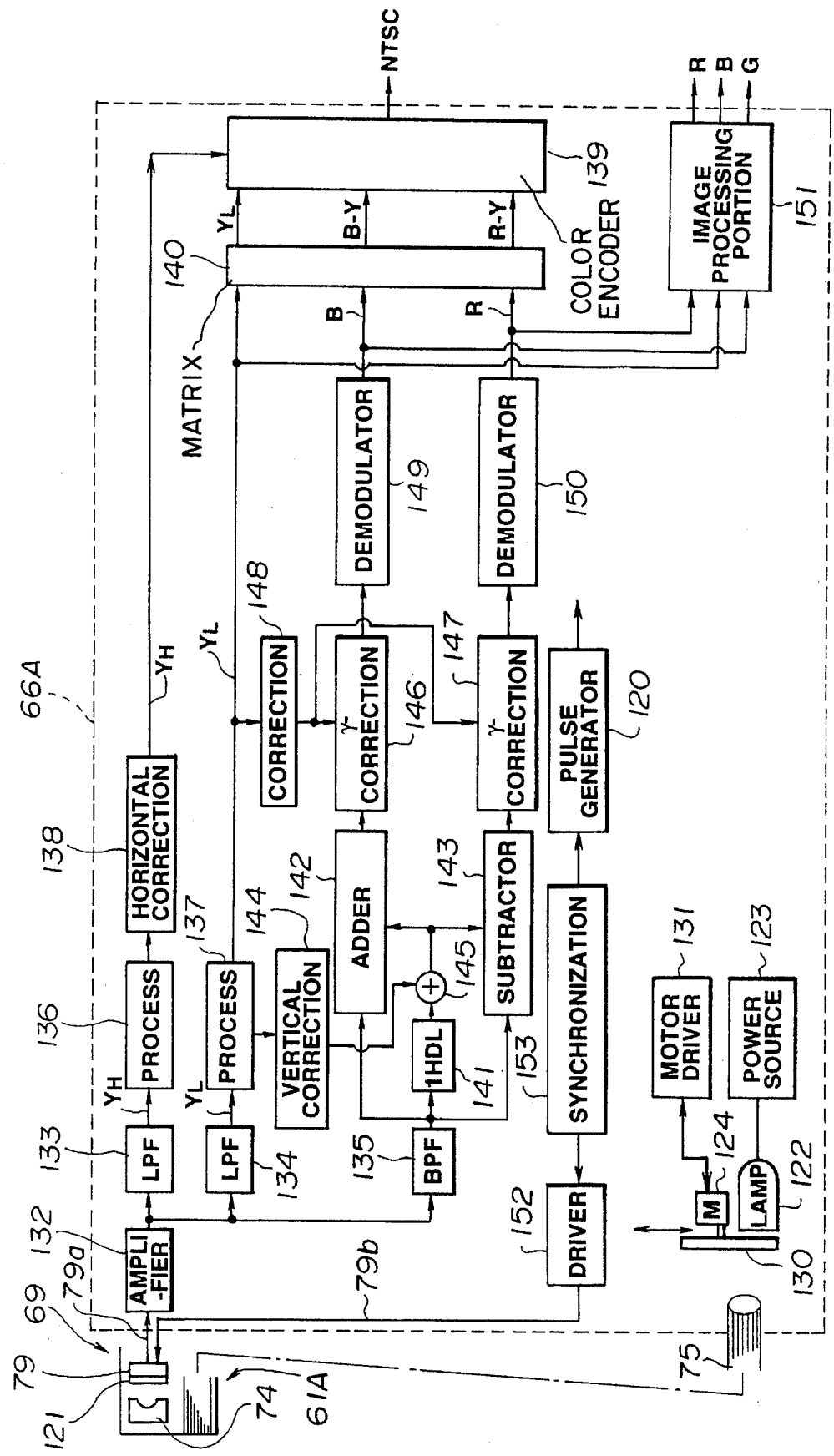
FIGS. 36 to 41 illustrate a twelfth embodiment.
Figure 37:
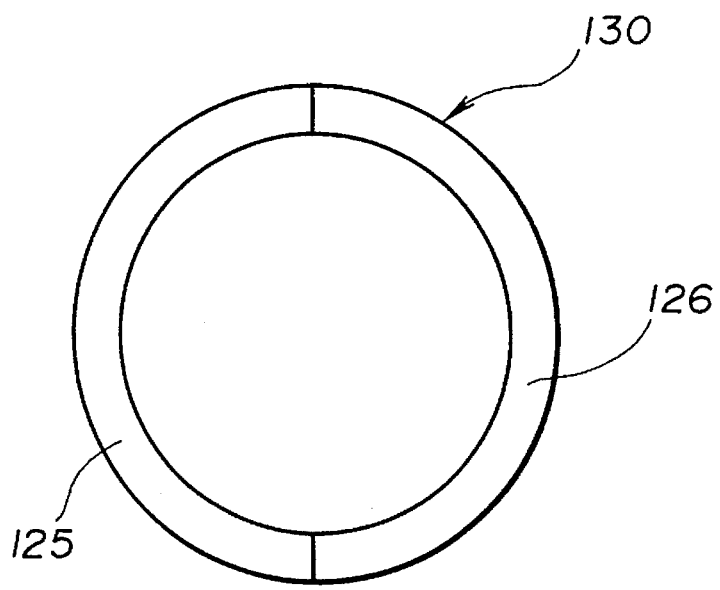
Figure 38:
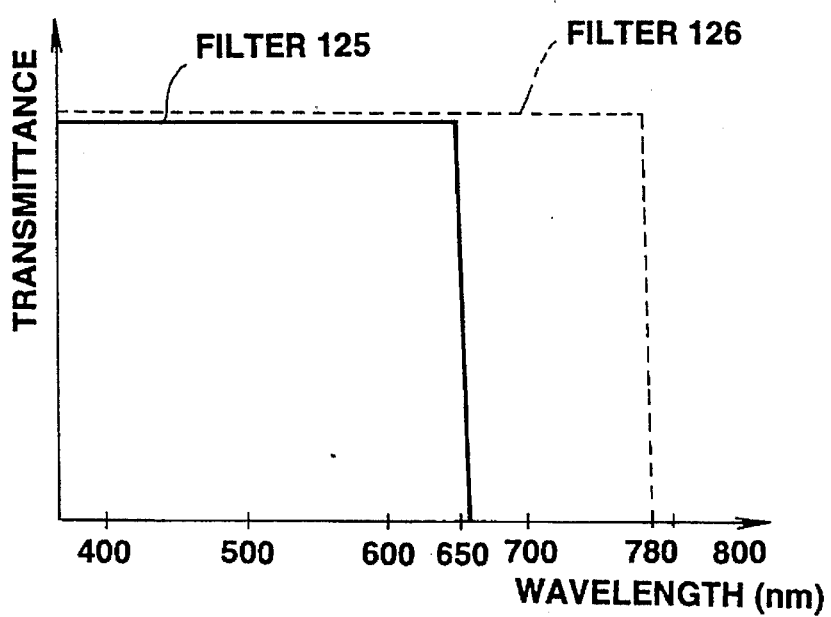
Figure 39:
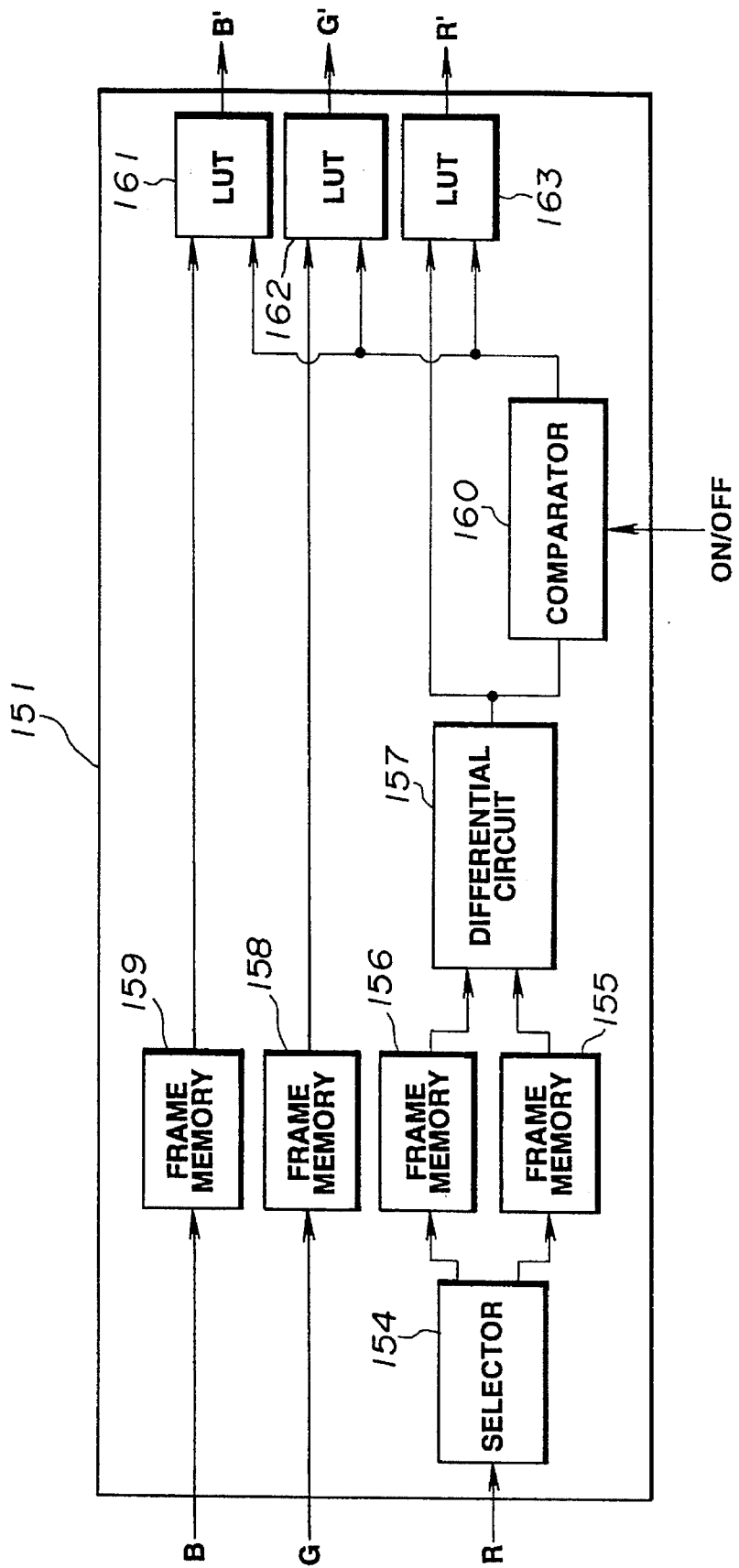
Figures 40, 41:
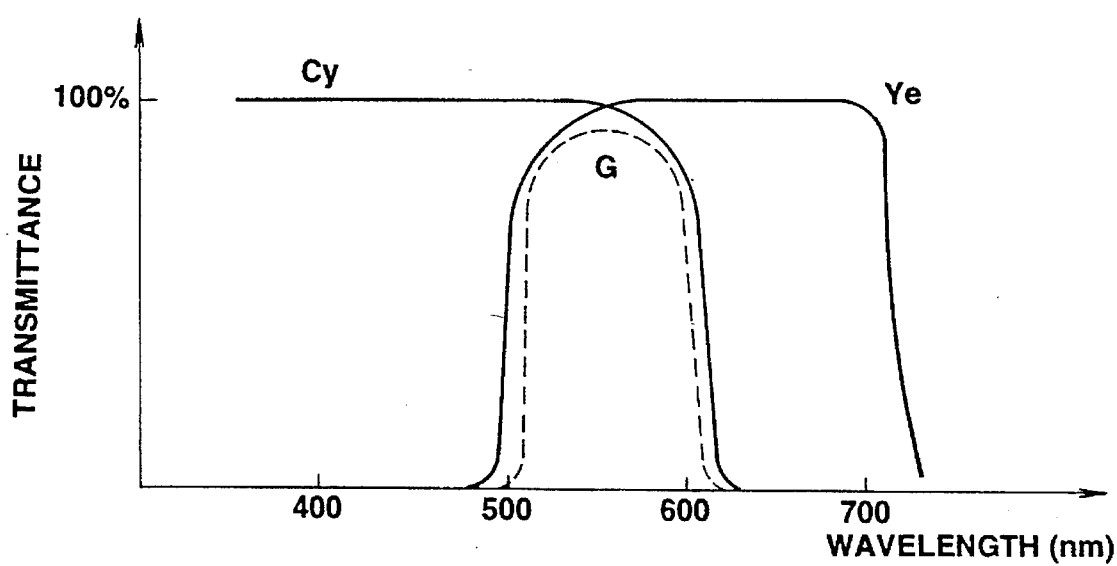

FIGS. 36 to 41 illustrate a twelfth embodiment. FIG. 36 is a block diagram which illustrates the structure of an endoscope image sensing and processing apparatus. FIG. 37 is an explanatory view which illustrates the structure of a rotary filter. FIG. 38 is a graph which illustrates the transmission characteristics of each transmission filter of a rotary filter. FIG. 39 is a block diagram which illustrates a image processing portion. FIG. 40 is an explanatory view which illustrates the structure of a color separating filter array. FIG. 41 is a graph which illustrates the transmission wavelength characteristics of each transmission filter of the color separating filter array.

As contrasted with the foregoing embodiment in which the present invention is adapted to the field sequential image sensing method, this embodiment is arranged in such a manner that the present invention is adapted to a simultaneous image sensing method.

In this embodiment, an electronic endoscope 61A and a video processor 66A are disposed in place of the electronic endoscope 61 and the video processor 66 according to the fourth embodiment. Similar structures and operations of the residual portions to those of the fourth embodiment are given the same reference numerals and their descriptions are omitted here.

As shown in FIG. 36, a color separating filter array 121 constituting the first and second wavelength separating means are disposed on the front surface of the CCD 79 of the electronic endoscope 61A. Signal lines 79a and 79b are connected to the CCD 79, the signal lines 79a and 79b being allowed to pass through the insertion portion 62 and the universal cord 64 so as to be connected to the connector 65.

The video processor 66 includes a lamp 122 for emitting light in a wide band ranging from ultraviolet light to infrared rays. The lamp 122 may comprise a usual xenon lamp or stroboscopic tube lamp. The xenon lamp and the stroboscopic tube lamp emit ultraviolet light and infrared rays in a large quantity as well as visible light. The foregoing lamp is supplied with electric power from a power supply portion 123. In front of the lamp 122, a rotary filter 130 is disposed, which is rotated by a motor 124 and which constitute the first and second wavelength separating means. The rotary filter 130 has filters 125 and 126 having the transmission wavelength region as shown in FIG. 38 and disposed in the circumferential direction thereof. Furthermore, the rotary filter 130 can be inserted/removed from the optical path.

The rotation of the motor 124 is controlled by a motor driver 131 at the time of the rotation.

Light beams, which has passed through the rotary filter 130 and time-sequentially separated into light beams having the wavelength regions as shown in FIG. 38 or white light beams to be applied due to the retraction of the rotary filter 130 from the optical path are made incident upon the incident terminal of the light guide 75. The light beams are guided into the leading section 69 through the light guide 75 and emitted from the leading section 69 so that the portion to be observed is irradiated with the light beams.

An optical image of the subject irradiated with the irradiating light is imaged on the image sensing surface of the CCD 79 by the objective lens system 74. At this time, the optical image is color-decomposed by the color separating filter array 121. The color separating filter array 121 is constituted by disposing G (green), Cy (cyan) and Ye (yellow) color transmission filters in a mosaic configuration as shown in FIG. 40. The transmission characteristics of G, Cy and Ye filters are shown in FIG. 41.

The CCD 79 is read when a drive signal transmitted from the driver 131 disposed in the video processor 66A is supplied, data obtained from the CCD 79 is amplified by the amplifier 132 disposed in the video processor 66A, the amplified data being then allowed to pass through LPFs 133 and 134 and a BPF 135.

The LPFs 133 and 134 have cut off characteristics of, for example, 3 MHz and 0.8 MHz, respectively. The signals respectively allowed to pass through the LPFs 133 and 134 are divided into high band brightness signal YH and low band brightness signal YL and supplied to processing circuits 136 and 137 so as to be subjected to γ-correction and the like. The high band brightness signal YH allowed to pass through the processing circuit 136 is subjected to horizontal outline correction and horizontal aperture correction and the like in a horizontal correction circuit 138, the brightness signal YH being then supplied to a color encoder 139.

The low band brightness signal YL allowed to pass through the processing circuit 137 is supplied to a matrix circuit 140 for displaying an image so as to be subjected to tracking correction.

Signal for reading the CCD 79 is allowed to pass through the BPF 135, the transmission band of which is 3.58±0.5 MHz, so that its color signal component is extracted, the color signal component being supplied to a 1 HDL (1H delay line) 141, an adder 142 and a subtractor 143 so that color signals components B and R are separated from each other and extracted. In this case, the output from the 1 HDL 141 is processed in the processing circuit 137 and mixed, in a mixer 145, with the low band brightness signal YL subjected to vertical aperture correction in a vertical correction circuit 144. The mixed output is supplied to the adder 142 and the subtractor 143. Color signal B transmitted from the adder 142 and color signal R transmitted from the subtractor 143 are respectively supplied to the γ-correction circuits 146 and 147 so as to be γ-corrected by using the low band brightness signal YL allowed to pass through the correction circuit 148. The γ-corrected color signals B and R are respectively supplied to demodulators 149 and 150 so as to be demodulated color signals B and R, and then supplied to the matrix circuit 140.

Color differential signal R-Y and B-Y are generated by the matrix circuit 140, and supplied to the color encoder 139. The color encoder 139 mixes a bright signal obtained by mixing, with each other, the brightness signals YL and YH and a chroma signal obtained by orthogonally demodulating the color differential signals R-Y and B-Y with a sub-carrier. Further, a synchronizing signal is superposed on the mixed signal so that a composite video signal is transmitted through the NTSC output terminal. Further, the R, G and B signals are supplied to the image processing portion 151 from the forward portion of the matrix circuit 140.

The driver 152 receives the synchronizing signal generated by a synchronizing signal generating circuit 153, the driver 152 transmitting a drive signal synchronized with the synchronizing signal to the CCD 79. A pulse generator 120 receives the synchronizing signal generated by the synchronizing signal generating circuit 153 so as to transmit various timing pulses to the foregoing various processing circuits.

The composite video signal is used to color-display the observed portion by the color monitor 67.

The structure of the image processing portion 151 is arranged as shown in FIG. 39. That is, the R signal among the R, G and B signals received by the image processing portion 151 is, by a selector 154 operated in synchronization with the rotation of the rotary filter 130, stored in frame memories 155 and 156.

The R signal denotes a R image obtained due to irradiation with light transmitted through the filter 125 and a R" image obtained due to irradiation with light transmitted through the filter 126. Therefore, the R image obtained by irradiation with light transmitted through the filter 125 is stored in the frame memory 155, while R" image obtained due to irradiation with light transmitted through the filter 126 is stored in the frame memory 156. The G and B signals are stored in frame memories 158 and 159.

The R and R" signals received by the frame memories 155 and 156 are, by a differential circuit 157, subjected to a subtraction performed in such a manner that the R image obtained due to the operation of the filter 125 is subtracted from the R" image obtained due to the operation of the wide range filter 126. As a result, an image can be obtained on which the change in the degree of oxygen saturation of hemoglobin is further reflected. The obtained image is supplied to a comparator 160 and image conversing LUTs 161 to 163. The image received by the comparator 160 is discriminated whether or not its pixel is present within the predetermined range of the subject quantity set from the outside or stored inside. In response to a subject quantity range discrimination signal discriminated in the comparator 160, the LUTs 161 to 163 subject only the pixels outside the range of the subject quantity to a masking process in achromatic color, such as gray to display an image on a display unit, such as a monitor. By constituting the comparator 160 in such a manner that its function can be activated/deactivated from the outside, it is able to unchangeably transmit the differential image of R, the G image and the B image.

The operation of this embodiment will now be described.

In a state where a usual visual observation is performed, the rotary filter 130 is retracted from the optical path so that the subject is irradiated with white light.

In a case where change in the degree of oxygen saturation of mucous membrane texture is observed, the rotary filter 130 is inserted onto the optical path so that the subject is time-sequentially irradiated with irradiating light from the filter 125 and irradiating light from the filter 126. An image obtained due to the time-sequentially irradiation is separated into R, G and B images so as to be supplied to the image processing portion 151. The signals received by the image processing portion 151 enable the R' image to be obtained which is similar to an image obtained due to irradiation with light, the wavelength region of which ranges from 650 nm to 780 nm, the R' image being obtainable by subtracting an image obtained due to the irradiation with light from the filter 125 from the image obtained due to irradiation with light from the filter 126. Since the foregoing R' image and G and B images stored in the frame memories 158 and 159 are made simultaneous and transmitted, an image can be obtained in which the change in the degree of oxygen saturation of hemoglobin takes place considerably.

Further, a predetermined range of the subject quantity for the differential image is set, and a discrimination is, by the comparator 160, made whether or not each pixel of the differential image is present within the predetermined range of the subject quantity. In this state, the comparator 160 is being turned on.

The pixels outside the predetermined range of the subject quantity are subjected to the masking process in the LUTs 161 to 163. By observing an image, which is obtained due to the foregoing process and, the portion outside the predetermined range of the subject quantity of which has been masked, the diagnosing ability can be improved because masked images can be obtained from portions except the physically changed portion caused by a disease if a predetermined range expressing the physically changed portion caused by a disease is set. It should be noted that pixels within the predetermined range of the subject quantity may unchangeably be transmitted or may be subjected to a process arranged in such a manner that pixels larger than a predetermined value and those smaller than the predetermined value within the predetermined range are subjected to different conversion processes.

According to this embodiment, if the value of the degree of oxygen saturation of hemoglobin denoting an oxygen deficit state in an organism is previously obtained to serve as the reference value of the degree of oxygen saturation of hemoglobin, pixels having values larger than the foregoing reference value are set as pixels outside the predetermined range of the subject quantity so that a normal mucous membrane portion freed from the oxygen deficit state can be masked. Since the image of only the oxygen deficit state portion of the mucous membrane of an organism can be usually displayed due to the foregoing arrangement, the portion can clearly be observed. As a result, the stage of the physically changed portion caused by a disease and the state of curing which has been cured can easily be discriminated.

On the contrary, the observation of a normal portion can easily be performed by masking the oxygen deficit portion.

By making the regions outside the predetermined range to be zero level in this embodiment, images of the region outside the predetermined range of the subject quantity colored in Cy can be obtained. Therefore, the predetermined range of the subject quantity can easily be discriminated. Since the achromatic color, such as gray, is not displayed, images of even the portion outside the predetermined range of the subject quantity are colored in green or blue having somewhat change (since a portion of information of the original image is reflected), the image can be recognized further easily and further natural image can be obtained. Therefore, even if the image is displayed in the form of a kinetic image, an image that can satisfactorily be recognized is formed.

Figure 42:
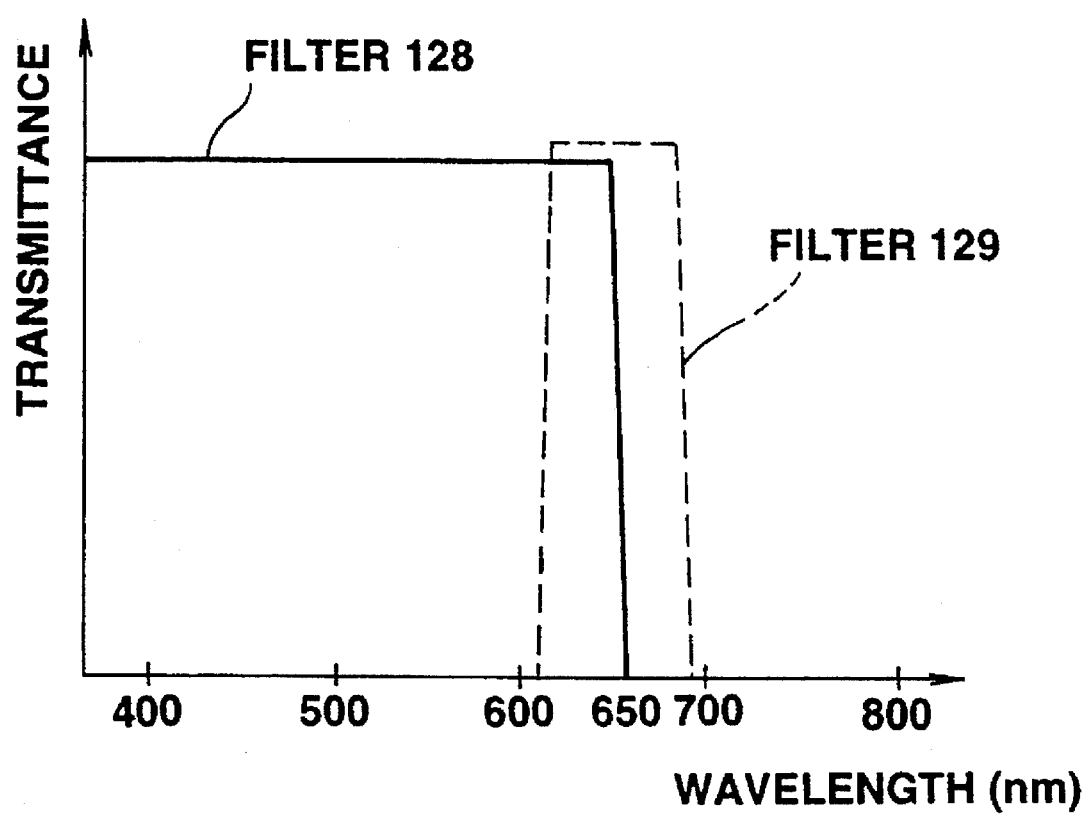
FIGS. 42 and 43 illustrate a thirteenth embodiment.
Figure 43:
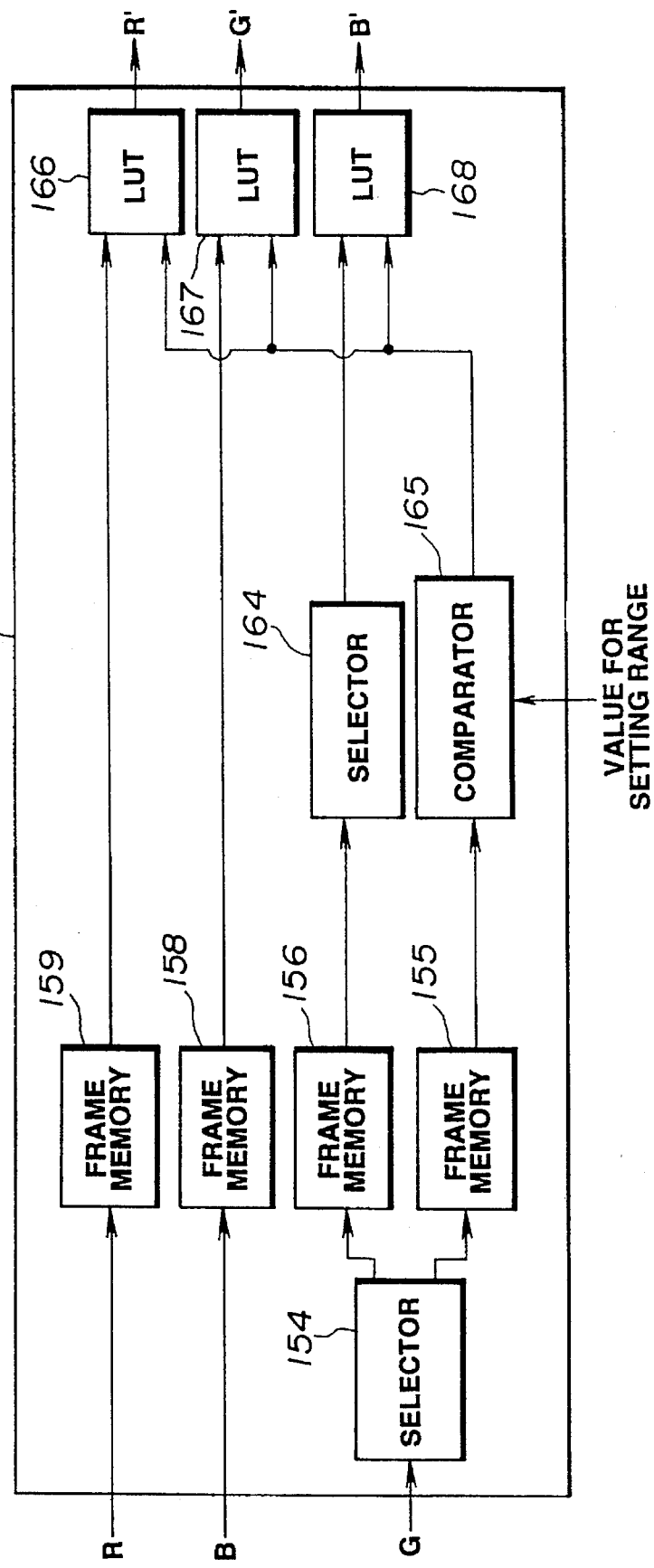

FIGS. 42 to 43 illustrate a thirteenth embodiment of the present invention. FIG. 42 is a graph which illustrates transmission wavelength characteristics of each filter of the rotary filter. FIG. 43 is an explanatory view which illustrates the structure of an image processing portion.

Figure 47:
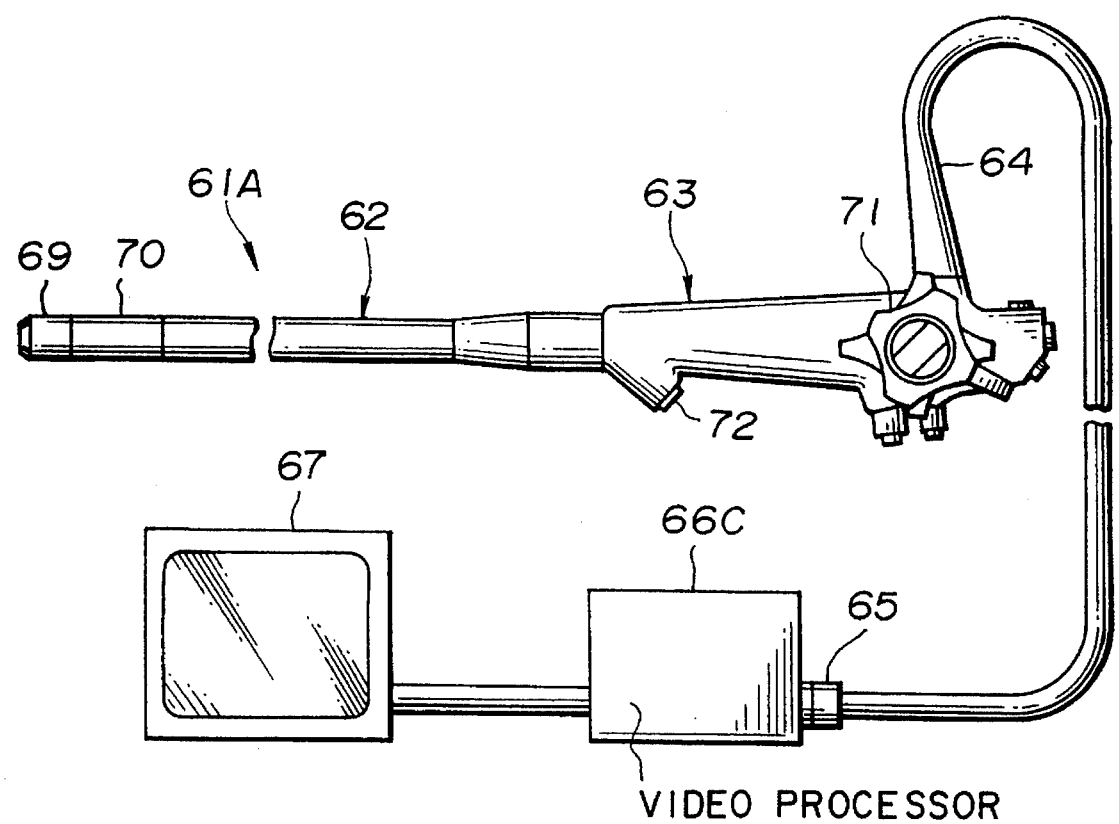
FIGS. 47 to 51 illustrate a fifteenth embodiment.

In this embodiment, a rotary filter 127 having the characteristics shown in FIG. 47 is disposed in place of the rotary filter 130 of the endoscope image sensing and processing apparatus according to the twelfth embodiment. The rotary filter 127 has filters 128 and 129 employed in place of the filters 125 and 126 shown in FIG. 37, the filters 128 and 129 having the transmission wavelength characteristics shown in FIG. 41. That is, the filter 128 constituting the first wavelength separating means has the transmission characteristics, the wavelength region of which is not more than 650 nm. The filter 129 constituting the second wavelength separating means has the transmission characteristics having a narrow band, the center of which is 650 nm.

In this embodiment, an image processing portion 158 shown in FIG. 42 is disposed in place of the image processing portion 151 according to the twelfth embodiment. The structure of the image processing portion 158 is arranged in such a manner that a selector 164 is disposed in place of the differential circuit 157 according to the twelfth embodiment. Furthermore, the image processing portion 158 comprises a comparator 165 and LUTs 166 to 168 in place of the comparator 160 and the LUTs 161 to 163 according to the twelfth embodiment. Since the residual structures according to this embodiment are similar to those according to the twelfth embodiment shown in FIG. 36, their descriptions are omitted here. Similar structures and operations of the residual portions to those of the twelfth embodiment are given the same reference numerals and their descriptions are omitted here. The description will be made about only the different portions.

The operation of this embodiment will now be described.

In a state where usual visual observation is performed, the rotary filter 127 is retracted from the optical path, and therefore the subject is irradiated with white light. At this time, the image processing portion 158 makes simultaneous the wide range image obtained by irradiation performed by using the filter 128 and stored in the frame memory 156 and G and B images stored in the frame memories 158 and 159, the image processing portion 158 being arranged to transmit the simultaneous images.

In a case where the change in the degree of oxygen saturation of the mucous membrane texture is observed, the rotary filter 127 is inserted onto the optical path so that irradiating light realized by the filter 128 and irradiating light realized by the filter 129 are time-sequentially used to irradiate the subject. An image obtained due to the time-sequential irradiation is separated into R, G and B images so as to be supplied to the image processing portion 158. The signal received by the image processing portion 158 switches the R image obtained by the irradiation with the light supplied from the filter 128 and the narrow band image obtained by the irradiation using the filter 129.

The narrow band image obtained by the irradiation using light allowed to pass through the filter 129 is transmitted to the comparator 165 and the selector 164. The comparator 165 performs a process similar to that performed in the twelfth embodiment so that a discrimination is made whether or not the image is within the predetermined range of the subject quantity. The comparator 165 transmits a discrimination signal to the image converting LUTs 166 to 168. The selector 164 selects the R image to be displayed and transmits it to the LUTs 166 to 168. In the LUTs 166 to 168, an image conversion process similar to that according to the twelfth embodiment is performed in such a manner that the region outside the predetermined range of the subject quantity is masked or the level of at least one of the signals of the R, G and B images is made to be zero. Thus, an image, which considerably displays the change in the degree of oxygen saturation of hemoglobin, can be obtained.

According to this embodiment, a similar effect to that obtainable from the twelfth embodiment can be obtained. In addition, a usually observed image can be subjected to a discrimination whether or not the region is included within the predetermined range of the subject quantity of the degree of oxygen saturation of hemoglobin. Therefore, an observation of the degree of oxygen saturation of hemoglobin using an endoscope can easily be performed.

The residual operations and effects are similar to those according to the twelfth embodiment.

The present invention is not limited to the contents of the foregoing embodiment. The necessity is that a wavelength may be employed, the reflection spectral characteristics are changed considerably due to the change in the degree of oxygen saturation of hemoglobin. For example, a wavelength adjacent to 900 nm may be employed which is in the longer wavelength region from the absorption point such as 805 nm.

Figure 44:
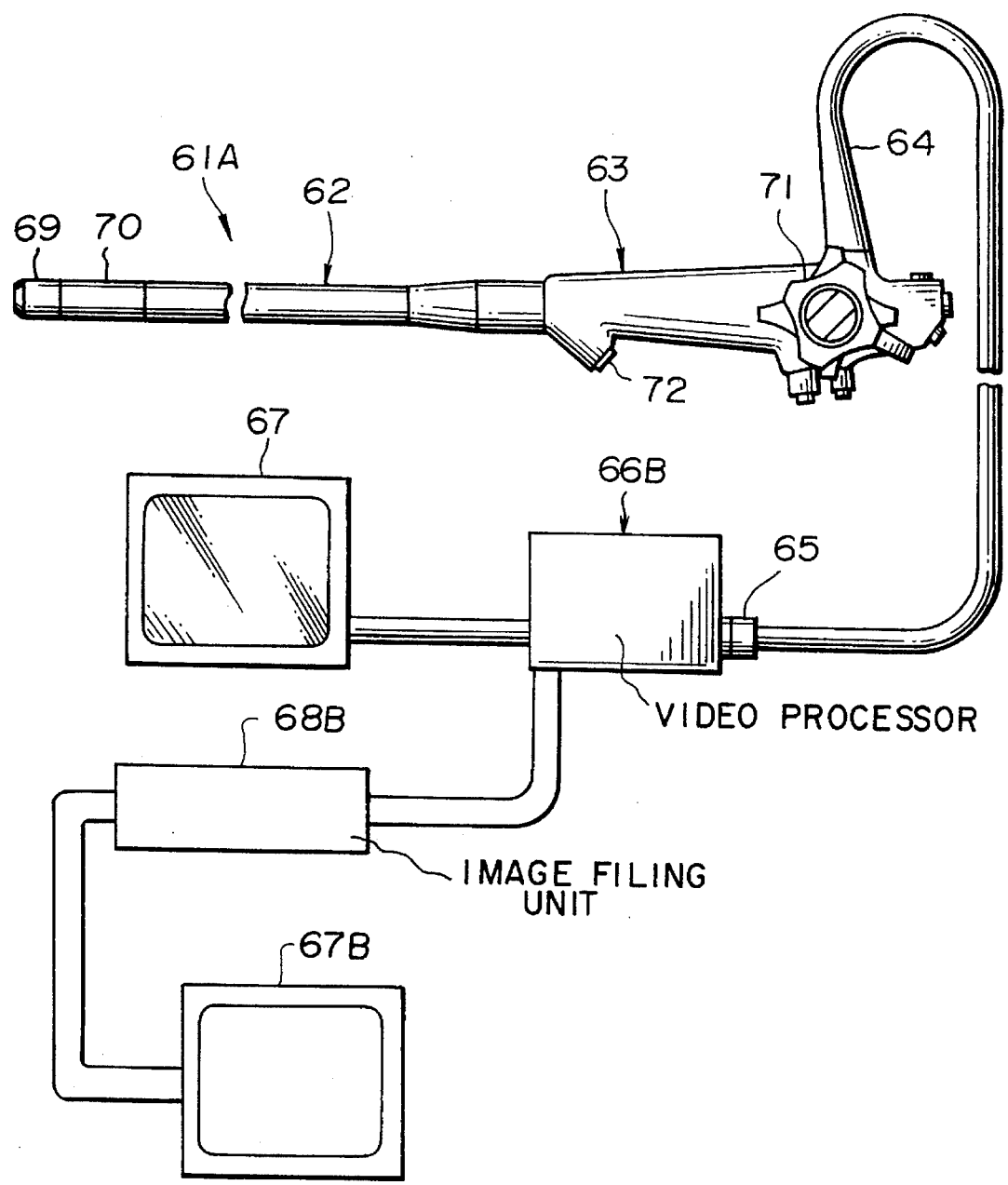
FIGS. 44 to 46 illustrate a fourteenth embodiment.
Figure 45:
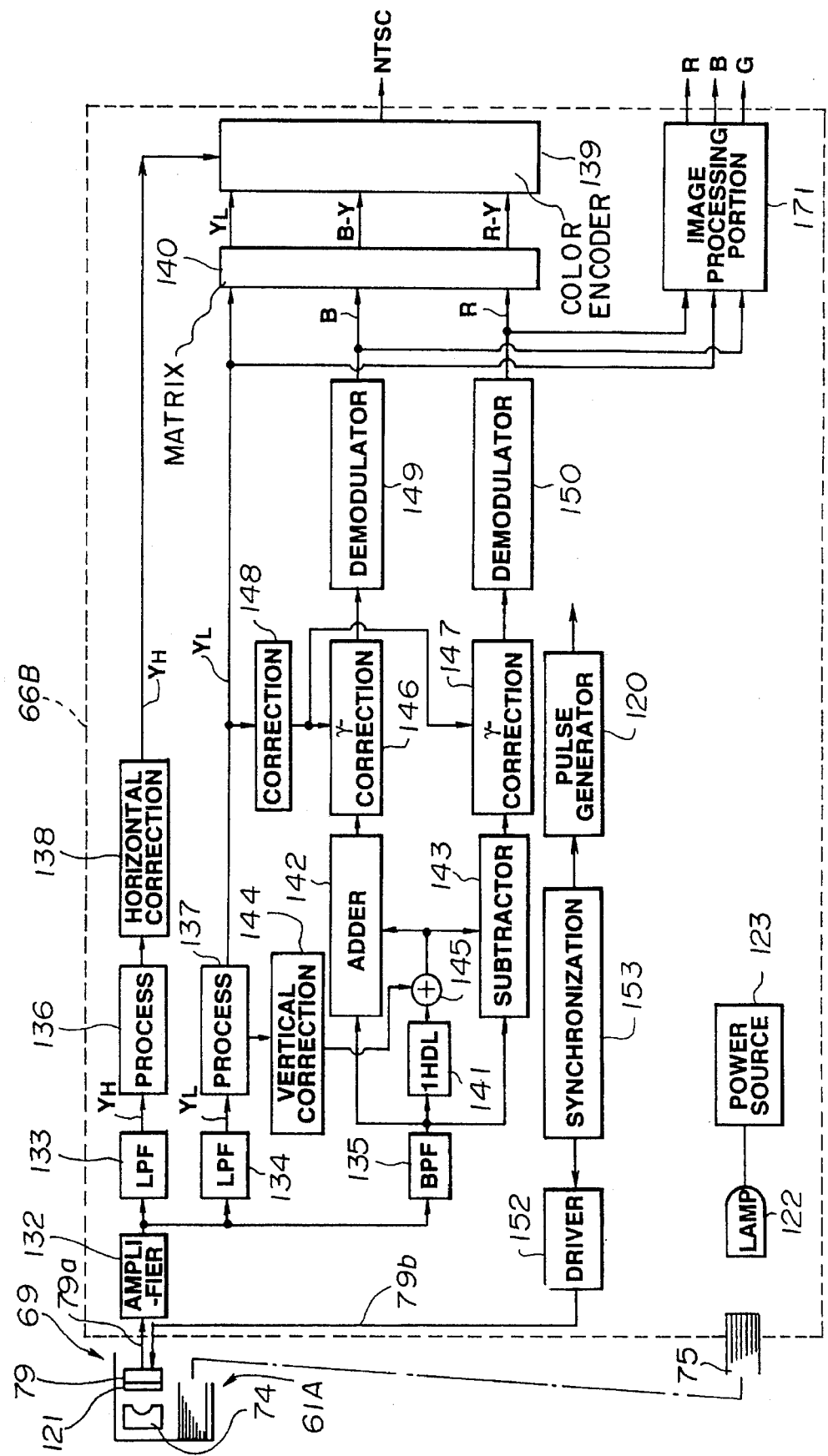
Figure 46:
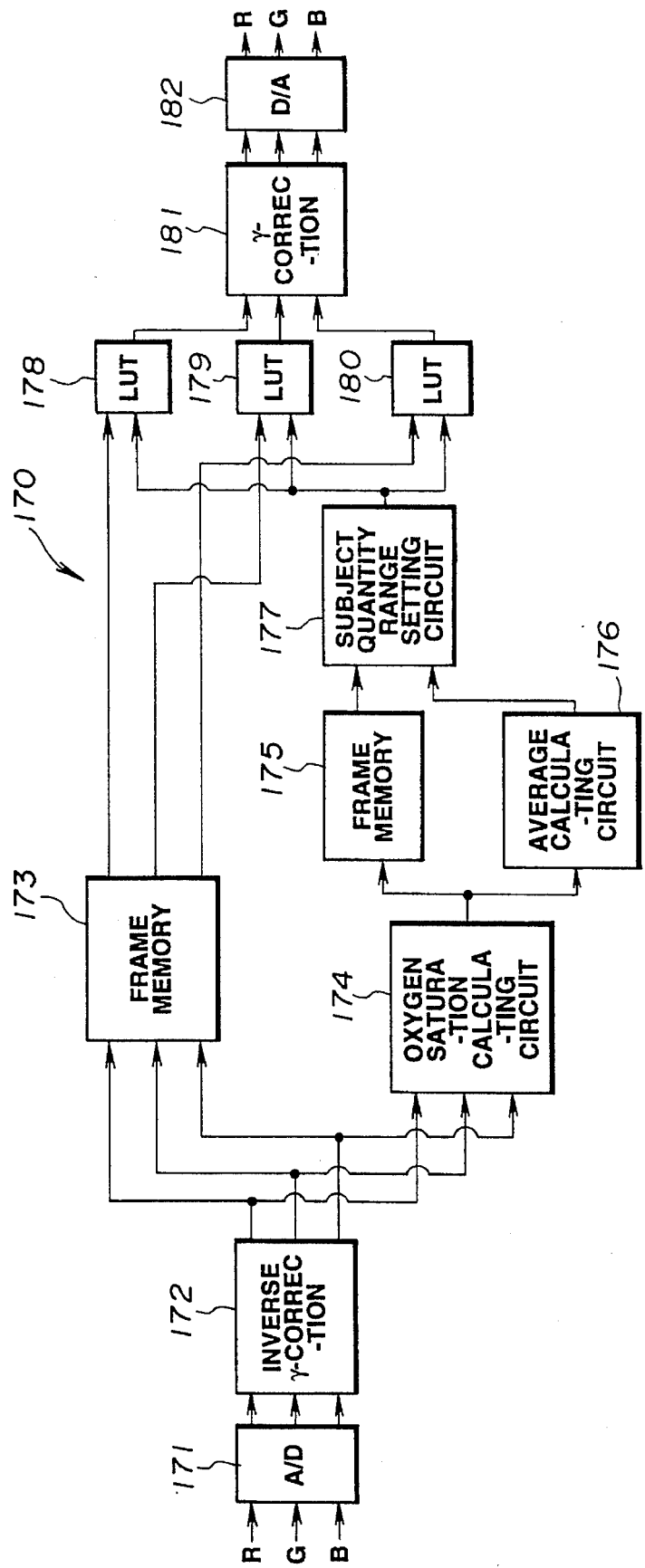

FIGS. 44 to 46 illustrate a fourteenth embodiment of the present invention. FIG. 44 is an overall outline view which illustrates an endoscope image sensing and processing apparatus. FIG. 45 is an overall block diagram which illustrates the endoscope image sensing and processing apparatus. FIG. 46 is a block diagram which illustrates an image processing portion.

This embodiment is an example of adaptation of the present invention to the simultaneous image sensing method.

The endoscope image sensing and processing apparatus according to this embodiment comprises the endoscope 61A, the video processor 66B and the image filing unit 68B shown in FIG. 44 in place of the endoscope 61, the video processor 66 and the image filing unit 68. A monitor 67B is connected to the image filing unit 68B.

Similar structures and operations of the residual portions to those of the twelfth embodiment are given the same reference numerals and their descriptions are omitted here.

The video processor 66B comprises an image processing portion 170 in place of the image processing portion 151 shown in FIG. 36. Furthermore, the video processor 66B has a structure which supplies white light to the light guide 75. Therefore, the video processor 66B has not the rotary filter 130, the motor 124 and the motor driver 131.

Light emitted from the lamp 122 is guided through the light guide 75 so as to be emitted through the leading section 69 of the endoscope 61A to irradiate the portion to be observed.

The structure of the image processing portion 170 is arranged as shown in FIG. 45. That is, the R, G and B images received by the image processing portion 170 are supplied to an A/D converter 171. The A/D converter 171 converts the supplied R, G and B signals into digital signals so as to transmit them to an inverse $\gamma$-correction circuit 172. The inverse $\gamma$-correction circuit 172 suspends the $\gamma$-correction of the supplied signals because the foregoing signals have been subjected to a predetermined $\gamma$-correction in the $\gamma$-correction circuit prior to the supply to the image processing portion 170. The outpost from the inverse $\gamma$-correction circuit 172 is supplied to a frame memory 173 and an oxygen saturation degree calculating circuit 174.

The oxygen saturation degree calculating circuit 174 calculates Log (R/G) or Log (R/B) from the supplied R, G and B signals to transmit the result of the calculation to a frame memory 175 and an average value calculating circuit 176. The value of Log (R/G) or Log (R/B) calculated in the oxygen saturation degree subtractor 174 is a value correlated to the degree of oxygen saturation of hemoglobin. The average value calculating circuit 176 calculates the average value of the values correlated to the supplied degree of oxygen saturation of hemoglobin for one frame and transmits the result of the calculation to a subject quantity range setting circuit 177.

In the subject quantity range setting circuit 177, a discrimination is made whether or not the output from the frame memory 175 is included in the predetermined range of the subject quantity set in accordance with the average value of the average value calculating circuit 176 to transmit, while forming the result into an identification signal, the result of the discrimination to the image converting LUTs 178, 179 and 180.

In accordance with the output from the frame memory 173 and the foregoing identification signal, the LUTs 178 to 180 convert the portion outside the predetermined range of the subject quantity into an image arranged in such a manner that the R signal is made to be the zero level. That is, conversion to an image is performed in which the portion outside the predetermined range of the subject quantity is colored in cyan. The images converted by the LUTs 178 to 180 are subjected to a predetermined $\gamma$-correction in a $\gamma$-correction circuit 181, and then converted into analog signals by the D/A converter 182. The output from the $\gamma$-correction circuit 58 is converted into an analog signal by the D/A converter 59 and then displayed on the monitor.

The operation of this embodiment will now be described with reference to the drawings.

By calculating Log (R/G) or Log (R/B) from the R, G and B image signals transmitted from the endoscope image sensing and processing apparatus, oxyhemoglobin and deoxyhemoglobin are easily caused to have considerable change in the absorbance in a visible region higher than 600 nm. That is, the difference in the absorbance is reflected on the R image signal so that it is reflected on the result of the calculation Log (R/G) or Log (R/B). The average value of the thus-obtained values correlated to the degree of oxygen saturation of hemoglobin in one frame is calculated. Then, the subject quantity range setting circuit 177 performs setting in such a manner that a region within, for example, ±10% from the average value for the frame is made to be the region within the predetermined range of the subject quantity, that is, values different from the same by 10% or more are made to be the values outside the predetermined range of the subject quantity. The identification signal set as described above is then generate. In accordance with the identification signal, the portion of the R, G and B images outside the predetermined range of the subject quantity is displayed in cyan by making the R image to be the zero level.

According to this embodiment, a portion of the mucous membrane of an organism, the oxygen supply to which is unsatisfactory, for example, a physically changed portion caused by a disease, is displayed in cyan. Therefore, the normal mucous membrane and the mucous membrane which may be the physically changed portion caused by a disease can clearly be distinguished from each other. By displaying the portion to which oxygen is being supplied normally is displayed as the portion outside the predetermined range of the subject quantity, the portion that is considered to be the physically changed portion caused by a disease can effectively be observed.

As described above, according to this embodiment, the physically changed portion caused by a disease and the normal mucous membrane can be observed further effectively. Therefore, the diagnosing ability can be improved.

Figure 48:
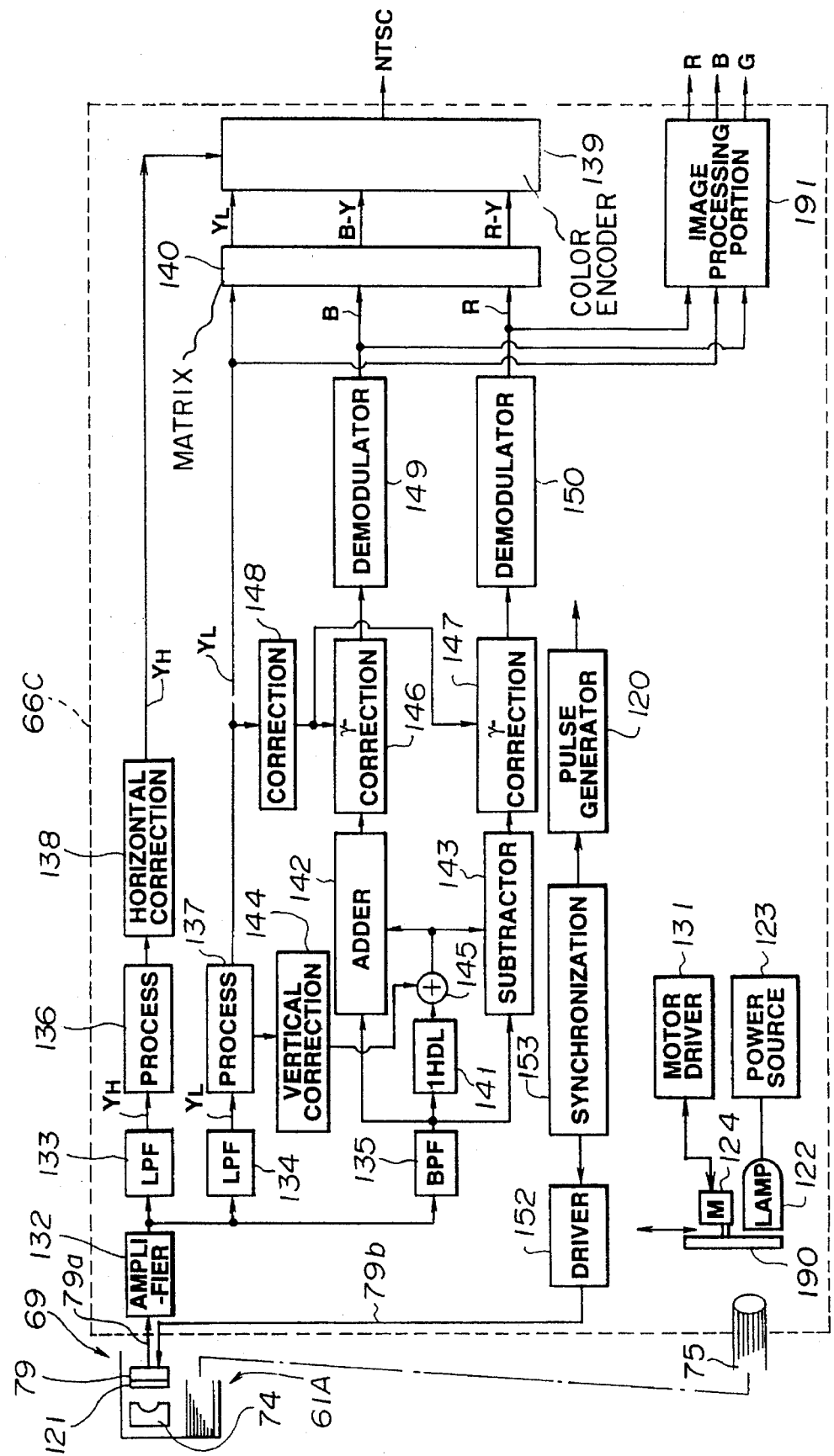
Figure 49:
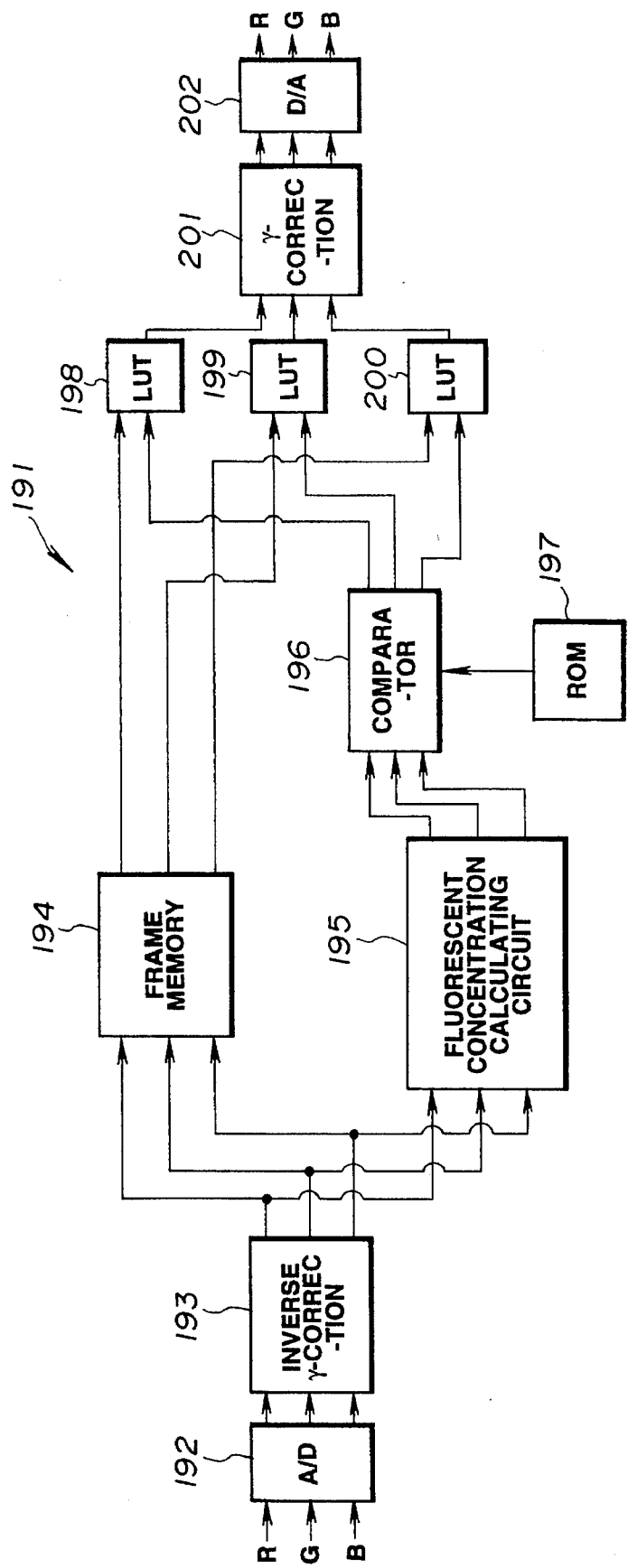
Figure 50:
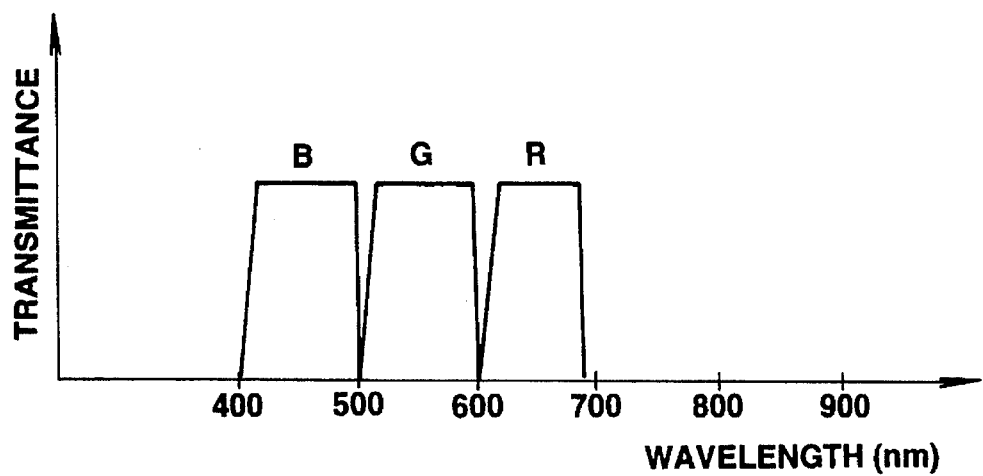
Figure 51:
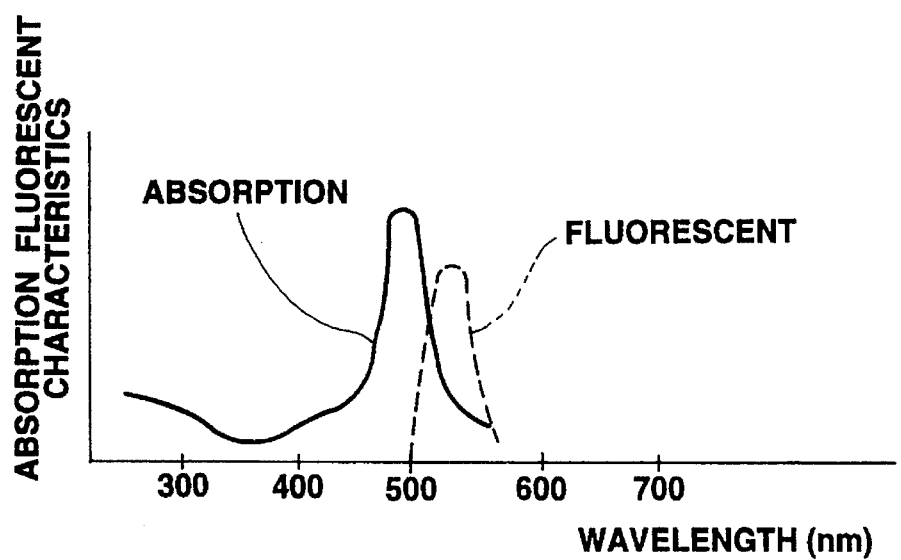

FIGS. 47 to 51 illustrate a fifteenth embodiment of the present invention. FIG. 47 is an overall outline view of an endoscope image sensing and processing apparatus. FIG. 48 is an overall block diagram which illustrates the structure of the endoscope image sensing and processing apparatus. FIG. 49 is a block diagram which illustrates an image processing portion. FIG. 50 is a graph which illustrates the characteristics of the transmission wavelength region of each filter of a rotary filter. FIG. 51 is a graph which illustrates the absorbance characteristics and the fluorescent characteristics of fluorescein serving as a fluorochrome.

The endoscope image sensing and processing apparatus according to this embodiment is constituted in such a manner that a predetermined range is set to the fluorescent concentration, which is the subject quantity, depending upon a medication dosed to an organism which is the subject of the observation and that the portion of the fluorescent concentration, which is the subject quantity, within the predetermined range and that outside the same can be displayed differently. In this embodiment, for example, fluorescein is, as the medication, venoclyzed into the organism, and a fact that the organism dosed with the fluorescein exhibits the different absorbance and fluorescent characteristics with respect to a predetermined wavelength is used to obtain the fluorescent concentration.

The endoscope image sensing and processing apparatus according to this embodiment has, as shown in FIG. 47, the endoscope 61A, the video processor 66C and the monitor 67.

The video processor 66C has, in place of the rotary filter 130 and the image processing portion 151 of the video processor 66A according to the twelfth embodiment, a rotary filter 190 and a image processing portion 191. The monitor 67 is connected to the video processor 66C.

Similar structures and operations of the residual portions to those of the twelfth embodiment are given the same reference numerals and their descriptions are omitted here.

A rotary filter 190, which is rotated by the motor 124, is disposed in front of the lamp 122 of the video processor 66C. The rotary filter 190 has filters for permitting light beams in red (R), green (G) and blue (B) wavelength regions to pass through, the filters being disposed in the circumferential direction thereof. The transmission characteristics of each filter of the rotary filter 190 are shown in FIG. 50, the rotary filter 190 being enabled to be inserted and removed to and from the optical path.

Light beams allowed to pass through the rotary filter 190 and time-sequentially separated into light beams in R, G and B wavelength regions are made incident upon the light incident terminal of the light guide 75. The light beams are guided by the light guide 75 into the leading section 69 so as to be emitted from the same so that a portion to be observed is irradiated with the light beams.

In this embodiment, the wavelengths of light beams emitted by the irradiating lamp 122 are sequentially limited by the rotary filter 190 so as to be color-separated into light beams in the R, G and B wavelengths as shown in FIG. 50. Then, the mucous membrane of an organism or the like is time-sequentially irradiated with the light beams so that a usual color image in the visible light region is obtained. As an alternative to this, the rotary filter 190 may be retracted from the optical path to irradiate the subject with white light to obtain a usual visible image.

If fluorescent material called fluorescein having the absorption and fluorescent characteristics as shown in FIG. 51 is injected during a usual observation of the color image of the mucous membrane of an organism, the concentration of the fluorescein in the blood is changed with time. The foregoing change depends upon the change in the quantity of the blood and that in the blood stream.

The fluorescein has the absorbance characteristics that coincides with the wavelength region for B as shown in FIG. 51 and absorbs light in the foregoing wavelength to emit fluorosencec. Therefore, in the case where the subject is time-sequentially irradiated with light beams in the R, G and B wavelength regions, the fluorescence is weakened if the irradiation with R and G light is performed as compared with the case where irradiation with B is performed. That is, if the fluorescein concentration is high in, for example, the mucous membrane during the irradiation with B, the mucous membrane emits fluoresencec. Also in the case where irradiation with white light is being performed, the mucous membrane absorbs light in the B wavelength region and emits fluoresencec in the R and B wavelength regions. Therefore, the change in the color tone enables the distribution of concentrations and the time sequential change of the fluorescein to be observed.

Furthermore, observation and measurement of the distribution of the concentration of the fluorochrome can be performed further effectively by the image processing portion 191 arranged as shown in FIG. 49.

In the image processing portion 191, the R, G and B signals are supplied to the A/D converter 192 from the forward portion of the matrix circuit 140 so as to be converted into analog signals into digital signals. The R, G and B signals converted into the digital signals are supplied to an inverse γ-correction circuit 193 so as to be inversely γ-corrected. The output from the inverse γ-correction circuit 193 is supplied to a frame memory 194 and a fluorescent concentration calculating circuit 195. The fluorescent concentration calculating circuit 195 calculates Log R/B to coincide with the timing of the image obtained due the irradiation performed with B irradiating light, fluorescent concentration calculating circuit 195 simultaneously calculating value Log R/G correlated to the concentration of hemoglobin. The value Log R/B is, in the fluorescent concentration calculating circuit 195, normalized with a value correlated to the concentration of hemoglobin so that a value correlated to the concentration of the fluorochrome that is not affected by the concentration of hemoglobin is calculated. The calculated value is supplied to a comparator 196.

In the comparator 196, a predetermined range of the subject quantity is set for a range to be observed by an observer, for example, the physically changed portion caused by a disease in accordance with the value of the concentration of the fluorochrome. The pixels, the calculated values of which are included in the foregoing range, are detected so that a discrimination signal denoting the pixels are included in the predetermined range of the subject quantity is transmitted to LUTs 198, 199 and 200. The value correlated to the fluorescent concentration of the range intended to be observed by the observer may be stored in a ROM 197 or the like or may be enabled to be supplied from the outside through a keyboard or the like. In this embodiment, data about the predetermined range of the fluorescent concentration, which is the subject quantity, is previously stored in the ROM 197.

The LUTs 198 to 200 convert the pixels discriminated to be outside the predetermined range of the subject quantity into images displayed in a form realized by superposing a half-tone pattern on the original image. The converted images are supplied to a γ-correction circuit 201 so as to be γ-corrected. The converted images, which has been γ-corrected as described above, are supplied to a D/A converter 202 so as to be converted from digital signals into analog signals, the analog signals being then displayed on the color monitor 67. By performing switching between the RGB signals and the NTSC signals in the video processor 66C, the color monitor 67 enable both image formed by extracting the subject region of the fluorescent concentration and an image to be usually observed to be observed.

Hitherto, the fine color tone change has been observed by looking the image processed by the image processing portion 191. However, the supply of the range of the fluorochrome concentrations subjected by the observer enables only the portion required by the observer to be observed without the half tone pattern. Therefore, this embodiment facilitates the discrimination of the subject region and reduces the load of the observer.

The present invention is not limited to the foregoing embodiment, and use of another fluorochrome except the fluorescein enables a similar effect to be obtained, the other fluorochrome being exemplified by hematoporphyrin inductor, acridine orange and adriamycin and the like. Although all the fluorochromes absorb light in the wavelength for B, the acridine orange and the hematoporphyrin inductor emit light in a wavelength region ranging from R to the near infrared ray region. Therefore, they cannot be observed through a fiber scope, but they can clearly be observed through a video scope. Although the foregoing embodiment has the arrangement that the image processing portion 191 is formed in the video processor 66C, the image processing portion may be formed individually to be an individual image processing unit. As an alternative to this, an image filing unit capable of retrieving recorded images may be connected, the image filing unit including the image processing portion 191. Further, the fluorochrome concentration in the texture can be observed in place of the fluorochrome in the blood vessel. As an alternative to use of the fluorochrome, change in the NADHC or peculiar fluorescent in the texture of an organism may be observed.

Figure 52:
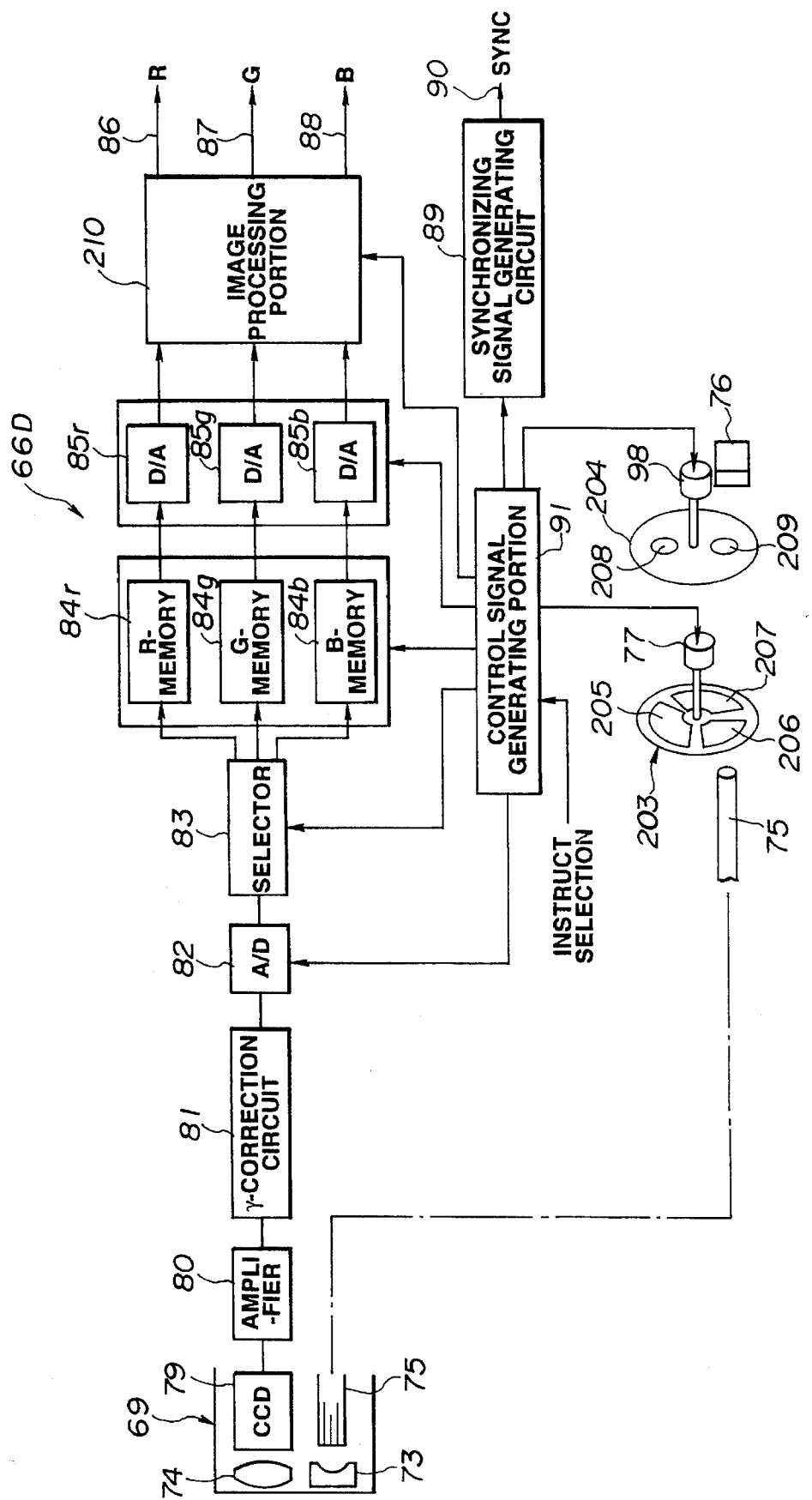
FIGS. 52 to 56 illustrate a sixteenth embodiment.
Figure 53:
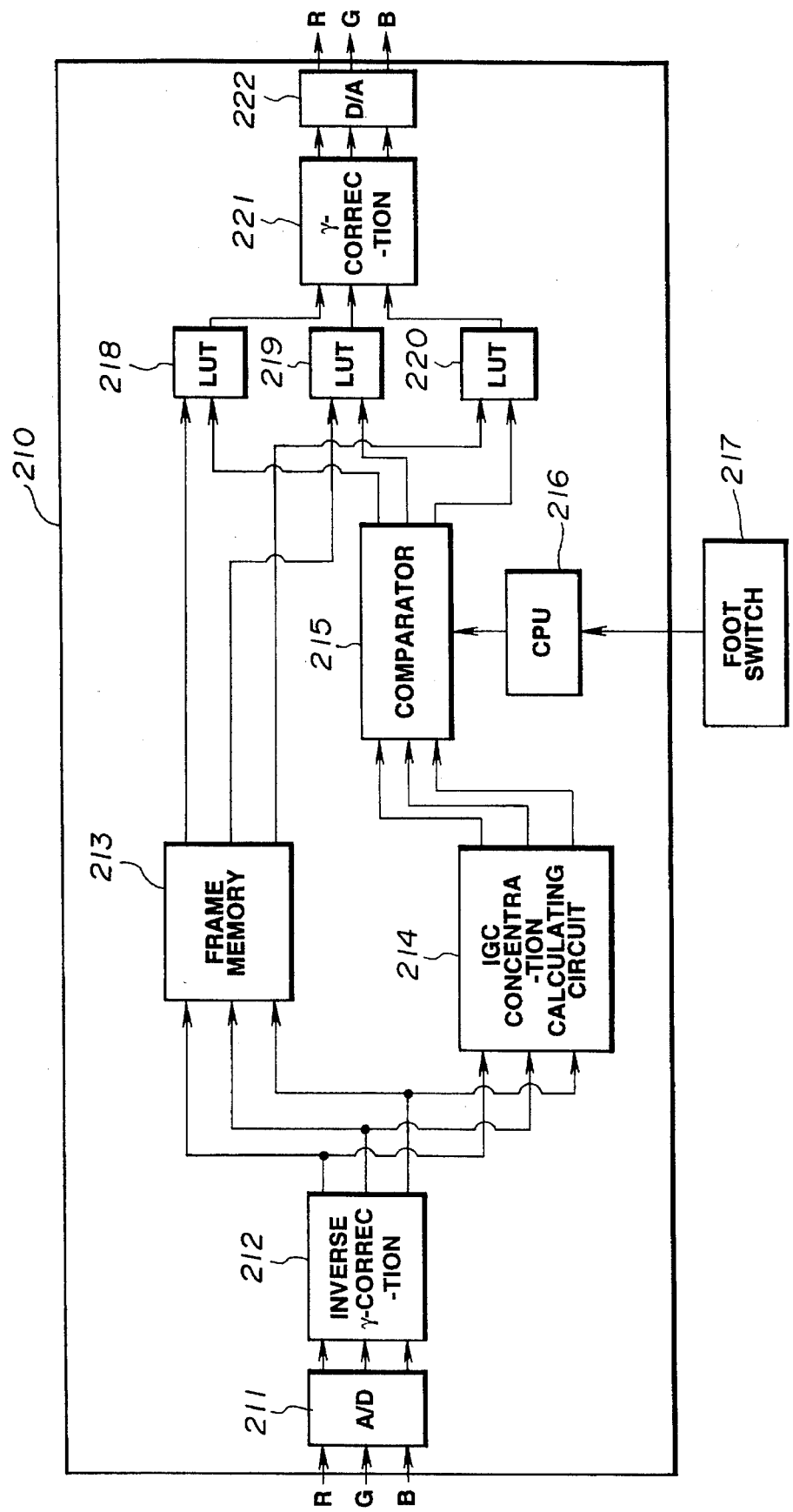
Figure 54:
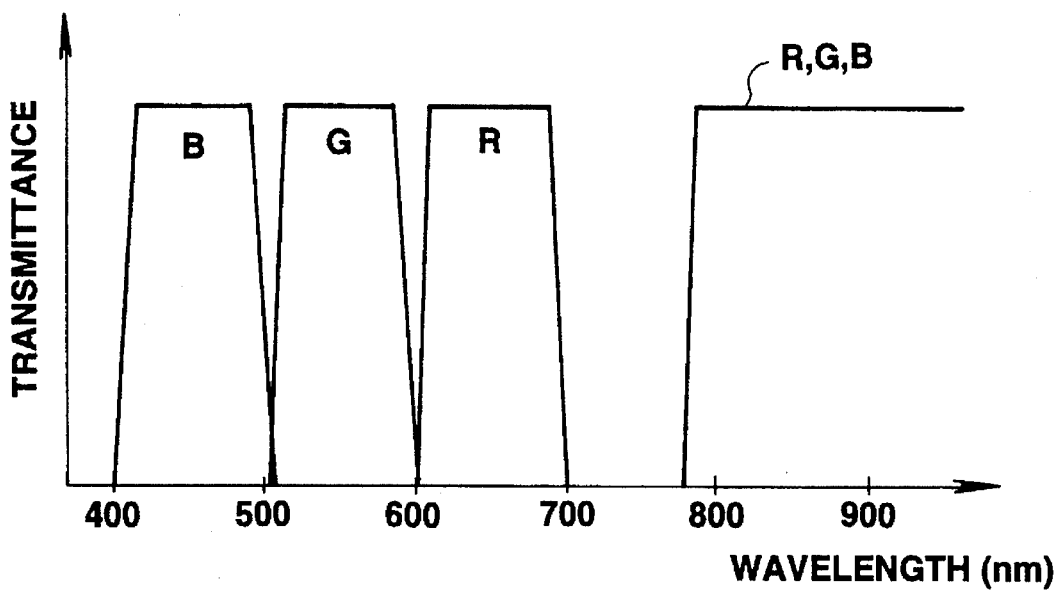
Figure 55:
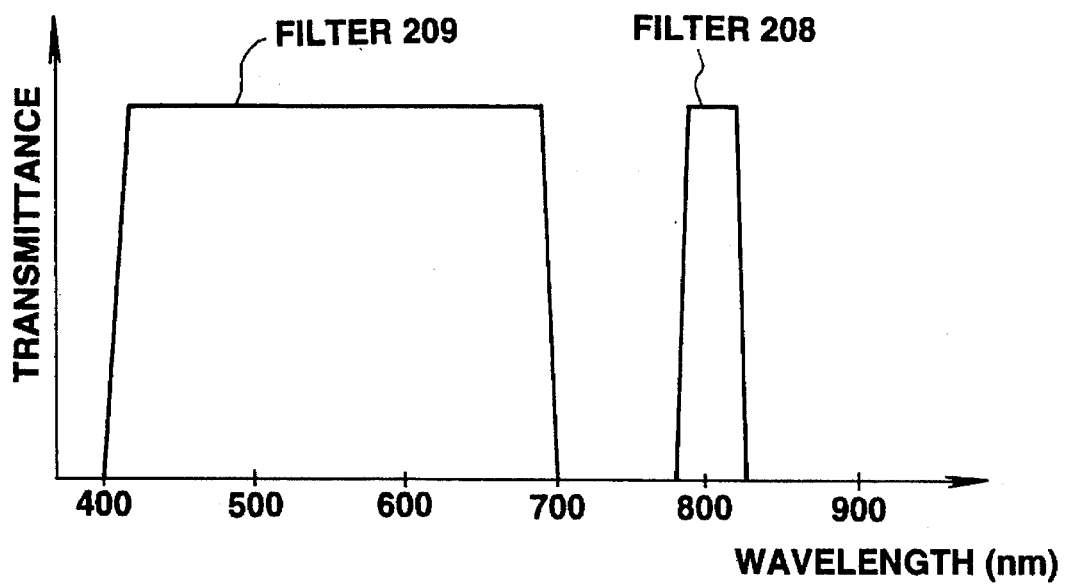
Figure 56:
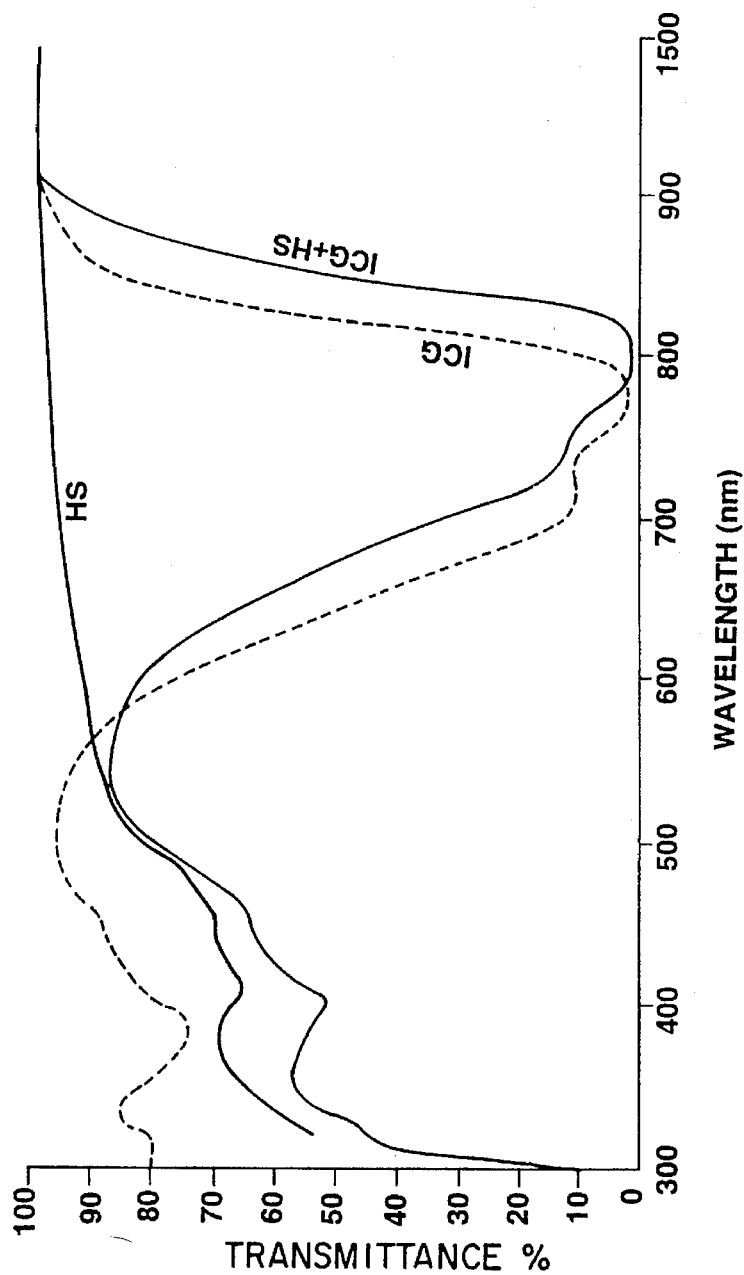

FIGS. 52 to 56 illustrate a sixteenth embodiment. FIG. 52 is an overall block diagram which illustrates an endoscope image sensing and processing apparatus. FIG. 53 is a block diagram which illustrates an image processing portion. FIG. 54 is a graph which illustrates the characteristics of the transmission wavelength region of each filter of a filter turret. FIG. 56 is a graph which illustrates the characteristics of spectral transmittance curves realized in indocyanine green with human serum solution.

The endoscope image sensing and processing apparatus according to this embodiment is arranged to observe an organism by using ICG (Indocyanine Green) as the medication to be dosed into the organism which is the subject. The structure of the same is arranged in such a manner that the subject quantity, that is, a value correlated to the ICG, is obtained to enable different displays to be performed between the portion within the predetermined range and the portion outside the predetermined range. The ICG is pigment which bonds with serum albumin and which is used to measure the quantity of blood and inspect the function of the liver. The endoscope image sensing and processing apparatus according to this embodiment irradiates the subject with light in a wavelength of 805 nm which is specifically absorbed by the ICG to calculate the concentration of ICG from the obtained image.

The endoscope image sensing and processing apparatus according to this embodiment is different, in the light source portion and the image processing portion in the video processor, from the endoscope image sensing and processing apparatus according to the sixth embodiment shown in FIG. 18. Similar structures and operations of the residual portions to those of the sixth embodiment are given the same reference numerals and their descriptions are omitted here.

The endoscope image sensing and processing apparatus according to this embodiment has a rotary filter 203 and a filter turret 204 in place of the rotary filter 96 and the filter turret 97 shown in FIG. 18. The rotary filter 203 has filters 205, 206 and 207 for permitting light beams in mutually different wavelength regions to pass through, the filters 205, 206 and 207 being disposed in the circumferential direction of the rotary filter 203. The characteristics of the filters 205, 206 and 207 respectively have the characteristics corresponding to those of R, G and B shown in FIG. 54, Each filter has common transmission characteristics in a region higher than about 780

The filter turret 204 has filters 208 and 209 having the transmission wavelength characteristics shown in FIG. 55, the filter turret 204 being enabled to be selectively inserted/retracted to and from the optical path of the lamp 76.

Light beams emitted from the lap 76 are allowed to pass through either of the filter turrets and time-sequentially separated into respective wavelength region by the filters of the rotary filter 203, the separated light beams being then made incident upon the incident terminal of the light guide 75. The incident light beams are, by the light guide 75, guided to the leading section 69 so as to be emitted through the end surface of the leading section 69 to be allowed to pass through the light distributing lens 73 so that the subject is irradiated with the same.

The endoscope image sensing and processing apparatus according to this embodiment has an image processing portion 210 in place of the image processing portion 50 shown in FIG. 18.

In the image processing portion 210, R, G and B signals transmitted from the D/A converters 85*r*, 85*g* and 85*b* are supplied to an A/D converter 211 so as to be converted from analog signals to digital signals. The R, G and B signals converted into the digital signals are supplied to an inverse γ-correction circuit 212 so as to be converted, into linear data for the purpose of displaying the image on the monitor, from image data which has been γ-corrected in the foregoing γ-correction circuit 81. The output from the inverse γ-correction circuit 212 is supplied to a frame memory 213 and an ICC concentration calculating circuit 214. The ICG concentration calculating circuit 214 calculates the value correlated to the concentration of ICG in accordance with the supplied R, G and B signals, the result of the calculation being transmitted to the comparator 215. The value correlated to the concentration of ICG and supplied to the comparator 215 is subjected to a comparison with a subject value (for example, RMAX and RMIN in a case where values from RMAX to RMIN are instructed) that can be controlled from outside. Then, a discrimination signal denoting whether or not the value is included in the range of the subject value is transmitted to image converting LUTs 216, 219 and 220. It should be noted that RMAX and RMIN respectively are the maximum value and the minimum value of the values correlated to the concentration of ICG, the RMAX and RMIN being used to set the predetermined range.

The LUTs 216, 219 and 220 convert pixels outside the range of the subject value into an image masked with, for example, a half tone pattern in response to the image signal, the timing of which has been adjusted by the frame memory 213, and the discrimination signal transmitted by the comparator 215, and the LUTs 216, 219 and 220 then transmit the converted image to a γ-correction circuit 221. The converted image signal is γ-corrected by the γ-correction circuit 221 so as to be displayed on the monitor 4. Then, the image signal is converted from the digital signal to an analog signal in the D/A converter 222 so as to be displayed on the monitor 4.

The operation of this embodiment will now be described with reference to FIGS. 52 and 53.

Light beams emitted from the lamp 76 and ranging from the ultraviolet region to the infrared region are made incident upon the filter 208 or the filter 209 disposed in the filter turret 204. In a case where the filter 209 has been inserted onto the optical path, light beams, the wavelength of which ranges in a region from about 400 nm to about 700 nm, are allowed to pass through as shown in FIG. 55. In a case where the filter 208 has been inserted into the optical path, light beams in a narrow band in the vicinity of 805 nm are allowed to pass through. Then, the irradiating light beams are made incident upon the rotary filter 203 which is rotated by the motor 77.

The rotary filter 203, as described above, has R, G and B filters having the transmission characteristics as shown in FIG. 54. In the case where the filter 208 has been inserted onto the optical path, light beams emitted from the lamp 76 are time-sequentially decomposed into light beams in the wavelength regions corresponding to the visible regions of the filters 205, 206 and 208. In the case where the filter 209 has been inserted onto the optical path, light beams emitted from the lamp 76 are guided in such a manner that light beams in a narrow range, the center of which is 805 nm, are guided into the coelom through the light guide 75 so as to be irradiating light beams with which the inner surface of the coelom is irradiated through the light distributing lens 73.

Since the light beams in the narrow range, the center of which is 805 nm, are extremely absorbed by the ICG as shown in FIG. 56, the blood vessel or the like including the ICG are picked up in black.

The image of a subject obtained by each irradiating light beam is imaged on the CCD 79 by the imaging optical system 74 so as to be converted into an electric signal. The outputs from the CCD 79 are amplified by the amplifier 80 and converted into a predetermined γ-characteristic by the γ-correction circuit 81. The outputs from the γ-correction circuit 81 are converted into digital signals by the D/A converter 82 so as to be, as images obtained from time sequential wavelengths, stored in the memories 84r, 84g and 84b through the selector 83. Image signals read from the memories 84r, 84g and 84b are made simultaneous and converted into analog signals by the D/A converters 85r, 85g and 85b so that they are transmitted while being formed into R, G and B signals.

The signals transmitted from the D/A converters 85r, 85g and 85b are supplied to the image processing portion 210 so as to be subjected to a predetermined image conversion process before the signals are transmitted to the monitor 4 to be displayed on it.

In the image processing portion 210, the R, G and B image signals taken in a state where the filter 209 has been inserted onto the optical path are respectively in the form of monochrome images formed by the irradiating light beams of 805 nm. Therefore, the R, G and B signals obtained from the light beams in the narrow bands are subjected to a process in which the average value of the R, G and B signals is calculated for the purpose of decreasing an error occurring due to noise. As a result, values correlated to the concentration of ICG are calculated. Also in this embodiment, a single wavelength light beam at 805 nm is used to irradiate the subject, and therefore the influence depending upon the difference in the level of the irradiating light beams cannot be eliminated. However, operation of the endoscope performed to uniformly irradiate the subject with the irradiating light beams to obtain a flat image will enable the value correlated to the concentration of ICG to be calculated.

The image processing portion 210 has a CPU 216 so that plural types of predetermined ranges (the levels of the subject values) of subject values are set through a foot switch 217 disposed on the outside. As for the predetermined range of the subject value, the range of the value of the concentration of ICG, which is required by the observer, is set in such a manner that a concentration value of ICG required to extract, for example, the blood vessel, is set to enable the image of the blood vessel, into which ICG is mixed, to be obtained. The setting method is arranged in such a manner that the image process is started when the foot switch 217 is stepped once to select one range of the subject value. When the foot switch 217 is again stepped, another range of the subject value can be set.

The level of the subject value set as described above and the value correlated to the ICG are subjected to a comparison in the comparator 215. The comparator 215 generates a discrimination signal denoting whether or not the value is within the predetermined range of the subject quantity. As a result, LUTs 218 to 220 mask the pixels outside the subject range, that is, the regions outside the subject level by means of a half tone pattern or the like. Thus, the regions required by the observer to pay attention can be clarified and the residual regions are displayed while being distinguished from the subject region.

According to this embodiment, the subject region that can be set in accordance with the value correlated to ICG can be clarified to be distinguished from the residual regions. Therefore, extraction of, for example, the state of the blood streak will facilitate the observation of a portion in which the blood vessel is disconnected in a portion in the vicinity of the physically changed portion caused by a disease.

Figure 57:
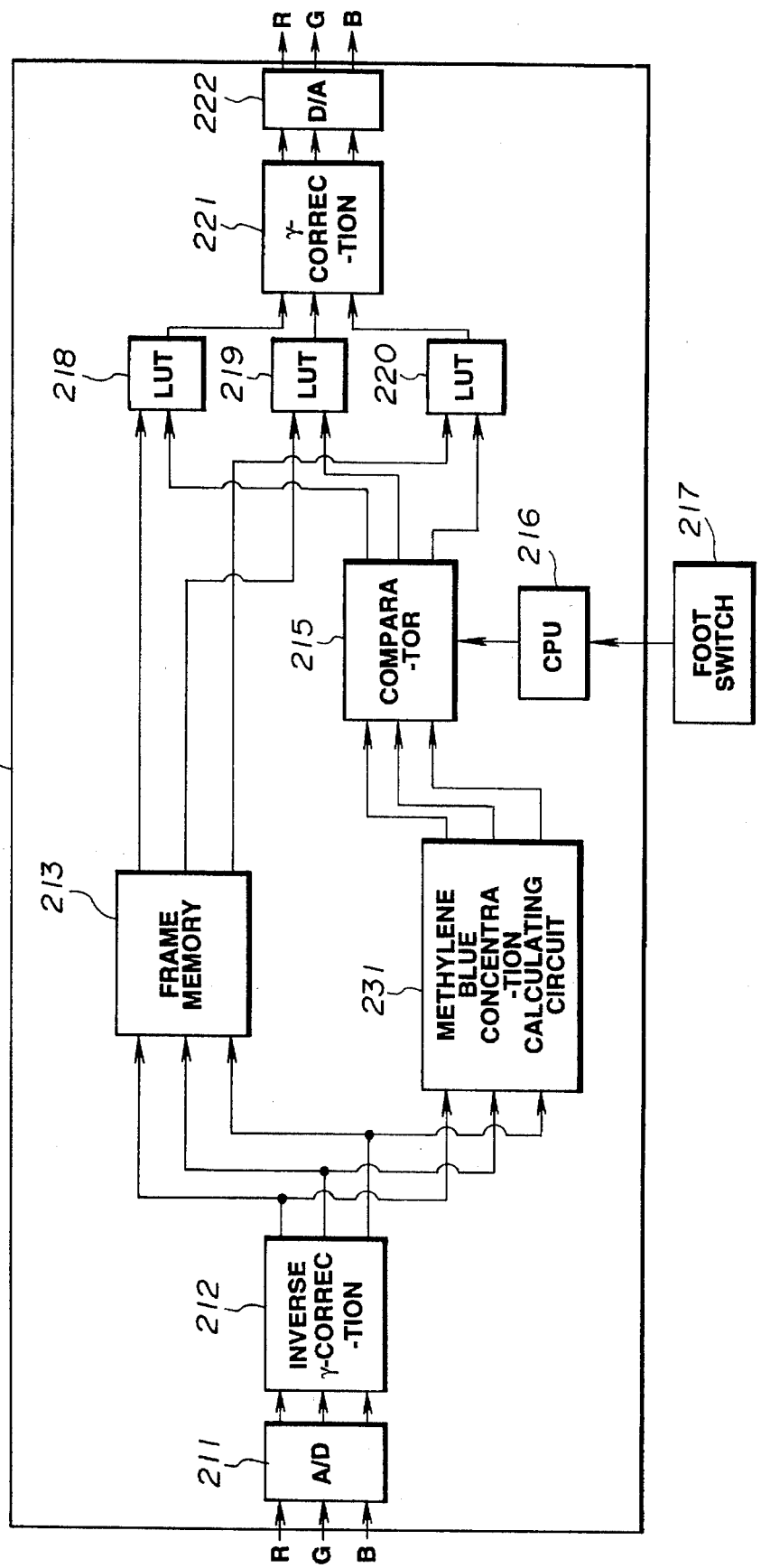
FIG. 57 is a block diagram which illustrates an image processing portion according to a seventieth embodiment.

FIG. 57 is a block diagram which illustrates an image processing portion according to a seventeenth embodiment of the present invention.

The endoscope image sensing and processing apparatus according to this embodiment is arranged in such a manner that a dye is used as the medication to be dosed into the organism, which is the subject so as to observe the structural pattern of the organism. The structure is arranged in such a way that a value correlated to a subject quantity, that is, the concentration of the dye, is obtained to display differently the portion within the predetermined range and that outside the predetermined range. In this embodiment, methylene blue is employed as the dye to be dispersed in the organism.

The endoscope image sensing and processing apparatus according to this embodiment comprises an image processing portion 230 shown in FIG. 57 in place of the image processing portion 210 according to the sixteenth embodiment. Similar structures and operations of the residual portions to those of the sixteenth embodiment are given the same reference numerals and their figures and descriptions are omitted here. The description will be made about the different portions.

The image processing portion 230 according to this embodiment comprises a methylene blue concentration calculating circuit 231 for calculating the concentration of the methylene blue serving as the dye, the methylene blue concentration calculating circuit 231 being used in place of the ICG concentration calculating circuit 214 shown in FIG. 53.

The operation of this embodiment will now be described with reference to FIG. 57.

In the endoscope image sensing and processing apparatus according to this embodiment, the image can be observed with usual visible rays if the filter 204 has been inserted onto the optical path.

Then, the description will be made about observation to be performed when the filter 204 has been inserted onto the optical path and methylene blue has been dispersed in the organism. If methylene blue is dispersed in the organism during an observation with usual visible rays, the inside portion of the organism is, in proportion to the concentration of methylene blue, changed from pinkish red peculiar to the mucous membrane to dark blue. Since the methylene blue is injected into the fine structural gap of the mucous membrane, the structural pattern of the mucous membrane is colored in blue so that the observation of the mucous membrane is performed.

By using an image of an endoscope obtained by picking up an organism into which methylene blue has been dispersed, the value correlated to the concentration of methylene blue can be calculated by the following calculation process. Methylene blue absorbs red light beams in a larger quantity as compared with the blue light in the visible region. Therefore, calculation of the ratio of blue and red, that is B/R, will enable the value in proportion to the concentration of methylene blue to be calculated. The value in proportion to the concentration of methylene blue is calculated in the methylene blue concentration calculating circuit 231 disposed in the image processing portion 230. Similarly to the sixteenth embodiment, the predetermined range of the subject quantity of which introduced into the mucous membrane pattern, is set. As a result of setting made as described above, the LUTs 218 to 220 perform the process of converting image data to mask the regions except the mucous membrane structural pattern, in, for example, white. As a result, this embodiment enables an image to be obtained which is formed by extracting the structural pattern of the mucous membrane.

According to this embodiment, also an image formed by binary-coding the pattern of the mucous membrane structure can be obtained by adequately setting the predetermined range. Therefore, the discrimination of the structural pattern can be made further clearly as compared with an image obtained by dispersing methylene blue while omitting the foregoing image process. As a result, this embodiment is very effective in a case where the pattern of the mucous membrane structure is observed to discriminate whether or not the physically changed portion caused by a disease is malignant.

This embodiment is not limited to the foregoing description. For example, the process of masking the portion outside the subject region may be performed in such a manner that achromatic color, such as gray is employed in place of the half tone pattern or half tone patterns are superposed on the original image.

The present invention is not limited to the electronic endoscope having the solid state image sensing device at the leading end of the insertion portion. The present invention may be adapted to an endoscope for use in such a manner that an externally-attached type TV camera having a solid state image sensing device such as a CCD is connected to the ocular portion of an endoscope, such as a fiber scope or a hard mirror that enables a naked-eye observation to be performed or the same is used in place of the ocular portion.

As many apparently widely different embodiments of this invention may be made without departing from the spirit and scope thereof, it is to be understood that the invention is not limited to the specific embodiments thereof except as defined in the appended claims.

What is claimed is:

1. An image processing apparatus comprising:

calculating means that subjects, to a predetermined calculation process, a plurality of image signals obtained by image sensing means by taking an image of a subject having light beams in a plurality of different wavelength regions to calculate a subject quantity of said subject or a subject quantity caused from a medication dosed into said subject;

range setting means for setting a predetermined range of said subject quantity; and display processing means for subjecting said image signals to a predetermined process in order to display, by different display methods, a portion of said image of said subject in which said subject quantity calculated by said calculating means is included in said predetermined range of said subject quantity and a portion of said image of said subject in which said subject quantity calculated by said calculating means is outside said predetermined range of said subject quantity.

2. An image processing apparatus according to claim 1, wherein said range setting means sets a peculiar value displayed by said subject quantity in a physically changed portion caused by a disease of said subject as a value within said predetermined range or a value outside said predetermined range, said display processing means discriminates whether or not said subject quantity calculated by said calculating means is included in said predetermined range set by said range setting means and subjects said image signals to a predetermined conversion process in order to display said physically changed portion caused by a disease and a normal portion of said subject by different displaying methods in accordance with results of said discrimination.

3. An image processing apparatus according to claim 1, wherein said display processing means includes said calculating means for calculating said subject quantity for each pixel unit, discrimination means for detecting, for each pixel unit, a fact whether or not said subject quantity calculated by said calculating means is a portion of said subject image included in said predetermined range of said subject quantity set by range setting means or a fact whether or not the same is outside said predetermined range of said subject quantity, and processing means for subjecting said image signals to a predetermined process in order to differently display pixels included in said predetermined range of said subject quantity detected by said discrimination means and pixels outside said predetermined range of said subject quantity.

4. An image processing apparatus according to claim 1 further comprising instruction means for selecting said predetermined range set by said range setting means, wherein said range setting means has, set therein, a plurality of different predetermined ranges as said predetermined range of said subject, to select any one of said plurality of predetermined ranges in accordance with said instruction means so as to set said predetermined range.

5. An image processing apparatus according to claim 1, wherein said range setting means sets a rated value of said subject quantity and sets values larger than said rated value to be within said predetermined range or outside said predetermined range.

6. An image processing apparatus according to claim 1, wherein said range setting means sets a rated value of said subject quantity and sets values smaller than said rated value to be within said predetermined range or outside said predetermined range.

7. An image processing apparatus according to claim 1, wherein said range setting means sets a reference value of said subject quantity and sets a rated width from said reference value to be within said predetermined range or outside said predetermined range.

8. An image processing apparatus according to claim 1, wherein said range setting means further sets a reference value in said predetermined range of said subject quantity, and said display processing means subjects said image signals to a predetermined process in order to differently display a portion larger than said reference value and a portion smaller than said reference value in a portion of said subject image in which said subject quantity is included in said predetermined range.

9. An image processing apparatus according to claim 1, wherein said range setting means includes average value calculating means for obtaining the average value of said subject quantities calculated by said calculating means, and means that uses said average value obtained by said average value calculating means to set a predetermined range of said subject quantity.

10. An image processing apparatus according to claim 1, wherein said range setting means sets a minimum value and a maximum value of said predetermined range of said subject quantity respectively and sets a range between said minimum value and said maximum value to be within said predetermined range or outside said predetermined range, and said display processing means subjects said image signals to a predetermined process to differently display a portion of said subject image in which said subject quantity calculated by said calculating means is included in a range between said minimum value and said maximum value set by said range setting means, a portion of said subject image in which said subject quantity is smaller than said minimum value and a portion of said subject image in which said subject quantity is larger than said maximum value.

11. An image processing apparatus according to claim 10, wherein said display processing means subjects, to a predetermined conversion process, a portion of said subject image in which said subject quantity calculated by said calculating means is between said minimum value and said maximum value to differently display said portion of said subject image in accordance with the value of said subject quantity calculated by said calculating means.

12. An image processing apparatus according to claim 10, wherein said display processing means performs a predetermined conversion process in order to differently display a case where said subject quantity obtained by said calculating means is smaller than said minimum value of said predetermined range and a case where said subject quantity is larger than said maximum value of said predetermined range.

13. An image processing apparatus according to claim 1 further comprising detection means for detecting a portion of said subject image in said image signals picked up by said image sensing means which is effective to perform observation and a portion of said subject image which is ineffective to perform said observation, and said display processing means subjects said image signals to different conversion processes corresponding to at least two portions of said subject image in order to differently display a portion of said subject image which is ineffective to perform said observation, a portion of said subject image which is effective to perform said observation and which is outside said predetermined range of said subject quantity and a portion of said subject image which is effective to perform said observation and which is included in said predetermined range of said subject quantity.

14. An image processing apparatus according to claim 13, wherein said range setting means includes average value calculating means for obtaining the average value of said subject quantity calculated by said calculating means for only an effective portion of said subject image detected by said detection means, and means for setting a predetermined range of said subject quantity by using said average value obtained by said average value calculating means.

15. An image processing apparatus according to claim 13, wherein said detection means detects a portion encountered halation or a dark portion as said portion effective to perform said observation.

16. An image processing apparatus according to claim 1, wherein said subject quantity is a value correlated to information about the function of an organism.

17. An image processing apparatus according to claim 1, wherein said subject quantity is a value correlated to information about the function of an organism on which the distribution of the concentrations of said medication dosed into said organism, which is said subject, is reflected.

18. An image processing apparatus according to claim 16 or 17, wherein said information about said function of said organism is a quantity of a specific texture of said organism or a quantity denoting the state of a specific texture.

19. An image processing apparatus according to claim 18, wherein said quantity of said specific texture of said organism is a quantity of hemoglobin, and said state of said specific texture of said organism is the degree of oxygen saturation of said hemoglobin.

20. An image processing apparatus according to claim 1, wherein said calculating means subjects, to a predetermined calculating process, a plurality of image signals obtained by picking up, by said image sensing means, an image of a subject or a subject dosed with said medication obtained due to irradiation performed with light beams having wavelength regions in which the degree of absorbance or reflection are different from one another so that said subject quantity is calculated.

21. An image processing apparatus according to claim 20, wherein said calculating means subjects, to a predetermined calculation process, a plurality of image signals obtained by picking up, by said image sensing means, said image of said subject having light beams in a plurality of different wavelength regions so that a quantity of hemoglobin in said subject is calculated, said range setting means sets a quantity of hemoglobin within said predetermined range among said quantities of hemoglobin serving as said subject quantity as said quantity within said predetermined range of said subject quantity; and said display processing means subjects said image signals to a predetermined process in order to display, by different displaying methods, a portion of said subject image in which said quantity of hemoglobin calculated by said calculating means is included in said predetermined range of said quantity of hemoglobin set by range setting means and a portion of said subject image in which said quantity of hemoglobin calculated by said calculating means is outside said predetermined range.

22. An image processing apparatus according to claim 20, wherein said calculating means subjects, to a predetermined calculating process, said subject images having a plurality of different wavelength regions with respect to a plurality of image signals picked up by said image sensing means so as to calculate the degree of oxygen saturation of hemoglobin of said subject, said range setting means sets said degree of oxygen saturation of hemoglobin among degrees of oxygen saturation of hemoglobin serving as said subject quantity within said predetermined range to be a quantity within said predetermined range, and said display processing means subjects, to a predetermined calculating process, said image signals in order to display, by different displaying methods, a portion of said subject image in which said degree of oxygen saturation of hemoglobin calculated by said calculating means is included in said predetermined range of said degree of oxygen saturation of hemoglobin and a portion of said subject image in which said degree of oxygen saturation of hemoglobin calculated by said calculating means is outside said predetermined range.

23. An image processing apparatus according to claim 20, wherein said calculating means includes means which subjects, to a predetermined calculating process, said subject image in a state where fluorochrome has been dosed into said subject and having light beams in a plurality of said wavelength regions with respect to a plurality of said image signals picked up by said image sensing means to calculate the concentration of said fluorochrome in said subject, said range setting means sets said concentration of said fluorochrome serving as said subject quantity within said predetermined range of said concentration of said fluorochrome as a quantity within said predetermined range of said subject quantity, and said display processing means subjects, to a predetermined calculating process, said image signals in order to display, by different displaying methods, a portion of said subject image in which said concentration of said fluorochrome calculated by said calculating means is included in said predetermined range of said concentration of said fluorochrome and a portion of said subject image in which said concentration of said fluorochrome calculated by said calculating means is outside said predetermined range.

24. An image processing apparatus according to claim 20, wherein said calculating means includes means which subjects, to a predetermined calculating process, said subject image in a state where pigment has been dosed into said subject and having light beams in a plurality of said wavelength regions with respect to a plurality of said image signals picked up by said image sensing means to calculate the concentration of said pigment in said subject, said range setting means sets said concentration of said pigment serving as said subject quantity within said predetermined range of said concentration of said pigment as a quantity within said predetermined range of said subject quantity, and said display processing means subjects, to a predetermined calculating process, said image signals in order to display, by different displaying methods, a portion of said subject image in which said concentration of said pigment calculated by said calculating means is included in said predetermined range of said concentration of said pigment and a portion of said subject image in which said concentration of said pigment calculated by said calculating means is outside said predetermined range.

25. An image processing apparatus according to claim 24, wherein said pigment is methylene blue.

26. An image processing apparatus according to claim 24, wherein said pigment is ICG (Indocyanine Green).

27. An image processing apparatus according to claim 1, wherein said display processing means subjects said image signals to a predetermined process to make the correlation between information about an original image contained in said image signal picked up by said image sensing means and information of said image to be displayed to be different in at least either of a portion of said subject image in which said subject quantity is included in said predetermined range or a portion of said subject image in which said subject quantity is outside said predetermined range in order to differently display a portion of said subject image included in said predetermined range and a portion of said subject image outside said range.

28. An image processing apparatus according to claim 27, wherein said display processing means makes said correlation to be different by subjecting said image signals to a conversion process to make information, which is included in said image signal obtained due to image sensing performed by said image sensing means and which cannot be taken by said original image to be information of said image to be displayed.

29. An image processing apparatus according to claim 27, wherein said display processing means makes said correlation to be different by performing a chromaticity conversion process to make chromaticity, which is information included in said image to be displayed, to be different from chromaticity, which is information of said original image included in said image signal.

30. An image processing apparatus according to claim 27, wherein said display processing means makes said correlation to be different by performing a hue conversion process in accordance with a table set in such a manner that the hue, which is information of said image to be displayed, is different from the hue which is information about said original image included in said image signal.

31. An image processing apparatus according to claim 27, wherein said display processing means makes said correlation to be different by performing a color saturation conversion process in accordance with a table set in such a manner that the color saturation, which is information of said image to be displayed, is different from the color saturation which is information about said original image included in said image signal.

32. An image processing apparatus according to claim 27, wherein said display processing means makes said correlation to be different by performing a conversion process as said predetermined process in such a manner that said image to be displayed is made in achromatic color with respect to information of said original image included in said image signal.

33. An image processing apparatus according to claim 27, wherein said display processing means makes said correlation to be different by performing a conversion process as said predetermined process in such a manner that said image to be displayed is made to have a specific pattern with respect to information of said original image included in said image signal.

34. An endoscope image sensing and processing apparatus comprising:

an endoscope having at least an imaging optical system for imaging an image of a subject;

wavelength separating means for separating light into light beams in a plurality of wavelength regions in which an absorbance or a quantity of change in the absorbance is made different due to a subject quantity of a subject or a subject quantity realized due to a medication dosed in said subject;

image sensing means for picking up an endoscope image of said subject having light beams in a plurality of wavelength regions separated by said wavelength separating means to transmit a plurality of image signals;

calculating means that subjects, to a predetermined calculation process, a plurality of said image signals obtained by said image sensing means by picking up said image of said subject formed by light beams in a plurality of wavelength regions in which said absorbance or said quantity of change in said absorbance is different to calculate said subject quantity;

range setting means for setting a predetermined range of said subject quantity; and display processing means for subjecting said image signals to a predetermined process in order to differently display a portion of said subject image in which said subject quantity calculated by said calculating means is included in said predetermined range of said subject quantity set by said range setting means and a portion of said subject image in which the same is outside said predetermined range of said subject quantity.

35. An endoscope image sensing and processing apparatus according to claim 34, wherein said calculating means includes means for calculating the ratio of an image signal obtained from a light beam in a wavelength region in which the quantity of change in said absorbance is large and an image signal obtained from a light beam in a wavelength region in which the quantity of change in said absorbance is small, said image signals being included a plurality of image signals obtained from light beams in a plurality of said wavelength regions which have been separated by said wavelength separating means and in which said quantities of change in said absorbance are different.

36. An endoscope image sensing and processing apparatus according to claim 34, wherein said calculating further includes means for calculating the logarithm of said ratio obtained by said means for calculating said ratio.

37. An endoscope image sensing and processing apparatus according to claim 34, wherein said calculating means includes means for calculating the ratio of an image signal obtained from a light beam in a wavelength region in which the quantity of change in said absorbance is large and an image signal obtained from a light beam in a wavelength region in which the quantity of change in said absorbance is small, said image signals being included a plurality of image signals obtained from light beams in a plurality of said wavelength regions which have been separated by said wavelength separating means and in which said quantities of change in said absorbance are different.

38. An endoscope image sensing and processing apparatus according to claim 34, wherein said calculating means includes selection means for selectively transmitting an image signal obtained from a light beam in a wavelength region in which the quantity of change in said absorbance is large or an image signal obtained from a light beam in a wavelength region in which the quantity of change in said absorbance is small, said image signals being included a plurality of image signals obtained from light beams in a plurality of said wavelength regions which have been separated by said wavelength separating means and in which said quantities of change in said absorbance are different.

39. An endoscope image sensing and processing apparatus according to claim 34, wherein said wavelength separating means for separating light into light beams in a plurality of wavelength regions in which absorbances are different due to hemoglobin in said subject, said calculating means includes hemoglobin quantity calculating means for calculating the ratio of an image signal obtained from a light beam in a wavelength region in which the absorbance due to hemoglobin is large and an image signal obtained from a light beam in a wavelength region in which the absorbance due to hemoglobin is small and calculating the logarithm of said obtained ratio, said light beams being in said wavelength regions separated by said wavelength separating means, said range setting means set a predetermined range of said quantity of hemoglobin, and said display processing means discriminates that said quantity of hemoglobin obtained by said hemoglobin quantity calculating means is included in said predetermined range set by said range setting means or outside said predetermined range and performs said predetermined process in order to differently display an image portion, which is the subject of said discrimination, between a case where the same is included in said predetermined range and a case where the same is included in the outside of said predetermined range.

40. An endoscope image sensing and processing apparatus according to claim 34, wherein said wavelength separating means separates light into light beams in a plurality of wavelength regions in which the quantity of change in said absorbance is different due to the degree of oxygen saturation of hemoglobin in said subject, said calculating means includes means for calculating degree of oxygen saturation of hemoglobin for calculating the ratio of an image signal obtained from a light beam in a wavelength region in which the change in the quantity of said absorbance due to said degree of oxygen saturation of hemoglobin is large and an image signal obtained from a light beam in a wavelength region in which the change in the quantity of said absorbance due to said degree of oxygen saturation of hemoglobin is small and calculating the logarithm of said obtained ratio, said light beams being in said wavelength regions separated by said wavelength separating means, said range setting means sets a predetermined range of said degree of oxygen saturation of hemoglobin, and said display processing means discriminates that said degree of oxygen saturation of hemoglobin obtained by said means for calculating degree of oxygen saturation of hemoglobin is included in said predetermined range set by said range setting means or outside said predetermined range and performs said predetermined process in order to differently display an image portion, which is the subject of said discrimination, between a case where the same is included in said predetermined range and a case where the same is included in the outside of said predetermined range.

41. An endoscope image sensing and processing apparatus according to claim 34, wherein said wavelength separating means includes a filter having the characteristics which permit a wavelength region including 805 nm to pass through and a filter having the characteristics which permit a predetermined region except said wavelength region to pass through.

42. An endoscope image sensing and processing apparatus according to claim 34, wherein said wavelength separating means includes a filter having the characteristics which permit a wavelength region including 650 nm to pass through and a filter having the characteristics which permit a predetermined region except said wavelength region to pass through.

43. An endoscope image sensing and processing apparatus according to claim 34, wherein said wavelength separating means includes first wavelength separating means for separating the subject image into images in a plurality of wavelength regions in order to obtain an image in a visible region, second wavelength separating means for separating an image in a wavelength region in which the quantity of light made incident upon a light receiving portion of said image sensing means is changed due to the quantity of change in said degree of oxygen saturation of hemoglobin, said second wavelength separating means being disposed integrally or individually from said first wavelength separating means, and said endoscope image sensing and processing apparatus is arranged in such a manner that at least a portion of said first wavelength separating means and said second wavelength separating means are used to cause an optical image in a visible region including image information, with which the quantity of the change in the degree of oxygen saturation of hemoglobin is obtained can be made larger, to be picked up by said image sensing means.

44. An image processing method for performing different displays depending upon a subject quantity, said image processing method comprising:

a calculating step that subjects, to a predetermined calculation, a plurality of image signals obtained by image sensing means due to an operation of picking up an image of a subject obtained due to light beams in wavelength regions, which are absorbed or reflected by said subject at different degrees in accordance with a subject quantity of said subject or a subject quantity caused from a dosed medication so as to obtain said subject quantity as data;

a step for discriminating whether or not said data obtained by said calculating means is included in said predetermined range;

a step for formalizing said data in a case where a discrimination has been made in said discrimination step that said data is included in said predetermined range;

a step for converting data in such a manner that information included in an image to be displayed is made different from information of an original image included in said image signal in accordance with the value of said data normalized in said normalizing step; and a step for converting said data by data conversion performed in such a manner that the correlation between said information of said original image included in said image signal and said information included in said image to be displayed is different from that in said step for converting data in a case where a discrimination has been made in said discrimination step that said data is included in said outside portion of said predetermined range.

45. An image processing method for performing different displays depending upon a subject quantity according to claim 44, wherein said range setting means sets the minimum value and the maximum value of said subject quantity and sets a range between said minimum value and said maximum value as a predetermined range, and said discriminating step discriminates whether or not said data obtained by said calculating means is included in said predetermined range in accordance with a fact whether or not said data is present between said minimum value and said maximum value.

\* \* \* \* \*